United States Patent
Rohatgi et al.

(10) Patent No.: US 12,420,332 B2
(45) Date of Patent: Sep. 23, 2025

(54) MATERIALS, METHODS AND TECHNIQUES FOR SURFACE ALLOYING SAND CASTED ARTICLES

(71) Applicant: UWM Research Foundation, Inc., Milwaukee, WI (US)

(72) Inventors: Pradeep Rohatgi, Milwaukee, WI (US); Michael Beining, Brookfield, WI (US); Kaustubh Kishore Rane, Milwaukee, WI (US); Swaroop K. Behera, Milwaukee, WI (US); Amir Kordijazi, Albany, NY (US)

(73) Assignee: UWM Research Foundation, Inc., Milwaukee, WI (US)

( * ) Notice: Subject to any disclaimer, the term of this patent is extended or adjusted under 35 U.S.C. 154(b) by 210 days.

(21) Appl. No.: 17/511,171

(22) Filed: Oct. 26, 2021

(65) Prior Publication Data
US 2022/0126357 A1     Apr. 28, 2022

Related U.S. Application Data

(60) Provisional application No. 63/105,815, filed on Oct. 26, 2020.

(51) Int. Cl.
*B22C 9/02* (2006.01)
*B22C 9/12* (2006.01)
(Continued)

(52) U.S. Cl.
CPC .............. *B22C 9/02* (2013.01); *B22C 9/12* (2013.01); *B32B 15/01* (2013.01); *C09D 1/00* (2013.01);
(Continued)

(58) Field of Classification Search
None
See application file for complete search history.

(56) References Cited

U.S. PATENT DOCUMENTS 2,839,392 A   6/1958   Streicher
2,920,954 A   1/1960   Mott
(Continued)

FOREIGN PATENT DOCUMENTS

GB   2130244 A   5/1984
WO   1999054075 A1   10/1999

OTHER PUBLICATIONS

Unified Alloys, "Stainless Steel 101: What is Stainless Steel and How is it made?", Aug. 8, 2020 as dated by the Wayback Machine, downloaded on Jun. 10, 2024 from www.unifiedalloys.com/blog/what-is-stainless-steel (Year: 2020).*

(Continued)

*Primary Examiner* — Kim S. Horger
(74) *Attorney, Agent, or Firm* — Michael Best & Friedrich LLP

(57) ABSTRACT

Exemplary articles may comprise a surface alloyed layer, a base metal comprising a steel, and a transitional layer between the surfaced alloyed layer and the base metal. The surface alloyed layer may comprise nickel (Ni), chromium (Cr), manganese (Mn), molybdenum (Mo), silicon (Si), or combinations thereof. Exemplary methods of making an article may comprise coating a portion of a sand mold with a metal slurry, pouring a molten steel alloy onto the sand mold, and removing the article from the sand mold.

18 Claims, 71 Drawing Sheets
(55 of 71 Drawing Sheet(s) Filed in Color)

(51) Int. Cl.
| | |
|---|---|
| *B32B 15/01* | (2006.01) |
| *C09D 1/00* | (2006.01) |
| *C22C 35/00* | (2006.01) |
| *C22C 38/02* | (2006.01) |
| *C22C 38/04* | (2006.01) |
| *C22C 38/44* | (2006.01) |

(52) U.S. Cl.
CPC ............ *C22C 35/005* (2013.01); *C22C 38/02* (2013.01); *C22C 38/04* (2013.01); *C22C 38/44* (2013.01)

(56) References Cited

U.S. PATENT DOCUMENTS

| | | | |
|---|---|---|---|
| 3,337,331 | A | 8/1967 | Ljungberg |
| 3,450,189 | A | 6/1969 | MacDonald |
| 3,450,528 | A | 6/1969 | Thompson |
| 3,592,634 | A | 7/1971 | Denhard, Jr. |
| 3,615,368 | A | 10/1971 | Baumel |
| 3,696,486 | A | 10/1972 | Benjamin |
| 3,699,052 | A | 10/1972 | Petrey, Jr. |
| 4,410,489 | A | 10/1983 | Asphahani et al. |
| 4,487,630 | A | 12/1984 | Crook et al. |
| 4,750,947 | A | 6/1988 | Yoshiwara et al. |
| 5,310,522 | A | 5/1994 | Culling |
| 5,856,625 | A | 1/1999 | Saunders et al. |
| 5,879,743 | A | 3/1999 | Revankar |
| 6,866,816 | B2 | 3/2005 | Liang et al. |
| 8,518,531 | B2 | 8/2013 | Rohatgi |
| 8,828,494 | B2 | 9/2014 | Bierwagen et al. |
| 8,834,734 | B2 | 9/2014 | Abd Elhamid et al. |
| 2011/0285091 | A1* | 11/2011 | Wodrich ................ B22D 19/08 277/377 |
| 2015/0030883 | A1* | 1/2015 | Yazawa .................. C21D 6/002 428/687 |

OTHER PUBLICATIONS

Amirsadeghi et al,. "Comparison of the influence of molybdenum and chromium TIG surface alloying on the microstructure, hardness and wear resistance of ADI", J. Mater. Process. Technol., 2008, 201, 673-677.
Aramide et al., "Effects of carburization time and temperature on the mechanical properties of carburized mild steel, using activated carbon as carburizer." Materials Research, vol. 12, No. 4, 2009.
Baldenebro et al., "Influence of Size on Microstructure and Mechanical Properties of an AISI 304L Stainless Steel—A Comparison between Bulk and Fibers." Materials, p. 451-461, 2015.
Business Insights Global. "Investigators from University of Campinas Report New Data of Coatings Technology (Laser Surface Alloying Applied on Ti-3mo and Ti-10nb Sintered Parts)." Journal of Technology Mar. 2, 2021: 2203. Business Insights: Global. Web. Oct. 12, 2022. (2 pages).
Callister et al., "Materials Science and Engineering an Introduction." Edition 8, John Wiley & Sons, Inc., p. 111.
Cao et al., "Surface microstructure and property modifications in AISI 304 stainless steel induced by pseudospark pulsed electron beam treatments", Vacuum, 2021, 184, 109914.
Chakraborty et al., "Microstructures, wear and corrosion resistance of laser composite surfaced austenitic stainless steel (AISI 304 SS) with tungsten carbide", Opt. Laser Technol., 2021, 134, 106585.
Chalker et al., "A review of the methods for the evaluation of coating-substrate adhesion." Materials Science and Engineering: A, vol. 140, p. 583-592.
Chen et al., "Study on Wear Resistance of Ti—6Al—4V Alloy Composite Coating Prepared by Laser Alloying", Appl. Sci., 2021, 11, 446.
Chipera et al., "Fitting Full X-Ray Diffraction Patterns for Quantitative Analysis: A Method for Readily Quantifying Crystalline and Disordered Phases." Advances in Materials Physics and Chemistry, vol. 3, p. 47-53, 2013.

Das, "Evolution of microstructure in laser surface alloying of aluminum with nickel." Materials Science and Engineering: A, vol. 174, Issue 1, p. 75-84, 1994.
Dave et al., "Optimization of ceramic shell mold materials in investment casting", IJRET, vol. 3, p. 30-33, 2014.
Desu, "Mechanical properties of Austenitic Stainless Steel 304L and 316L at elevated temperatures." Journal of Materials Research and Technology, vol. 5, issue 1, 2016 13-20.
Dewi et al., "Microstructure and mechanical properties of laser surface treated 44MnSiVS6 microalloyed steel", Opt. Laser Technol., 2020, 127, 106139.
Dos Anjos et al., "Laser surface alloying applied on Ti—3Mo and Ti—10Nb sintered parts", Surf. Coatings Technol., 2021, 407, 126773.
Draper et al., "Laser surface alloying—a bibliography." Journal of Materials Science, vol. 19, Issue 12, 1984.
Fatoba et al., "Computational Dynamics of Anti-Corrosion Performance of Laser Alloyed Metallic Materials." Fiber Laser, 2016.
Ferguson et al., "Self-Healing Metals and Metal Matrix Composites." JOM., 2014, vol. 66, 1-6.
Fernández Domene et al., "Effect of Alloying Elements on the Electronic Properties of Thin Passive Films Formed on Carbon Steel, Ferririte and Austenitic Stainless Steels in a High Concentrated LiBr Solution", Thin Solid Films, 2014, 558, pp. 252-258.
Fujii et al., "Microstructure and mechanical properties of friction stir welded pure Mo joints." Scrupta Materialia, vol. 64, Issue 7, p. 657-660, 2011.
Gooch, "Corrosion behavior of welded stainless steel", Weld. J., 1996, 75, 135-s (20 pages).
Hammood et al., "Effect of heat treatment on corrosion behavior of duplex stainless steel in orthodontic applications", Mater. Res. Express, 2017, 4 126506 (11 pages).
Hasan, "Analysis of Mechanical Behavior and Microstructural Characteristics Change of ASTM A-36 Steel Applying Various Heat Treatment." Journal of Materials Science and Engineering, vol. 5, 201.
Hashimoto et al., "The role of corrosion-resistant alloying elements in passivity", Corros. Sci., 2007, 49, 42-52.
Hejazi et al., "Beyond Wenzel and Cassie-Baxter: second-order effects on wetting of rough surfaces." Langmuir 30 (31) (2014) 9423-9.
Hejazi et al., "Wetting Transitions in Underwater Oleophobic Surfaces of Brass," Advance Materials, 2012, vol. 24, Issue 44, pp. 5963-5966.
Hermas, "Microstructure, corrosion, and mechanical properties of 304 stainless steel containing copper, silicon, and nitrogen." Journal of Materials Science, p. 3415-3421, 2001.
Hosmani et al., "An Introduction to Surface Alloying of Metals." Springer Briefs in Manufacturing and Surface Engineering, 2014.
Jeyaprakash et al., "Comparative study of laser melting and pre-placed Ni-20% Cr alloying over nodular iron surface", Arch. Civ. Mech. Eng., 2020, 20 (12 pages).
Jinlong et al., "Surface enriched molybdenum enhancing the corrosion resistance of 316L stainless steel", Mater. Lett., 2016, 171, 38-41.
Jiru et al., "Surface engineered AlMn alloy using laser surface alloying for wear resistance", Int. J. Adv. Manuf. Technol., 2020, 110, 275-281.
Joshi et al., "Tribological Response of Mechanical Attrition Treated Surface of AISI 316L Steel: The Role of Velocity of Colliding Balls", J. Tribol., 2021, 143, 1-15.
Kannatey-Asibu Jr, "Principles of laser materials processing." vol. 4, John Wiley & Sons, 2009.
Kashiwar et al., "Effect of solution annealing temperature on precipitation in 2205 duplex stainless steel", Mater. Charact., 2012, 74, 55-63.
Kawakami et al., "Hardness enhancement by molten metal flow in laser remelting with an ultra-thin additional element coating", J. Mater. Process., 2021, Technol. 288, 116888.
Kilic, "TiC coatings on an alloyed steel produced by thermal diffusion", Mater. Test., 2020, 62, 909-912.

(56) References Cited

OTHER PUBLICATIONS

Ko et al., "One-pot synthesis of manganese oxide-carbon composite microspheres with three dimensional channels for Li-ion batteries", Sci. Rep., 2014, 4, 1-7.
Koerner et al., "The effect of carburization and oxygen exposure on the reaction of carbon monoxide on iron films at 573K under a pressure between 5 and 10 mbar." Applications of Surface Science, vol. 18, Issue 4, 1984.
Krishna Kumar et al., "Microstructure, hardness and wear rate of heat treated Titanium surface alloyed AISI 304 stainless steel", Mater. Today Proc., 2018, 5, 7571-7576.
Lorang, "Chemical Composition of Passive Films on AISI 304 Stainless Steel." Journal of the Electrochemical Society, vol. 141, issue 12, 1994.
Lucci et al. "Experiment and Computational Analysis of Self-Healing in an Aluminum Alloy." 2008 ASME International Mechanical Engineering Congress and Exposition. Boston, MA: AmerSoc Mechanical Engineers. 2008, pp. 1759-1768.
Lucci et al., "Self-healing in an aluminum alloy reinforced with microtubes." Proceedings of Energy Nano08 2008b ASME Turbo Expo, ENIC2008-53011 (2008) pp. 79-88.
Luo et al., "Passivation and electrochemical behavior of 316L stainless steel in chlorinated simulated concrete pore solution", Appl. Surf. Sci., 2017, 400, 38-48.
Mahmoud et al., "Fabrication of SiC particle reinforced composite on an aluminum surface by friction stir processing." Science and Technological Welding and Joining, 2008.
Martin et al., "Effect of alloying elements on hydrogen environment embrittlement of AISI type 304 austenitic stainless steel", Int. J. Hydrogen Energy, 2011, 36, 15888-15898.
Martinez-Lucci et al., "Self-Healing in Metal Castings." American Foundry Society, 2011, 11-51.
Mazumder et al., "Laser Surface Alloying and Cladding for Corrosion and Wear", NATO ASI Ser. Ser. E Appl. Sci., 1986, 7, 297-307.
Menezes et al., "Self-Lubricating Behavior of Graphite-Reinforced Composites." In Tribology for Scientists and Engineers, pp. 341-389. Springer New York, 2013.
Miracle, "Metal matrix composites- from science to technological significance." Composites Science and Technology, vol. 65, Issue 15-16, p. 2526-2540, 2005.
Mishra et al., "Friction stir processing: a novel technique for fabrication of surface composite." Materials Science and Engineering: A., vol. 341, Issues 1-2, p. 307-310, 2003.
Moghadam et al., "Functional Metal Matrix Composites: Self-lubricating, Self-healing, and Nanocomposites—An Outlook." JOM (2014): 1-10.
Nicard et al., "Effect of Zn and Mg alloying on microstructure and anticorrosion mechanisms of Al—Si based coatings for high strength steel", Corros. Sci., 2019, 146, 192-201.
Nickelsen et al., "Modeling and Experimental Study of Oil/Water Contact Angle on Biomimetic Micro-Parallel-Patterned Self-Cleaning Surfaces of Selected Alloys Used in Water Industry" Applied Surface Science (2015), pp. 781-787.
Niinomi et al., "Biomedical titanium alloys with Young's moduli close to that of cortical bone." Regenerative Biomaterials, vol. 3, p. 173-185, 2016.
Nosonovsky et al., "Physical chemistry of self-organization and self-healing in metals." Physical Chemistry Chemical Physics 11, No. 41 (2009): 9530-9536.
Nosonovsky et al., "Metal matrix Composites for sustainable lotus-effect surfaces," Langmuir, 2011, vol. 27, Issue 23, pp. 14419-14424.
Ohmi et al., "Formation of chromium oxide on 316L austenitic stainless steel", J. Vac. Sci. Technol. A vacuum, surfaces, 1996, Film. 14, 2505-2510.
Olaseinde et al., "Characterization and Corrosion Behaviour of Selected Duplex Stainless Steels in Acidic and Acid-Chloride Solution." Advances in Chemical Engineering and Science, vol. 4, No. 1, 2014.
Pelletier et al., "Possibilities and Limitations of Laser Surface Alloying by Melting of Predeposited Layers." Journal de Physique IV Colloque, p. 87-90, 1991.
Pine Research, "Linear Polarization Resistance and Corrosion Rate, Theory and Background." Pine Research, Rev 002, Apr. 2016.
Qingdao Casting Quality Industrial Co., Ltd, "Casting Material: Carbon Steel WCB", 2016 (9 pages).
Rhodes et al., "Effect of friction stir welding on microstructure of 7075 aluminum." Scripta Materialia, p. 69-75, 1997.
Rohatgi et al., "Solidification, Structures, and Properties of Cast Metal-Ceramic Particle Composites," International Metals Review, (USA-UK), vol. 31, No. 3, pp. 115 139, 1986.
Rohatgi et al., Interfaces in Cast Metal Matrix Composites, Materials Science and Engineering, 1993, vol. A162, pp. 163 174.
Rosenberg et al., "Stabilization of Austenitic Stainless Steel." U.S. Department of Commerce, National Bureau of Standards, 1948, vol. 40. 321-338.
Sandmeyer Steel Company, "Specification Sheet: Alloy 304/304L (UNS S30400, S30403)", Philadelphia, PA, 2014 (3 pages).
Sarkar et al., "Transport phenomena in laser surface alloying." Journal of Materials Science, 2003, vol. 38, Issue 1, p. 155-164.
Shamanian et al., "Effects of surface alloying on microstructure and wear behavior of ductile iron", Mater. Des., 2010, 31, 2760-2766.
Sherif, "A Comparative Study on the Electrochemical Corrosion Behavior of Iron and X-65 Steel in 4.0 wt% Sodium Chloride Solution after Different Exposure Intervals." Molecules Open Access, 2014 pp. 9962-9974.
Shim et al., "The properties of AlN prepared by plasma nitriding and plasma source ion implantation techniques." Surface and Coatings Technology, 2000, vol. 131, Issues 1-3 pp. 345-349.
Silverman, D.C. "Corrosion." vol. 37, p. 546-548, 1981.
Singh et al., "Effect of surface alloying on wear behaviour of EN-47 steel", Mater. Today Proc., 2020, 21, 1340-1349.
Singh, V., et al. "Intensified plasma-assisted nitriding of AISI 316L stainless steel." Surface and Coatings Technology 160.2-3 (2002): 249-258.
Sioshansi, "Surface treatment of biomaterials by ion beam process." Surface and Coatings Technology, vol. 83, Issues 1-3, p. 175-182, 1996.
Van Muylder & Pourbaix. , "Magnesium" (Section 4.1) and "Calcium, Strontium & Barium". (Sections 4.3, 4.4 & 4.5) in "Atlas of Electrochemical Equilibrium in Aqueous Solutions." National Association of Corrosion Engineers, Houston, TX, 1974, pp. 139-154.
Yiming et al., "Laser surface alloying on aluminum and its alloys: A review." Optics and Lasers in Engineering, vol. 100, p. 23-37, 2017.
Yu et al., "Tribological and Corrosion Behavior of SiC/Ta X C Bilayer Coatings Prepared on Stainless Steel Surface by Double Glow Plasma Surface Alloying Technique", 2020, Surf. Rev. Lett. 1950229 (12 pages).
Zhang et al., "Surface alloying of chromium/tungsten/stannum on pure nickel and theoretical analysis of strengthening mechanism", Appl. Surf. Sci., 2020, 532, 147477.

* cited by examiner

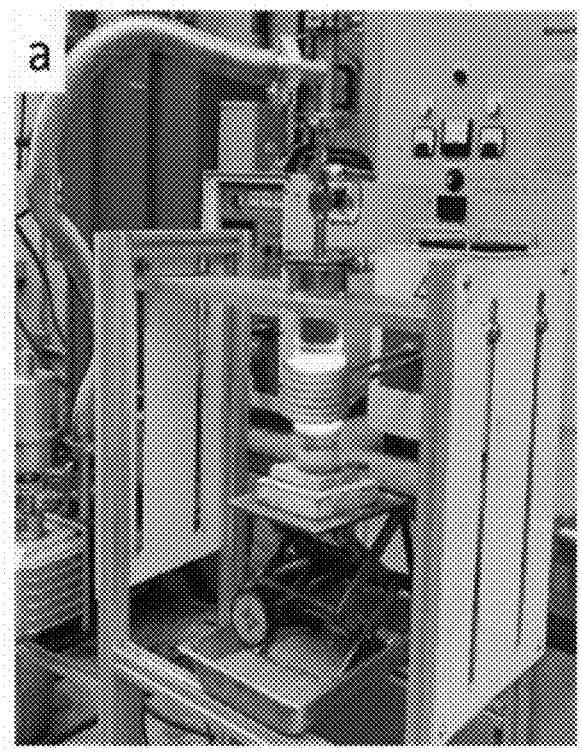 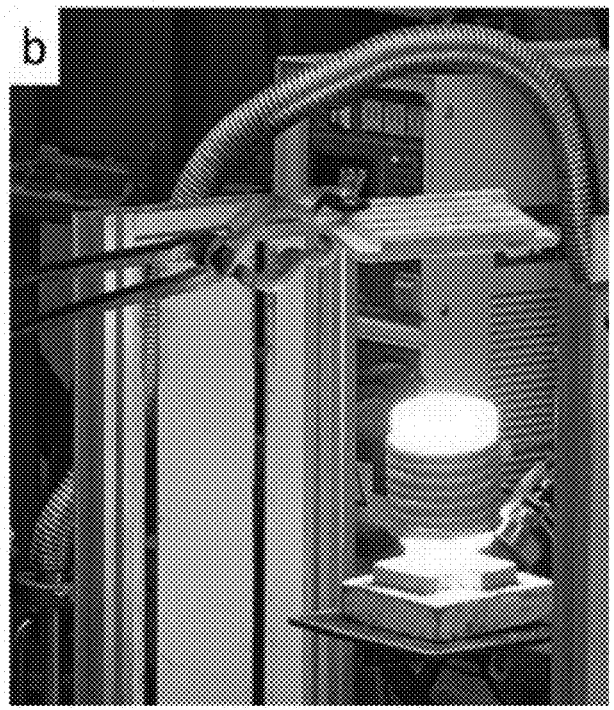
FIG. 22A  FIG. 22B
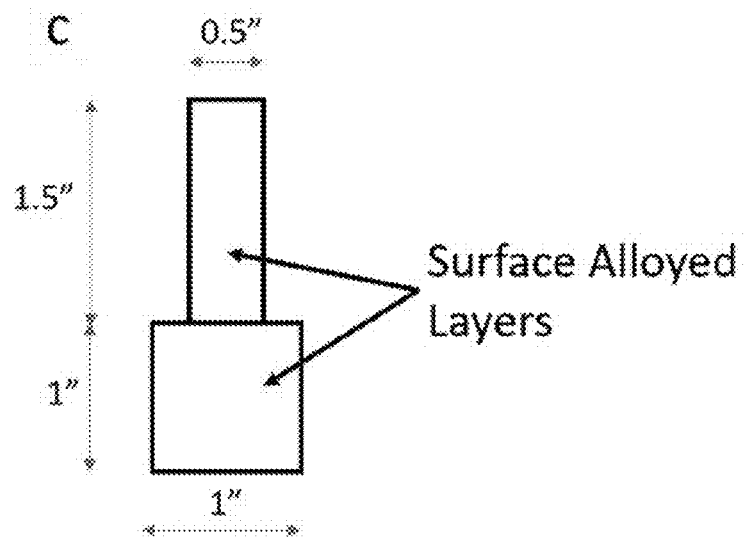
FIG. 22C

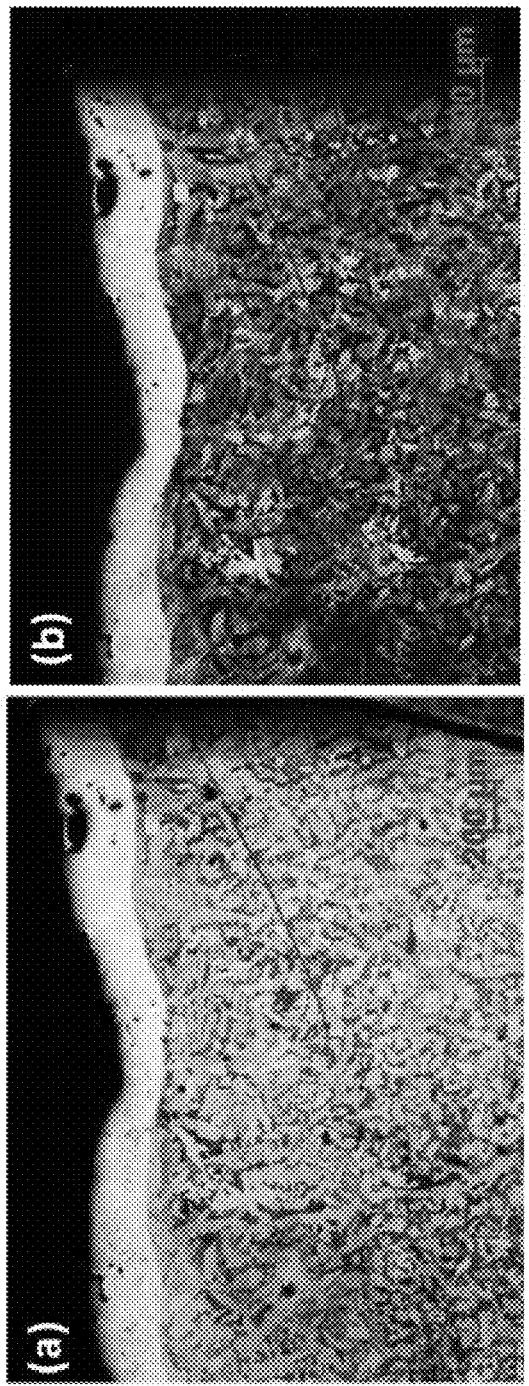
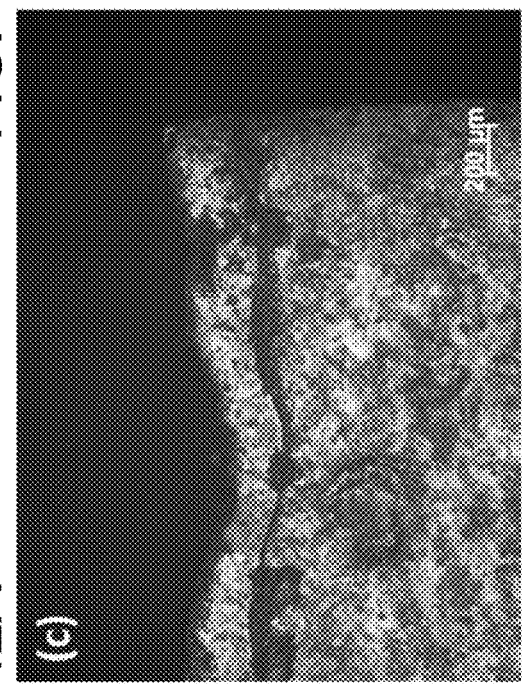
FIG. 42A
FIG. 42B
FIG. 42C

MATERIALS, METHODS AND TECHNIQUES FOR SURFACE ALLOYING SAND CASTED ARTICLES

CROSS-REFERENCE TO RELATED APPLICATIONS

This application claims priority to U.S. Provisional Application No. 63/105,815, filed Oct. 26, 2020, which is hereby incorporated in its entirety.

STATEMENT OF GOVERNMENT INTEREST

This invention was made with government support under grant numbers 1540032 and 0968887 awarded by the National Science Foundation. The government has certain rights in the invention.

TECHNICAL FIELD

The present disclosure relates to surface alloying during sand casting. Exemplary materials, methods and techniques may be particularly suited for steel components.

INTRODUCTION

In the water and wastewater industry, steels including plain carbon and Wrought Carbon Grade B (WCB) grade steel castings are utilized for components such as valves, fittings, flanges, and pump casings. However, mild steel components, such as those used in the water industry, may be subject to wear and corrosion.

SUMMARY

In one aspect, an article is disclosed. The article may comprise a surface alloyed layer, a base metal, and a transitional layer between the surface alloyed layer and the base metal. The surface alloyed layer may comprise chromium (Cr), nickel (Ni), iron (Fe), manganese (Mn), and silicon (Si). The base metal may comprise less than 1 wt % chromium (Cr), less than 1 wt % nickel (Ni), less than 1 wt % manganese (Mn), less than 1 wt % silicon (Si), and the balance iron (Fe). The transitional layer may comprise chromium (Cr), nickel (Ni), iron (Fe), manganese (Mn), silicon (Si), and balance iron (Fe). The article may further comprise an interior surface defining a fluid pathway, the interior surface comprising the surface alloyed layer, the base metal, and the transitional layer. The article may be a component. The component may be a butterfly valve, a check valve, a fitting, a suction diffuser, a basket strainer, or a tube, and other similar components. In other cases, the outer surface of the casting can be surface alloyed.

In another aspect, a method of making an article is disclosed. The method may comprise coating a portion of a sand mold with a metal slurry. The metal slurry may comprise chromium (Cr), nickel (Ni), molybdenum (Mo), ferromanganese (Fe—Mn), and ferrosilicon (Fe—Si) and a binder that is alcohol-based or water-based. The method of manufacturing an article may further comprise pouring a molten steel alloy into the sand mold and removing the article from the sand mold. The method may further comprise removing the article from the mold, and heat treating the article by normalizing and tempering.

Before any embodiments of the disclosure are explained in detail, it is to be understood that the disclosure is not limited in its application to the details of construction and the arrangement of components set forth in the following description or illustrated in the accompanying drawings. The disclosure is capable of other embodiments and of being practiced or of being carried out in various ways.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 6A shows the cross-sectional SEM micrograph for sample N1 (8Ni): surface-alloyed layer.

FIG. 6B shows the cross-sectional SEM micrograph for sample N1 (8Ni): substrate.

FIG. 6C shows the cross-sectional SEM micrograph for sample NC1 (8Ni18Cr): surface-alloyed layer.

FIG. 6D shows the cross-sectional SEM micrograph for sample NC1 (8Ni18Cr): substrate.

FIG. 7A shows the EDS results of NC2 (10Ni10Cr) (area scan).

FIG. 7B shows the EDS results of NC3 (15Ni15Cr) (line scan).

FIG. 7C shows the EDS results of S1 (2SS1000) (area scan).

FIG. 7D shows the EDS results of S2 (4SS1000) (area scan).

FIG. 8A shows the XRD peaks for the surface of sample NC1 (8Ni18Cr). FIG. 8B shows the XRD peaks for the CF3 stainless steel alloy.

FIG. 11A shows the bare surface coated with zircon.

FIG. 11B shows the bare multi-element powder-coated mold surface using sodium polyacrylate.

FIG. 11C shows the clean surface coated with zircon.

FIG. 11D shows the clean multi-element powder-coated mold surface using sodium polyacrylate.

FIGS. 22A-22C show the experimental setup used for casting lab-scale surface alloyed samples.

FIG. 22A shows the Quartz tube setup used for samples R1-R5.

FIG. 22B shows the open pour setup used for sample R6-R12.

FIG. 22C shows the schematic of a typical surface alloyed casting from the open pour experiments.

FIG. 42A shows a portion of the surface alloyed layer and base metal of SA2 before heat quench test.

FIG. 42B shows a portion of the surface alloyed layer and base metal of SA2 after heat/quench test at 200° C. There was no exfoliation of the surface alloyed layer.

FIG. 42C shows a portion of the surface alloyed layer and base metal of SA2 after heat/quench test at 800° C.

DETAILED DESCRIPTION

Figure 1:
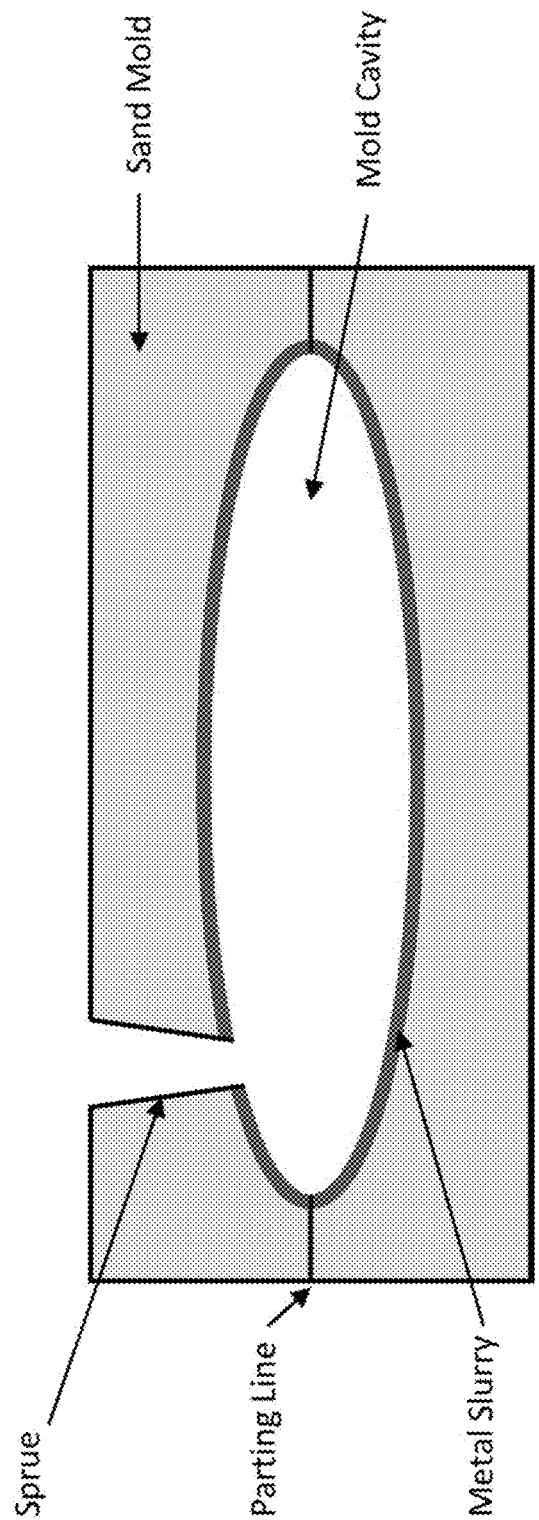
FIG. 1 shows a schematic diagram of the sand mold with the alloying powder slurry applied on the inner surface of the mold cavity. The alloying slurry is a combination of the alloying powders and the binder medium.

Exemplary materials, methods and techniques disclosed and contemplated herein generally relate to surface alloying of steel compositions. In some instances, surface alloying may impart one or more improved properties of manufactured components. Exemplary manufactured components may be particularly suited for use in water-related applications. Broadly, exemplary articles disclosed herein may comprise a surface alloyed layer, a base metal comprising a steel, and a transitional layer between the surfaced alloyed layer and the base metal. Exemplary surface alloyed layers may comprise nickel (Ni), chromium (Cr), manganese (Mn), molybdenum (Mo), silicon (Si), or combinations thereof.

I. DEFINITIONS

Unless otherwise defined, all technical and scientific terms used herein have the same meaning as commonly understood by one of ordinary skill in the art. In case of conflict, the present document, including definitions, will control. Methods and materials are described below, although methods and materials similar or equivalent to those described herein can be used in practice or testing of the present disclosure. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

As used herein, the term "about" is used to indicate that exact values are not necessarily attainable. Therefore, the term "about" is used to indicate this uncertainty limit. The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5-1.4. The modifier "about" should also be considered as disclosing the range defined by the absolute values of the two endpoints. For example, the expression "from about 2 to about 4" also discloses the range "from 2 to 4."

For the recitation of numeric ranges herein, each intervening number there between with the same degree of precision is contemplated. For example, for the range of 6-9, the numbers 7 and 8 are contemplated in addition to 6 and 9, and for the range 6.0-7.0, the numbers 6.0, 6.1, 6.2, 6.3, 6.4, 6.5, 6.6, 6.7, 6.8, 6.9, and 7.0 are contemplated. For another example, when a pressure range is described as being between ambient pressure and another pressure, a pressure that is ambient pressure is expressly contemplated.

II. EXAMPLE COMPOSITIONS

Steel castings of the present disclosure may be prepared with a metal slurry and a molten steel alloy. Various aspects of exemplary metal slurries and molten steel alloys are discussed in the following sections.

A. Exemplary Metal Slurries

Exemplary metal slurries of the present disclosure comprise various surface alloying elements and a binder.

1. Exemplary Surface Alloying Elements

Exemplary metal slurries may comprise suitable surface alloying elements, such as chromium (Cr), nickel (Ni), iron (Fe), manganese (Mn), silicon (Si), molybdenum (Mo), and combinations thereof. Other suitable elements may include titanium (Ti), tin (Sn), cobalt (Co), calcium (Ca), tungsten (W), selenium (Se), niobium (Nb), vanadium (V), and combinations thereof. Various slurry elements may be introduced as a metal (e.g., Cr, Ni, Fe), or as a ferroalloy powder (e.g., ferromanganese (Fe—Mn) or ferrosilicon (Fe—Si)).

Typically, exemplary metal slurries comprise 0.1 to 35 weight percent (wt %) chromium (Cr). In various instances, exemplary metal slurries may comprise 0.1 wt % to 30 wt % Cr; 0.5 wt % to 25 wt % Cr; 0.5 wt % to 20 wt % Cr; 1 wt % to 15 wt % Cr; or 1 wt % to 10 wt % Cr. In various instances, exemplary metal slurries may comprise no greater than 35 wt % Cr; no greater than 30 wt % Cr; no greater than 25 wt % Cr; no greater than 20 wt % Cr; no greater than 15 wt % Cr; no greater than 10 wt % Cr; no greater than 5 wt % Cr; or no greater than 1 wt % Cr. In various instances, exemplary metal slurries may comprise no less than 0.1 wt % Cr; no less than 0.2 wt % Cr; no less than 0.3 wt % Cr; no less than 0.4 wt % Cr; no less than 0.5 wt % Cr; no less than 1 wt % Cr; no less than 5 wt % Cr; no less than 10 wt % Cr; no less than 15 wt % Cr; no less than 20 wt % Cr; no less than 25 wt % Cr; or no less than 30 wt % Cr.

Typically, exemplary metal slurries comprise 0.1 wt % to 20 wt % nickel (Ni). In various instances, exemplary metal slurries may comprise no greater than 20 wt % Ni; no greater than 15 wt % Ni; no greater than 10 wt % Ni; no greater than 5 wt % Ni; or no greater than 1 wt % Ni. In various instances, exemplary metal slurries may comprise no greater than 20 wt % Ni; no greater than 15 wt % Ni; no greater than 10 wt % Ni; no greater than 5 wt % Ni; no greater than 1 wt % Ni. In various instances, exemplary metal slurries may comprise no less than 0.1 wt % Ni; no less than 0.2 wt % Ni; no less than 0.3 wt % Ni; no less than 0.4 wt % Ni; no less than 0.5 wt % Ni; no less than 1 wt % Ni; no less than 5 wt % Ni; no less than 10 wt % Ni; no less than 15 wt % Ni; no less than 20 wt % Ni; no less than 25 wt % Ni; or no less than 30 wt % Ni.

Typically, exemplary metal slurries comprise 0.1 wt % to 20 wt % iron (Fe). In various instances, exemplary metal slurries may comprise no greater than 20 wt % Fe; no greater than 15 wt % Fe; no greater than 10 wt % Fe; no greater than 5 wt % Fe; or no greater than 1 wt % Fe. In various instances, exemplary metal slurries may comprise no less than 0.1 wt % Fe; no less than 0.2 wt % Fe; no less than 0.3 wt % Fe; no less than 0.4 wt % Fe; no less than 0.5 wt % Fe; no less than 1 wt % Fe; no less than 5 wt % Fe; no less than 10 wt % Fe; no less than 15 wt % Fe; no less than 20 wt % Fe; no less than 25 wt % Fe; or no less than 30 wt % Fe.

Typically, exemplary metal slurries comprise 0.1 wt % to 20 wt % manganese (Mn). In various instances, exemplary metal slurries may comprise no greater than 20 wt % Mn; no greater than 15 wt % Mn; no greater than 10 wt % Mn; no greater than 5 wt % Mn; or no greater than 1 wt % Mn. In various instances, exemplary metal slurries of the present disclosure comprises no less than 0.1 wt % Mn; no less than 0.2 wt % Mn; no less than 0.3 wt % Mn; no less than 0.4 wt % Mn; no less than 0.5 wt % Mn; no less than 1 wt % Mn; no less than 5 wt % Mn; no less than 10 wt % Mn; no less than 15 wt % Mn; no less than 20 wt % Mn; no less than 25 wt % Mn; or no less than 30 wt % Mn.

Typically, exemplary metal slurries comprise 0.1 wt % to 10 wt % silicon (Si). In various instances, exemplary metal slurries may comprise 0.1 wt % to 9 wt % Si; 0.1 wt % to 8 wt % Si; 0.5 wt % to 7 wt % Si; 0.5 wt % to 6 wt % Si; or 1 wt % to 5 wt % Si. In various instances, exemplary metal slurries comprises no greater than 10 wt % Si; no greater than 9 wt % Si; no greater than 7 wt % Si; no greater than 5 wt % Si; no greater than 3 wt % Si; no greater than 1 wt % Si. In various instances, exemplary metal slurries may comprise no less than 0.1 wt % Si; no less than 0.2 wt % Si; no less than 0.3 wt % Si; no less than 0.4 wt % Si; no less than 0.5 wt % Si; or no less than 1 wt % Si; no less than 5 wt % Si; no less than 10 wt % Si; no less than 15 wt % Si; no less than 20 wt % Si; no less than 25 wt % Si; or no less than 30 wt % Si.

Exemplary metal slurries may further comprise 0.1 wt % to 10 wt % molybdenum (Mo). In various instances, exemplary metal slurries may comprise 0.1 wt % to 9 wt % Mo; 0.1 wt % to 8 wt % Mo; 0.5 wt % to 7 wt % Mo; 0.5 wt % to 6 wt % Mo; or 1 wt % to 5 wt % Mo. In various instances, exemplary metal slurries comprise no greater than 10 wt % Mo; no greater than 9 wt % Mo; no greater than 7 wt % Mo; no greater than 5 wt % Mo; no greater than 3 wt % Mo; or no greater than 1 wt % Mo. In various instances, exemplary metal slurries may comprise no less than 0.1 wt % Mo; no less than 0.2 wt % Mo; no less than 0.3 wt % Mo; no less than 0.4 wt % Mo; no less than 0.5 wt % Mo; no less than 1 wt % Mo; no less than 5 wt % Mo; no less than 10 wt % Mo; no less than 15 wt % Mo; no less than 20 wt % Mo; no less than 25 wt % Mo; or no less than 30 wt % Mo.

Exemplary metal slurries may further comprise 0.01 wt % to 30 wt % copper (Cu). In various instances, exemplary metal slurries may comprise 0.5 wt % to 30 wt % Cu; 1 wt % to 25 wt % Cu; 1 wt % to 20 wt % Cu; 5 wt % to 20 wt % Cu; or 5 to 15 wt % Cu. In various instances, exemplary metal slurries comprise no greater than 30 wt % Cu; no greater than 25 wt % Cu; no greater than 20 wt % Cu; no greater than 15 wt % Cu; no greater than 10 wt % Cu; no greater than 5 wt % Cu; no greater than 1 wt %; or no greater than 0.5 wt %. In various instances, exemplary metal slurries may comprise no less than 0.01 wt % Cu; no less than 0.5 wt % Cu; no less than 1 wt % Cu; no less than 5 wt % Cu; no less than 10 wt % Cu; no less than 15 wt % Cu; no less than 10 wt % Cu; or no less than 5 wt % Cu.

In some instances, example metal slurries may include one or more incidental elements and/or impurities. Incidental elements and impurities may be present in example metal slurries in amounts totaling no more than 0.1 wt %, no more than 0.05 wt %, no more than 0.01 wt %, or no more than 0.001 wt %.

2. Exemplary Binders

Exemplary metal slurries may comprise one or more binders, such as alcohol-based binders and water-based binders.

In some instances, the binder may be an alcohol-based binder. Exemplary alcohols usable with binders typically evaporate easily and/or are flammable. The alcohol-based binder may comprise methanol, ethanol, isopropyl alcohol, or combinations thereof. A commercially available example of an alcohol-based binder is Refcohol 1010 (source: REFCOTEC, Orrville, OH USA). In some instances, exemplary binders may comprise a refractory powder. The refractory powder may be Zirconia powder.

In other instances, the binder may be a water-based binder. The water-based binder may comprise sodium polyacrylate. The water-based binder may be REFCOBAR 1010 Gel.

Exemplary metal slurries may comprise between 5 wt % and 40 wt % binder. Typically, exemplary metal slurries comprise between 5 wt % and 35 wt % binder. In various instances, exemplary metal slurries may comprise between 5 wt % and 30 wt % binder; between 10 wt % and 25 wt % binder; between 10 wt % and 20 wt % binder; or between 15 wt % and 20 wt % binder. In various instances, exemplary metal slurries may comprise no greater than 35 wt % binder; no greater than 30 wt % binder, no greater than 25 wt % binder; or no greater than 20 wt % binder. In various instances, exemplary metal slurries may comprise no less than 5 wt % binder; no less than 6 wt % binder; no less than 7 wt % binder; no less than 8 wt % binder; no less than 9 wt % binder; or no less than 10 wt % binder.

B. Molten Steel Alloys

In various instances, exemplary molten steel alloys may comprise WCB grade steel. The WCB grade steel may be ASTM A216 grade B steel. In other instances, low carbon, medium carbon and high carbon steels can also be used.

The molten steel alloys of the present disclosure may comprise various elements, such as one or more of: carbon (C), manganese (Mn), copper (Cu), nickel (Ni), chromium (Cr), and iron (Fe).

Typically, the molten steel alloys of the present disclosure comprise less than 0.5 wt % carbon (C). In various instances, the molten steel alloy may comprise less than 0.45 wt % carbon; less than 0.4 wt % carbon; less than 0.3 wt % carbon; less than 0.2 wt % carbon; less than 0.1 wt % carbon; less than 0.01 wt % carbon; or less than 0.001 wt % carbon.

Typically, the molten steel alloys of the present disclosure comprise less than 1 wt % manganese (Mn). In various instances, the molten steel alloy may comprise less than 0.9 wt % Mn; less than 0.8 wt % Mn; less than 0.7 wt % Mn; less than 0.6 wt % Mn; less than 0.5 wt % Mn; less than 0.4 wt % Mn; less than 0.3 wt % Mn; less than 0.2 wt % Mn; less than 0.1 wt % Mn; less than 0.01 wt % Mn; or less than 0.001 wt % Mn.

Typically, the molten steel alloys of the present disclosure comprise less than 0.5 wt % copper (Cu). In various instances, the molten steel alloy may comprise less than 0.45 wt % Cu; less than 0.4 wt % Cu; less than 0.3 wt % Cu; less than 0.2 wt % Cu; less than 0.1 wt % Cu; less than 0.01 wt % Cu; or less than 0.001 wt % Cu.

Typically, the molten steel alloys of the present disclosure comprise less than 1 wt % nickel (Ni). In various instances, the molten steel alloy may comprise less than 0.9 wt % Ni; less than 0.8 wt % Ni; less than 0.7 wt % Ni; less than 0.6 wt % Ni; less than 0.5 wt % Ni; less than 0.4 wt % Ni; less than 0.3 wt % Ni; less than 0.2 wt % Ni; less than 0.1 wt % Ni; less than 0.01 wt % Ni; or less than 0.001 wt % Ni.

Typically, the molten steel alloys of the present disclosure comprise less than 1 wt % chromium (Cr). In various instances, the molten steel alloy may comprise less than 0.9 wt % Cr; less than 0.8 wt % Cr; less than 0.7 wt % Cr; less than 0.6 wt % Cr; less than 0.5 wt % Cr; less than 0.4 wt % Cr; less than 0.3 wt % Cr; less than 0.2 wt % Cr; less than 0.1 wt % Cr; less than 0.01 wt % Cr; or less than 0.001 wt % Cr.

III. EXAMPLE ARTICLES OF MANUFACTURE

Exemplary articles of manufacture of the present disclosure comprise a surface alloyed layer, a steel base metal, and a transitional layer disposed between the surface alloyed layer and the steel base metal. Various aspects of exemplary steel castings and steel components are discussed in the following sections.

A. Steel Casting
1. Exemplary Surface Alloyed Layers

Surface alloyed layers of exemplary steel castings may comprise suitable surface alloying elements, such as chromium (Cr), nickel (Ni), iron (Fe), manganese (Mn), silicon (Si), molybdenum (Mo), and combinations thereof. Other suitable elements may include titanium (Ti), tin (Sn), cobalt (Co), calcium (Ca), tungsten (W), selenium (Se), niobium (Nb), vanadium (V), and combinations thereof.

Typically, exemplary surface alloyed layers comprise 0.1 to 35 weight percent (wt %) chromium (Cr). In various instances, exemplary surface alloyed layers may comprise 0.1 wt % to 30 wt % Cr; 0.5 wt % to 25 wt % Cr; 0.5 wt % to 20 wt % Cr; 1 wt % to 15 wt % Cr; or 1 wt % to 10 wt % Cr. In various instances, exemplary surface alloyed layers may comprise no greater than 35 wt % Cr; no greater than 30 wt % Cr; no greater than 25 wt % Cr; no greater than 20 wt % Cr; no greater than 15 wt % Cr; no greater than 10 wt % Cr; no greater than 5 wt % Cr; or no greater than 1 wt % Cr. In various instances, exemplary surface alloyed layers may comprise no less than 0.1 wt % Cr; no less than 0.2 wt % Cr; no less than 0.3 wt % Cr; no less than 0.4 wt % Cr; no less than 0.5 wt % Cr; no less than 1 wt % Cr; no less than 5 wt % Cr; no less than 10 wt % Cr; no less than 15 wt % Cr; no less than 20 wt % Cr; no less than 25 wt % Cr; or no less than 30 wt % Cr.

Typically, exemplary surface alloyed layers comprise 0.1 wt % to 20 wt % nickel (Ni). In various instances, exemplary surface alloyed layers may comprise no greater than 20 wt % Ni; no greater than 15 wt % Ni; no greater than 10 wt % Ni; no greater than 5 wt % Ni; or no greater than 1 wt % Ni. In various instances, exemplary surface alloyed layers may comprise no less than 0.1 wt % Ni; no less than 0.2 wt % Ni; no less than 0.3 wt % Ni; no less than 0.4 wt % Ni; no less than 0.5 wt % Ni; no less than 1 wt % Ni; no less than 5 wt % Ni; no less than 10 wt % Ni; no less than 15 wt % Ni; no less than 20 wt % Ni; no less than 25 wt % Ni; or no less than 30 wt % Ni.

Typically, exemplary surface alloyed layers comprise 0.1 wt % to 20 wt % iron (Fe). In various instances, exemplary surface alloyed layers may comprise 0.1 wt % to 15 wt % Fe; 0.1 wt % to 10 wt % Fe; 0.5 wt % to 5 wt % Fe; or 0.5 wt % to 1 wt % Fe. In various instances, exemplary surface alloyed layers may comprise no greater than 20 wt % Fe; no greater than 15 wt % Fe; no greater than 10 wt % Fe; no greater than 5 wt % Fe; or no greater than 1 wt % Fe. In various instances, exemplary surface alloyed layers may comprise no less than 0.1 wt % Fe; no less than 0.2 wt % Fe; no less than 0.3 wt % Fe; no less than 0.4 wt % Fe; no less than 0.5 wt % Fe; no less than 1 wt % Fe; no less than 5 wt % Fe; no less than 10 wt % Fe; no less than 15 wt % Fe; no less than 20 wt % Fe; no less than 25 wt % Fe; or no less than 30 wt % Fe.

Typically, exemplary surface alloyed layers comprise 0.1 wt % to 20 wt % manganese (Mn). In various instances, exemplary surface alloyed layers may comprise 0.1 wt % to 15 wt % Mn; 0.1 wt % to 10 wt % Mn; 0.5 wt % to 5 wt % Mn; or 0.5 wt % to 1 wt % Mn. In various instances, exemplary surface alloyed layers may comprise no greater than 20 wt % Mn; no greater than 15 wt % Mn; no greater than 10 wt % Mn; no greater than 5 wt % Mn; or no greater than 1 wt % Mn. In various instances, exemplary surface alloyed layers may comprise no less than 0.1 wt % Mn; no less than 0.2 wt % Mn; no less than 0.3 wt % Mn; no less than 0.4 wt % Mn; no less than 0.5 wt % Mn; no less than 1 wt % Mn; no less than 5 wt % Mn; no less than 10 wt % Mn; no less than 15 wt % Mn; no less than 20 wt % Mn; no less than 25 wt % Mn; or no less than 30 wt % Mn.

Typically, exemplary surface alloyed layers comprise 0.1 wt % to 10 wt % silicon (Si). In various instances, exemplary surface alloyed layers may comprise 0.1 wt % to 9 wt % Si; 0.1 wt % to 8 wt % Si; 0.5 wt % to 7 wt % Si; 0.5 wt % to 6 wt % Si; or 1 wt % to 5 wt % Si. In various instances, exemplary surface alloyed layers may comprise no greater than 10 wt % Si; no greater than 9 wt % Si; no greater than 7 wt % Si; no greater than 5 wt % Si; no greater than 3 wt % Si; or no greater than 1 wt % Si. In various instances, exemplary surface alloyed layers may comprise no less than 0.1 wt % Si; no less than 0.2 wt % Si; no less than 0.3 wt % Si; no less than 0.4 wt % Si; no less than 0.5 wt % Si; no less than 1 wt % Si; no less than 5 wt % Si; no less than 10 wt % Si; no less than 15 wt % Si; no less than 20 wt % Si; no less than 25 wt % Si; or no less than 30 wt % Si.

Exemplary surface alloyed layers may further comprise 0.1 wt % to 10 wt % molybdenum (Mo). In various instances, exemplary surface alloyed layers may comprise 0.1 wt % to 9 wt % Mo; 0.1 wt % to 8 wt % Mo; 0.5 wt % to 7 wt % Mo; 0.5 wt % to 6 wt % Mo; or 1 wt % to 5 wt % Mo. In various instances, exemplary surface alloyed layers may comprise no greater than 10 wt % Mo; no greater than 9 wt % Mo; no greater than 7 wt % Mo; no greater than 5 wt % Mo; no greater than 3 wt % Mo; or no greater than 1 wt % Mo. In various instances, exemplary surface alloyed layers may comprise no less than 0.1 wt % Mo; no less than 0.2 wt % Mo; no less than 0.3 wt % Mo; no less than 0.4 wt % Mo; no less than 0.5 wt % Mo; no less than 1 wt % Mo; no less than 5 wt % Mo; no less than 10 wt % Mo; no less than 15 wt % Mo; no less than 20 wt % Mo; no less than 25 wt % Mo; or no less than 30 wt % Mo.

In various instances, exemplary surface alloyed layers may further comprise 0.01 wt % to 30 wt % copper (Cu). In various instances, exemplary surface alloyed layers may comprise 0.5 wt % to 30 wt % Cu; 1 wt % to 25 wt % Cu; 1 wt % to 20 wt % Cu; 5 wt % to 20 wt % Cu; or 5 to 15 wt % Cu. In various instances, exemplary surface alloyed layers may comprise no greater than 30 wt % Cu; no greater than 25 wt %; no greater than 20 wt %; no greater than 15 wt %; no greater than 10 wt %; no greater than 5 wt %; no greater than 1 wt %; or no greater than 0.5 wt %. In various instances, exemplary surface alloyed layers may comprise no less than 0.01 wt % Cu; no less than 0.5 wt % Cu; no less than 1 wt % Cu; no less than 5 wt % Cu; no less than 10 wt % Cu; no less than 15 wt % Cu.; no less than 20 wt % Cu; or no less than 25 wt % Cu.

Additionally, in various instances, exemplary surface alloyed layers may further comprise the balance iron and incidental elements and impurities.

Exemplary surface alloyed layers may have a thickness of about 10 nm to about 10,000 µm. In various instances, exemplary surface alloyed layers may have a thickness of about 100 nm to about 10,000 µm. In various instances, exemplary surface alloyed layers may have a thickness of about 1 µm to 10,000 µm; 25 µm to 5,000 µm; 50 µm to 2,500 µm; or 100 µm to 1,000 µm. In various instances, exemplary surface alloyed layers may have a thickness of no greater than 10,000 µm; no greater than 9,000 µm; no greater than 8,000 µm; no greater than 7,000 µm; no greater than 6,000 µm; no greater than 5,000 µm; no greater than 4,000 µm; no greater than 3,000 µm; no greater than 2,000 µm; or no greater than 1,000 µm. In various instances, exemplary surface alloyed layers may have a thickness of no less than 10 nm; no less than 100 nm; no less than 1 µm; no less than 10 µm; no less than 20 µm; no less than 30 µm; no less than 40 µm; no less than 50 µm; no less than 60 µm; no less than 70 µm; no less than 80 µm; no less than 90 µm; or no less than 100 µm.

2. Exemplary Steel Base Metals

Typically, exemplary base metals of exemplary steel castings comprise a steel base metal. The steel base metal may comprise a mild steel (e.g., plain carbon WCB grade steel).

In various instances, the base metal comprises a mild steel. In various instances, the base metal comprises WCB grade steel. In various instances, the steel may comprise ASTM A216 grade B steel.

Elements present in the base metal may include chromium (Cr), nickel (Ni), manganese (Mn), silicon (Si), balance iron (Fe), and incidental elements and impurities.

Typically, the base metal comprises less than 1 wt % chromium (Cr). In various instances, the base metal may comprise less than 0.9 wt % Cr; less than 0.8 wt % Cr; less than 0.7 wt % Cr; less than 0.6 wt % Cr; less than 0.5 wt % Cr; less than 0.4 wt % Cr; less than 0.3 wt % Cr; less than 0.2 wt % Cr; less than 0.1 wt % Cr; less than 0.01 wt % Cr; or less than 0.001 wt % Cr.

Typically, the base metal comprises less than 1 wt % nickel (Ni). In various instances, the base metal may comprise less than 0.9 wt % Ni; less than 0.8 wt % Ni; less than 0.7 wt % Ni; less than 0.6 wt % Ni; less than 0.5 wt % Ni; less than 0.4 wt % Ni; less than 0.3 wt % Ni; less than 0.2 wt % Ni; less than 0.1 wt % Ni; less than 0.01 wt % Ni; or less than 0.001 wt % Ni.

Typically, the base metal comprises less than 1 wt % manganese (Mn). In various instances, the base metal may comprise less than 0.9 wt % Mn; less than 0.8 wt % Mn; less than 0.7 wt % Mn; less than 0.6 wt % Mn; less than 0.5 wt % Mn; less than 0.4 wt % Mn; less than 0.3 wt % Mn; less than 0.2 wt % Mn; less than 0.1 wt % Mn; less than 0.01 wt % Mn; or less than 0.001 wt % Mn.

Typically, the base metal comprises less than 1 wt % silicon (Si). In various instances, the base metal may comprise less than 0.9 wt % Si; less than 0.8 wt % Si; less than 0.7 wt % Si; less than 0.6 wt % Si; less than 0.5 wt % Si; less than 0.4 wt % Si; less than 0.3 wt % Si; less than 0.2 wt % Si; less than 0.1 wt % Si; less than 0.01 wt % Si; or less than 0.001 wt % Si.

3. Exemplary Transitional Layers

Steel castings of the present disclosure may further comprise a transitional layer between the surface alloyed layer and the base metal.

Elements present in the transition layer may include chromium (Cr), nickel (Ni), manganese (Mn), silicon (Si), Molybdenum (Mo), balance iron, incidental elements and impurities, or combinations thereof.

B. Exemplary Articles of Manufacture

Exemplary manufactured articles comprising steel castings of the present disclosure may comprise an interior surface defining a cavity or fluid pathway through the article. Exemplary interior surfaces comprise surface alloyed layers, base metals, and transitional layers as discussed in greater detail above. Exemplary steel articles include components such as water valves, pump casings, butterfly valves, check-valves, fittings, suction diffusers, basket strainers, and tubes.

IV. EXEMPLARY MANUFACTURING SYSTEMS FOR STEEL CASTING

FIG. 1 shows a schematic illustration of an exemplary sand mold that may be used for steel casting as described herein. As shown, the sand mold as assembled comprises a top portion and a bottom portion, which interface at the parting line. The sand mold defines a mold cavity, which may have various shapes depending on desired geometries of resulting articles of manufacture. During operation, metal slurry may be deposited as shown schematically in FIG. 1 on a surface defining the sand mold cavity. Molten steel alloy may be poured through the sprue.

In some instances, exemplary manufacturing systems may further comprise a sand core, not shown in FIG. 1. The sand core may be positioned within the sand mold cavity. The sand core may be selected based on the desired geometry of the article to be manufactured. For instance, a cylindrical core or a spherical core may be selected for manufacturing articles comprising a fluid pathway.

An exemplary manufacturing system may further comprise heating equipment that may be used for manufacturing operations that require elevated temperatures. Exemplary manufacturing operations that may require elevated temperatures include melting (e.g., melting metal alloy to form molten steel alloy), drying, normalizing, tempering, and/or solution annealing.

V. EXAMPLE METHODS OF MANUFACTURE

Exemplary steel casting methods may comprise coating a sand mold with a metal slurry, pouring the molten steel alloy onto the coated sand mold, removing the article from the mold, and heat-treating the article. Various aspects of exemplary steel casting methods are discussed below.

A. Coating Sand Mold

Typically, steel casting methods comprise applying a metal slurry on a portion of a sand mold. Prior to applying the metal slurry, a refractory wash may be applied to the mold cavity. Exemplary refractory washes are described above and may comprise zirconia.

Exemplary metal slurries may be prepared by combining the surface alloying elements, including, nickel (Ni), chromium (Cr), ferromanganese (Fe—Mn), ferrosilicon (Fe—Si), and the binder. More than one layer of the metal slurry may be applied to various portions of the sand mold. The method may further comprise applying the metal slurry on a portion of a sand core that is, or will be, positioned within the sand mold cavity.

In various instances, a thin layer of binder may be applied to the sand mold before applying the metal slurry. For instance, a layer of binder may be applied and then powder is sprinkled onto the binder. As another example, the binder and powders may be mixed and the resulting slurry may be applied on the mold surface. Methods of applying the metal slurry may include methods such as flow-coating, spray-coating, dipping, or brush-coating.

B. Drying

Typically, steel casting methods of the present disclosure comprise drying the slurry-coated molds after applying the metal slurry on a portion of the sand mold. The coated mold may be dried by methods such as air drying or low-temperature furnace drying.

Typically, the drying temperature is between 30° C. and 110° C. In various instances, the drying temperature may be between 35° C. and 105° C.; between 40° C. and 100° C.; between 45° C. and 95° C.; between 50° C. and 90° C.; between 55° C. and 85° C.; between 60° C. and 80° C.; or between 65° C. and 75° C. In various instances, the drying temperature is no greater than 105° C.; no greater than 100° C.; no greater than 95° C.; no greater than 90° C.; no greater than 85° C.; no greater than 80° C.; or no greater than 75° C. In various instances, the drying temperature is no less than 35° C.; no less than 40° C.; no less than 45° C.; no less than 50° C.; no less than 55° C.; no less than 60° C.; or no less than 65° C. In various instances, the drying temperature is 70° C.

Drying times for the slurry may vary depending upon a thickness of the applied slurry. Typically, the drying time period is between 15 minutes and 150 minutes. In various instances, the drying time period is between 20 minutes and 140 minutes; between 25 minutes and 120 minutes; between 30 minutes and 100 minutes; between 35 minutes and 95 minutes; between 40 minutes and 90 minutes; or between 45 minutes and 85 minutes. In various instances, the drying time period is no greater than 140 minutes; no greater than 120 minutes; no greater than 100 minutes; no greater than 95 minutes; no greater than 90 minutes; or no greater than 85 minutes. In various instances, the drying time period is no less than 15 minutes; no less than 20 minutes; no less than 25 minutes; no less than 30 minutes; no less than 35 minutes; no less than 40 minutes; or no less than 45 minutes.

C. Pouring Molten Steel

Typically, steel casting methods of the present disclosure comprise pouring the molten steel alloy into the coated sand mold after the two parts of the mold are closed. The pouring of the molten steel alloy into the coated sand mold may form the fluid pathway or cavity of the article.

Typically, the temperature of the molten steel alloy during pouring is between 1460° C. and 1860° C. In various instances, the pouring temperature is between 1600° C. and 1850° C.; between 1610° C. and 1840° C.; between 1620° C. and 1830° C.; between 1630° C. and 1820° C.; between 1640° C. and 1810° C.; between 1650° C. and 1800° C.; or between 1660° C. and 1790° C. In various instances, the pouring temperature is no greater than 1850° C.; no greater than 1840° C.; no greater than 1830° C.; no greater than 1820° C.; no greater than 1810° C.; no greater than 1800° C.; or no greater than 1790° C. In various instances, the pouring temperature is no less than 1580° C.; no less than 1600° C.; no less than 1610° C.; no less than 1620° C.; no less than 1630° C.; no less than 1640° C.; no less than 1650° C.; or no less than 1660° C. In various instances, the pouring temperature may be 1760° C.

D. Article Removal

Once pouring the molten steel alloy into the coated sand mold has completed, the article may be left for cooling as the article solidifies. After cooling, the article may be removed from the mold, which may include breaking the sand mold around the casting.

E. Heat Treatment

Typically, steel casting methods of the present disclosure comprise heat-treating the article after removing the article from the mold. Heat-treatment typically comprises normalizing, tempering, solution annealing or combinations thereof.

1. Normalizing

In various instances, steel casting methods of the present disclosure may comprise heat treating the article by normalizing. Normalizing is a heat treatment process where the environment surrounding the article is heated to a predetermined elevated temperature, held at that temperature for a certain period of time, and then the material is permitted to cool to room temperature.

Typically, for exemplary steel casting methods the normalizing temperature is between 850° C. and 950° C. In various instances, the normalizing temperature is between 860° C. and 940° C.; between 870° C. and 930° C.; between 880° C. and 920° C.; between 890° C. and 910° C.; or between 895° C. and 905° C. In various instances, the normalizing temperature is no greater than 940° C.; no greater than 930° C.; no greater than 920° C.; no greater than 910° C.; or no greater than 905° C. In various instances, the normalizing temperature is no less than 860° C.; no less than 870° C.; no less than 880° C.; no less than 890° C.; or no less than 895° C. In various instances, the normalizing temperature may be 898° C.

Typically, the normalizing time period is 60 minutes per inch thickness. The normalizing time period may be adjusted based on the casting composition. In various instances, the normalizing time period may be between 20 minutes and 100 minutes per inch thickness; between 30 minutes and 90 minutes per inch thickness; between 40 minutes and 80 minutes per inch thickness; or between 50 minutes and 70 minutes per inch thickness. In various instances, the normalizing time period may be no greater than 100 minutes per inch thickness; no greater than 90 minutes per inch thickness; no greater than 80 minutes; or no greater than 70 minutes. In various instances, the normalizing time period may be no less than 20 minutes per inch thickness; no less than 30 minutes per inch thickness; no less than 40 minutes per inch thickness; or no less than 50 minutes per inch thickness.

2. Tempering

After normalizing the article, the steel casting may undergo tempering. Tempering is a process whereby a metal is precisely heated to below the critical temperature, often in air, a vacuum, or inert atmospheres. Once the desired temperature has been reached the temperature is held for a fixed period. The exact temperature may be adjusted according to the amount of hardness that needs to be reduced. High temperatures will reduce hardness and increase elasticity and plasticity but can cause a reduction in yield and tensile strength. Lower temperatures can maintain the hardness but can reduce brittleness. Tempering requires the metal to be heated gradually to prevent cracking. The heat relieves the internal stresses in the metal, after which the metal undergoes rapid cooling in air.

Typically, for exemplary steel casting methods, the tempering temperature is between 470° C. and 600° C. In various instances, the tempering temperature is between 480° C. and 590° C.; between 490° C. and 580° C.; between 500° C. and 570° C.; between 510° C. and 560° C.; between 520° C. and 550° C.; or between 530° C. and 540° C. In various instances, the tempering temperature is no greater than 590° C.; no greater than 580° C.; no greater than 570° C.; no greater than 560° C.; no greater than 550° C.; or no greater than 540° C. In various instances, the tempering temperature is no less than 480° C.; no less than 490° C.; no less than 500° C.; no less than 510° C.; no less than 520° C.; or no less than 530° C. In various instances, the tempering temperature 535° C.

Typically, the tempering time period is 60 minutes per inch thickness. The tempering time period may be adjusted based on the casting composition. In various instances, the tempering time period may be between 20 minutes and 100 minutes per inch thickness; between 30 minutes and 90 minutes per inch thickness; between 40 minutes and 80 minutes per inch thickness; or between 50 minutes and 70 minutes per inch thickness. In various instances, the tempering time period may be no greater than 100 minutes per inch thickness; no greater than 90 minutes per inch thickness; no greater than 80 minutes; or no greater than 70 minutes. In various instances, the tempering time period may be no less than 20 minutes per inch thickness; no less than 30 minutes per inch thickness; no less than 40 minutes per inch thickness; or no less than 50 minutes per inch thickness.

3. Solution Annealing

Solution annealing is a high temperature heat treatment process where the alloying elements of the material are brought into a solid solution. The solid solution condition is maintained by quenching the material in water or oil. The material is heated to and held at a predetermined elevated temperature for a period of time necessary to bring the alloying elements into a solid solution. The material is then quenched in water or oil retaining the material in the solid solution state. For exemplary steel casting methods, the quenching medium may be water.

Typically, for exemplary steel casting methods, the solution annealing temperature is between 600° C. and 1500° C. In various instances, the solution annealing temperature is between 700° C. and 1400° C.; between 700° C. and 1300° C.; between 800° C. and 1200° C.; between 800° C. and 1100° C.; between 900° C. and 1100° C.; between 900° C. and 1000° C.; or between 950° C. and 1050° C. In various instances, the solution annealing temperature is no greater than 1400° C.; no greater than 1300° C.; no greater than 1200° C.; no greater than 1100° C.; no greater than 1050° C.; no greater than 1000° C.; no greater than 900° C.; no greater than 800° C.; or no greater than 700° C. In various instances, the solution annealing temperature is no less than 700° C.; no less than 800° C.; no less than 900° C.; no less than 950° C.; no less than 1100° C.; no less than 1200° C.; no less than 1300° C.; or no less than 1400° C.

The solution annealing time period may be adjusted based on the casting composition. In various instances, the solution annealing time period may be between 20 minutes and 100 minutes per inch thickness; between 30 minutes and 90 minutes per inch thickness; between 40 minutes and 80 minutes per inch thickness; or between 50 minutes and 70 minutes per inch thickness. In various instances, the solution annealing time period may be no greater than 100 minutes per inch thickness; no greater than 90 minutes per inch thickness; no greater than 80 minutes; or no greater than 70 minutes. In various instances, the solution annealing time period may be no less than 20 minutes per inch thickness; no less than 30 minutes per inch thickness; no less than 40 minutes per inch thickness; or no less than 50 minutes per inch thickness. In some instances, the solution annealing time period may be 60 minutes per inch thickness.

After solution annealing, the article may be removed from the mold and heat treated.

VI. EXPERIMENTAL EXAMPLES

The foregoing may be better understood by reference to the following examples, which are presented for purposes of illustration and are not intended to limit the scope of the technology.

A. General Materials for Examples 1-14

The industrial size heats (1000 pound) of WCB Steel were melted and cast at Maynard Steel Casting Company in Milwaukee, WI. The casting methods generally involved forming a slurry with an appropriate binder and applying powdered alloying elements of selected mesh sizes.

Example 1: Slurry Preparation and Coating

The binders used to prepare the slurries were sodium polyacrylate ($C_3H_3NaO_2$) and REFCOTEC REFCOHOL 1010 industrial wash (alcohol-based refractory wash containing Zirconia powder) (Table 1). The sodium polyacrylate was sourced from Aqua Solutions, while the REFCOHOL 1010 industrial wash was supplied from REFCOTEC. The degradation of sodium polyacrylate at high temperatures has been widely studied. The consensus on the decomposition products is that the amount of carbon from the residue is very small as most of the carbon volatilizes as CO, $CO_2$, hydrocarbons, ketones, etc. Both sodium oxide ($T_m$=1132° C.) and sodium carbonate ($T_m$=851° C.) melt at temperatures of molten steel (1600° C.). The volatile nature of this binder is similar to the binders used in foundry sand to prepare molds. It has been reported that most organic binders are volatilized where the sand comes in contact with the melt at about 1000° C.

TABLE 1

Chemical composition of lower-cost Refcohol 1010 industrial wash.

| Chemical Component | Weight % (wt %) |
| --- | --- |
| Isopropyl alcohol | 15-16 |
| Solvent naphtha | 7-9 |
| Zirconium silicate | 65-75 |
| Crystalline silica (quartz) | ≤1 |
| Proprietary binding/suspending agents | 1-5 |

Three different compositions of alloying powders were investigated: Ni, the mixture of Ni+Cr, and 316L stainless steel to compare the efficacy of nickel, nickel and chromium, and stainless steel as surface alloying materials. The Ni and Cr powders had a purity of 99.9999% obtained from Sigma Aldrich. The mesh size of Ni was −50+100, and Cr was −60. The purity of the SS powders was approximately 95%. The grade of stainless steel (source: Shijiazhuang Daye Metal Powder Factory, China) selected was 316L, and particle sizes used for the samples were 200, 800, 1000, and 2000 μm.

A thin layer of the binder was applied to the sand core surfaces, and Ni, Ni+Cr, or stainless-steel powder was sprinkled and evenly distributed on top of each core. Table 2 lists the composition of slurry for each sample.

TABLE 2

The slurry compositions for different cores samples.

| Sample ID | Nickel (g) | Chromium (g) | Stainless steel (g) | Binder |
|---|---|---|---|---|
| N1 (8Ni) (3) | 8 | — | — | Sodium polyacrylate |
| NC1 (8Ni 18Cr) (7) | 8 | 18 | — | Sodium polyacrylate |
| NC2 (10Ni 10Cr) (76) | 10 | 10 | — | Sodium polyacrylate |
| NC3 (15Ni 15Cr) (112) | 15 | 15 | — | Sodium polyacrylate |
| S1 ($2SS_{1000}$) (303) | — | — | 2 (1000 pm) | Refcohol 1010 |
| S2 ($4SS_{1000}$) (305) | — | — | 4 (1000 pm) | Refcohol 1010 |
| S3 ($4SS_{800}$) (315) | — | — | 4 (800 pm) | Refcohol 1010 |
| S4 ($4SS_{800}$) (316) | — | — | 4 (800 pm) | Refcohol 1010 |

Figure 2A:
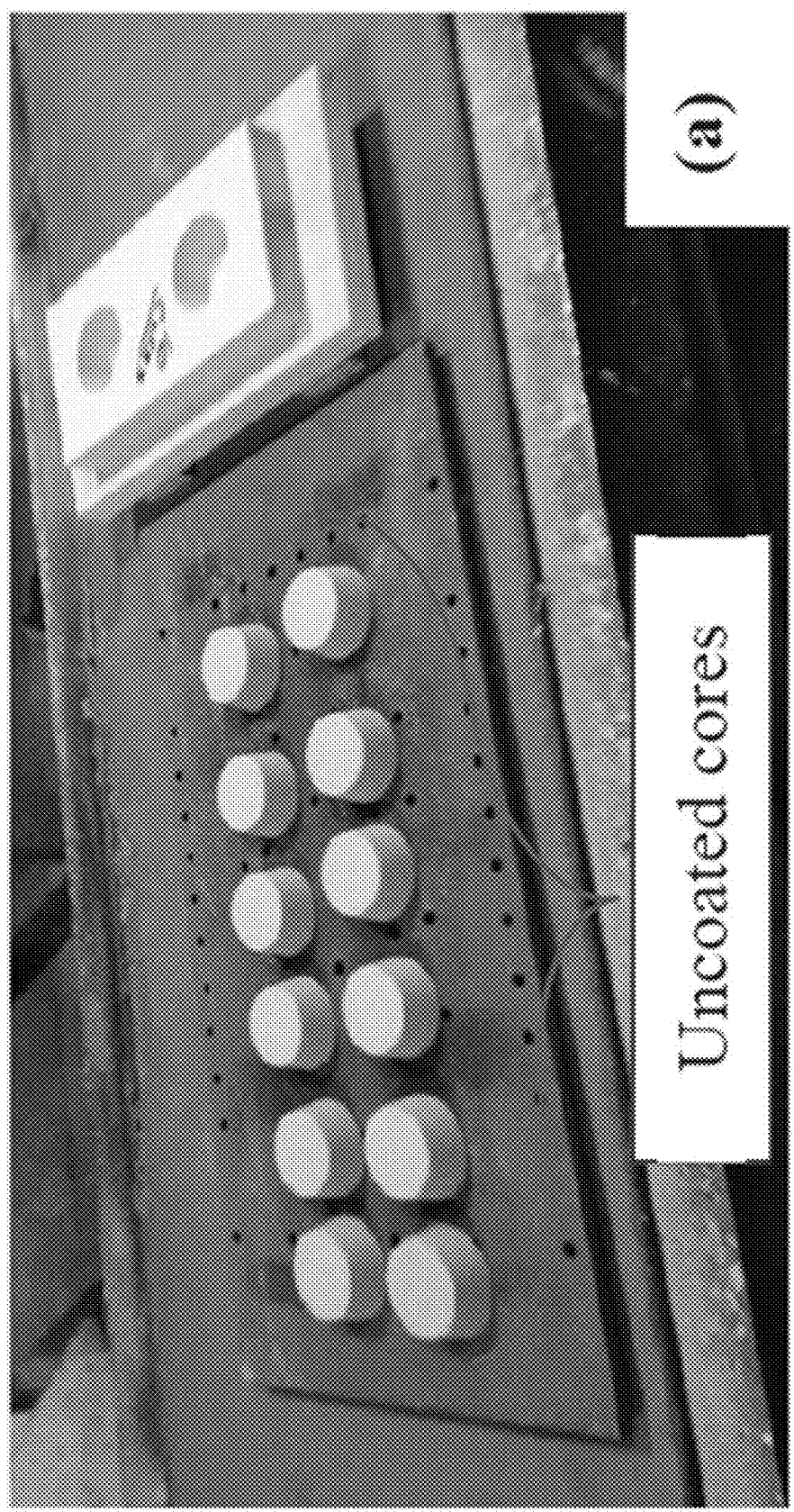
FIG. 2A shows the sand cores produced by the industrial partner prior to coating with the alloying element enriched slurry.
Figures 2B, 2C:
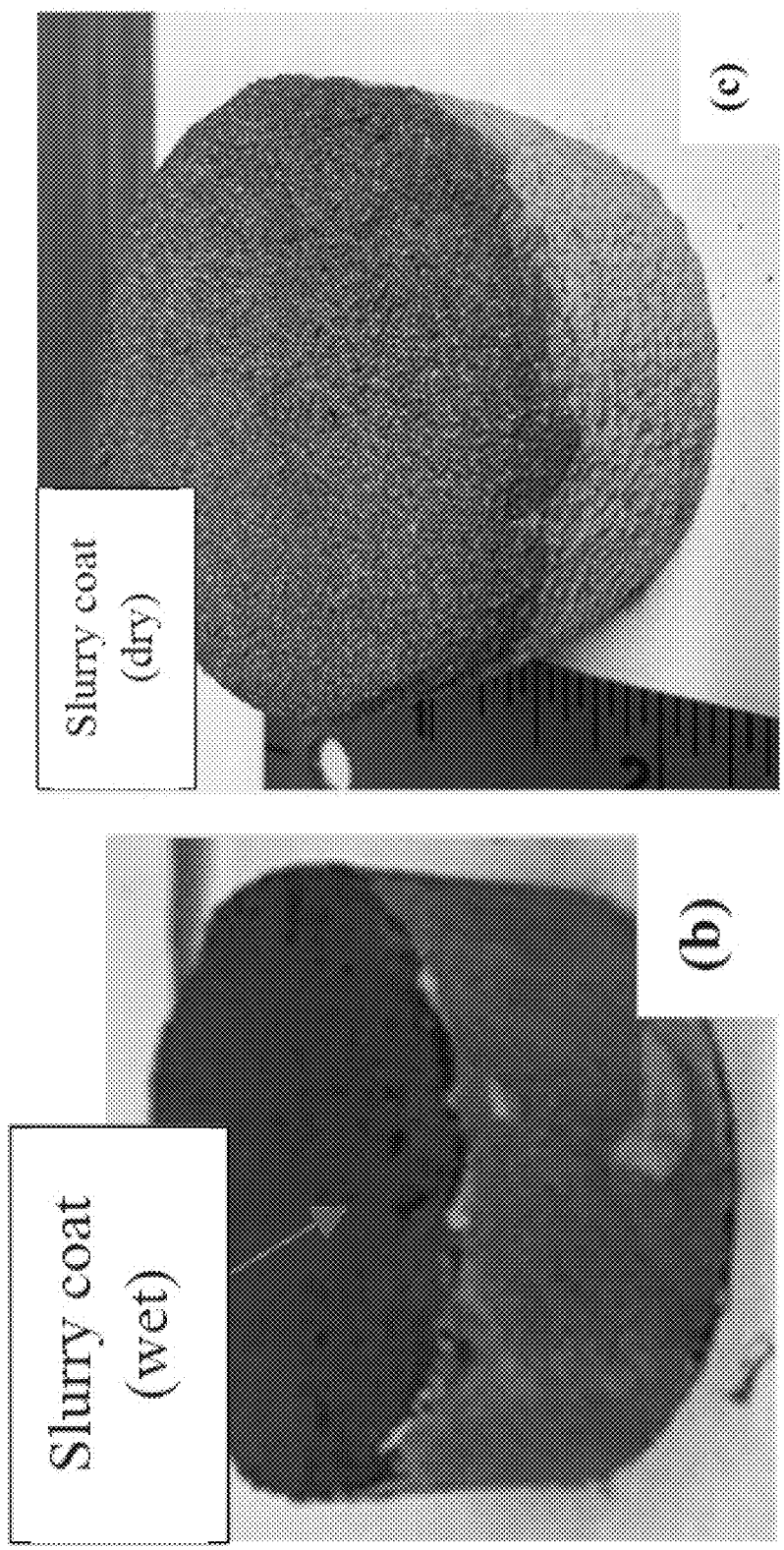
FIG. 2B shows the slurry-coated core still wet before drying in a low-temperature furnace.
FIG. 2C shows the sand core with the dried-on slurry.
Figure 2D:
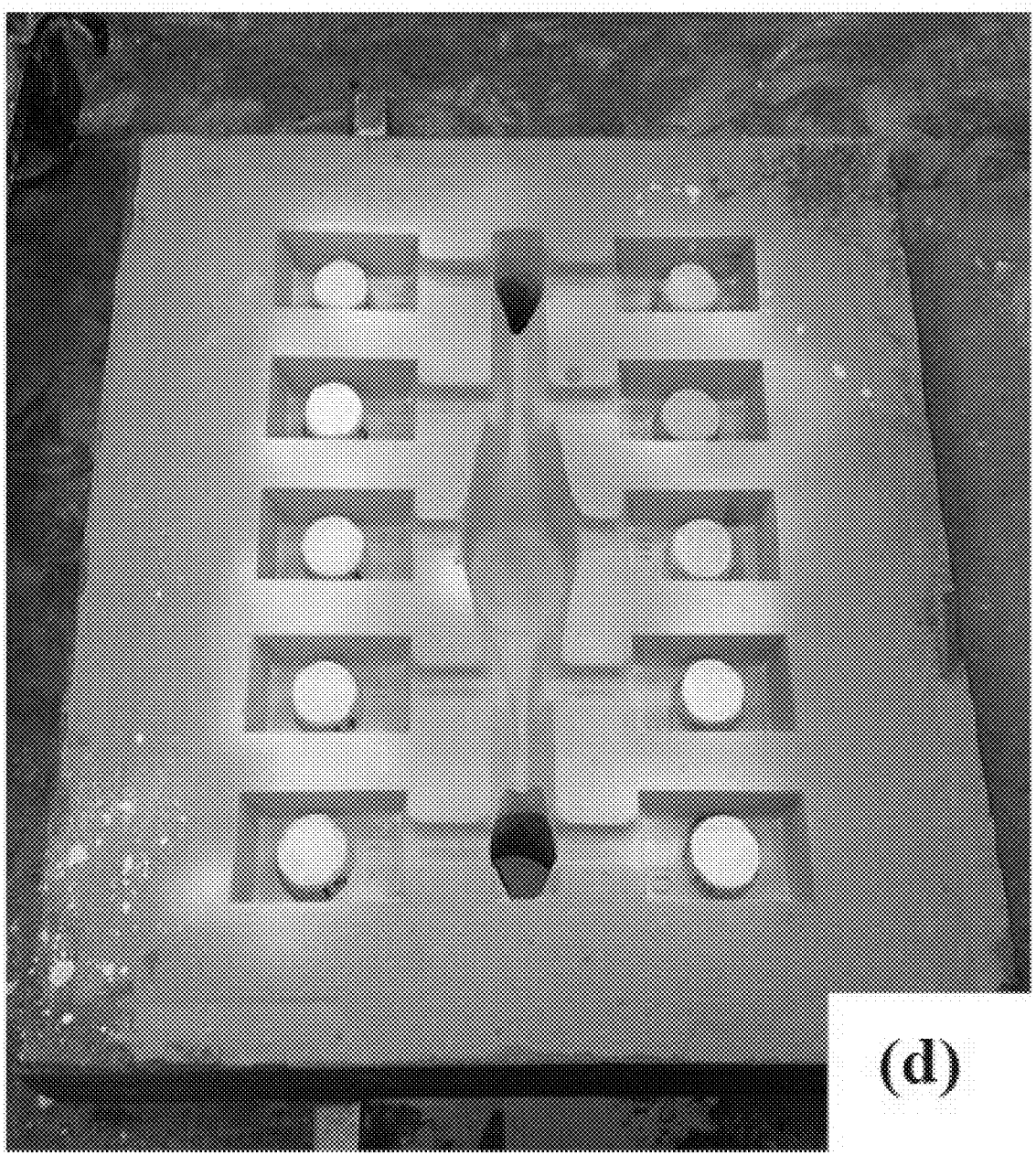
FIG. 2D shows the sand cores in the test block sand mold.
Figure 3A:
FIG. 3A shows the cast tree containing 50 ten-pound test blocks poured from the 10,000-pound melt by the industrial partner.
Figure 3C:
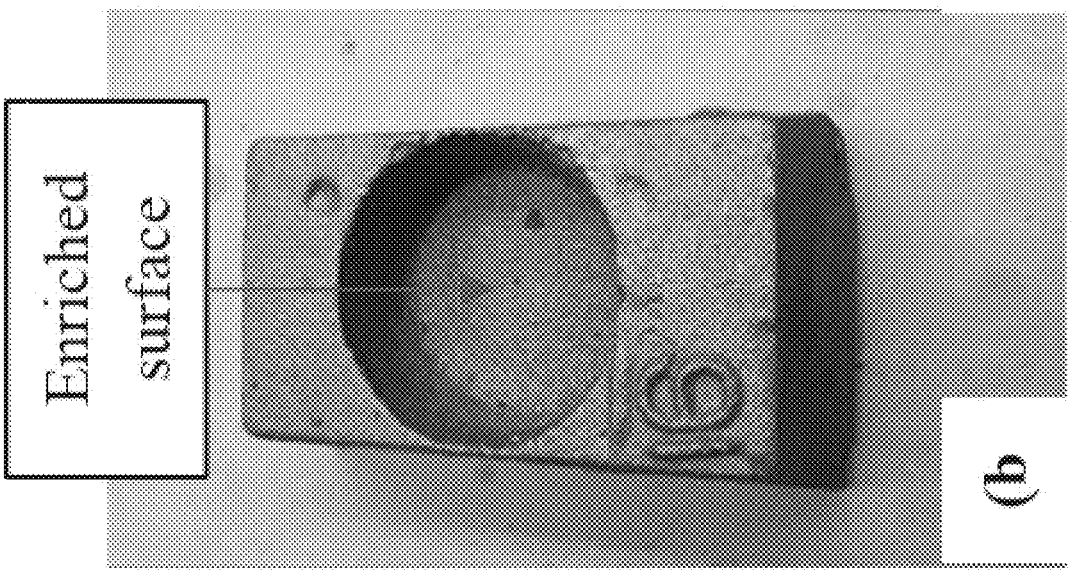
FIG. 3C shows the center cube was cut out from the test block.
Figure 3B:
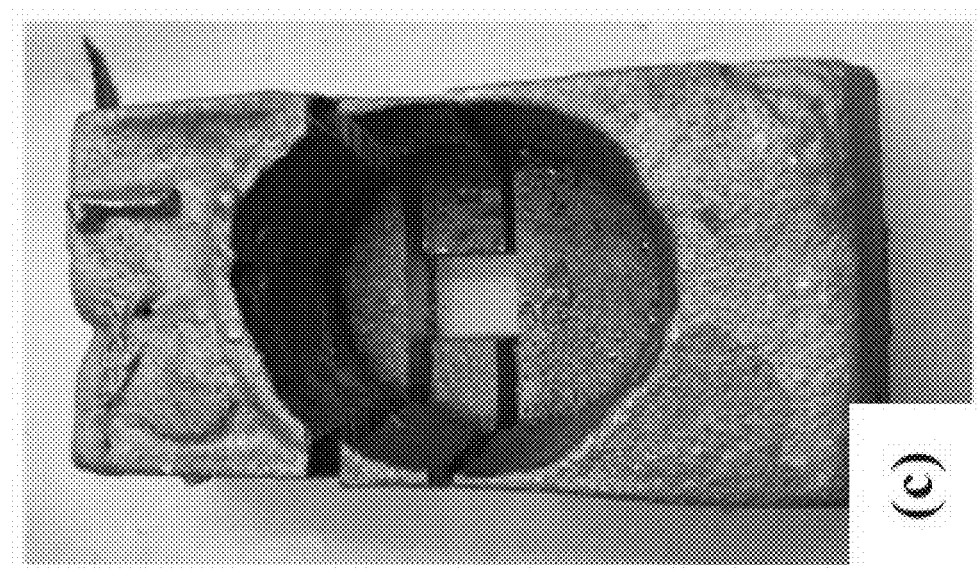
FIG. 3B shows the enriched surface is the one that came in contact to the slurry, which is the flat, recessed surface that is visible.
Figure 4A:
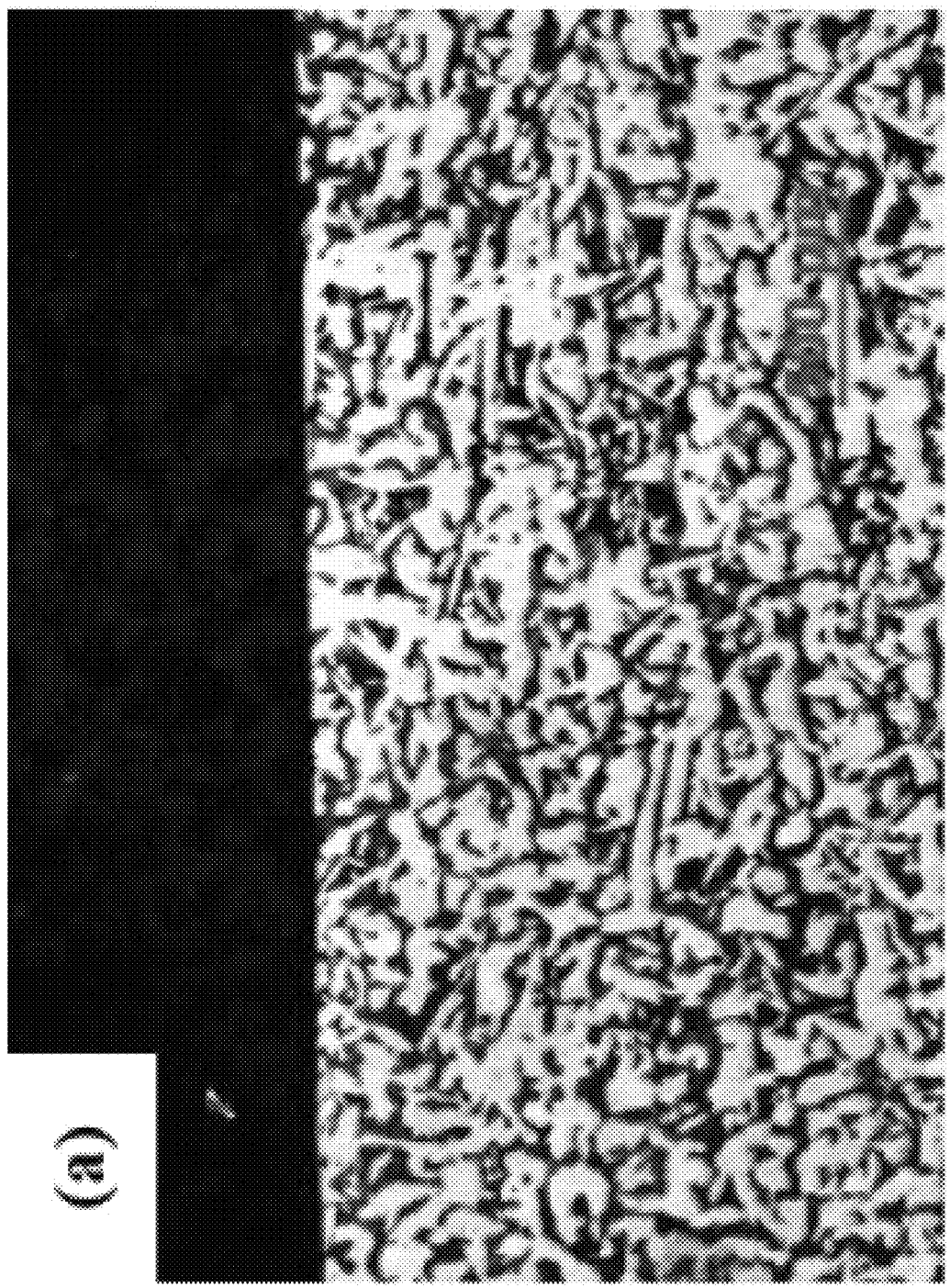
FIG. 4A shows a microstructure of the control sample without surface alloyed layer.
Figure 4B:
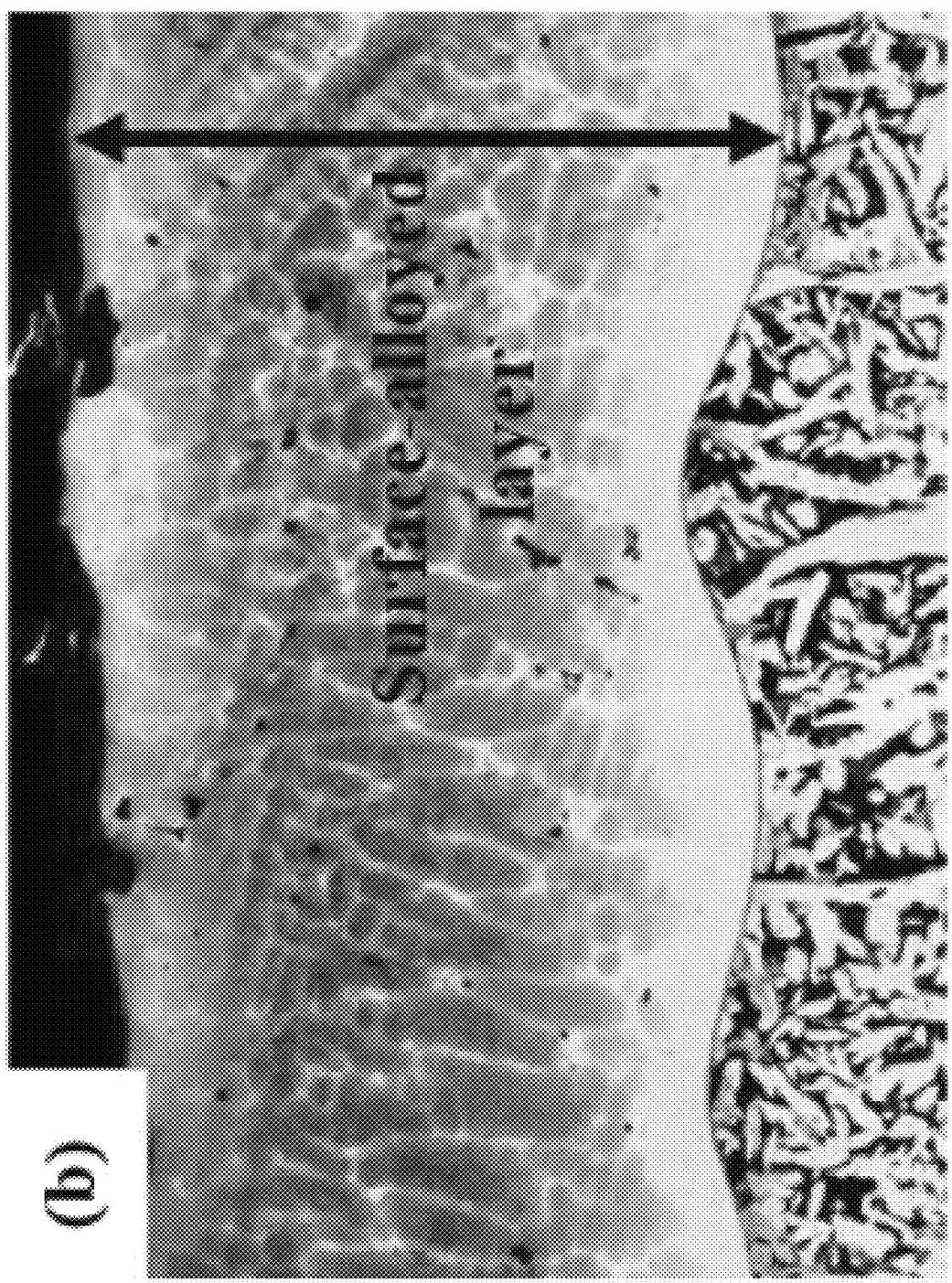
FIG. 4B shows the dendritic microstructure of surface alloyed layer of sample N1 (8Ni) in which only nickel was present.
Figure 4C:
FIG. 4C shows the thickness of the alloyed layer of sample N1 (8Ni).
Figure 4D:
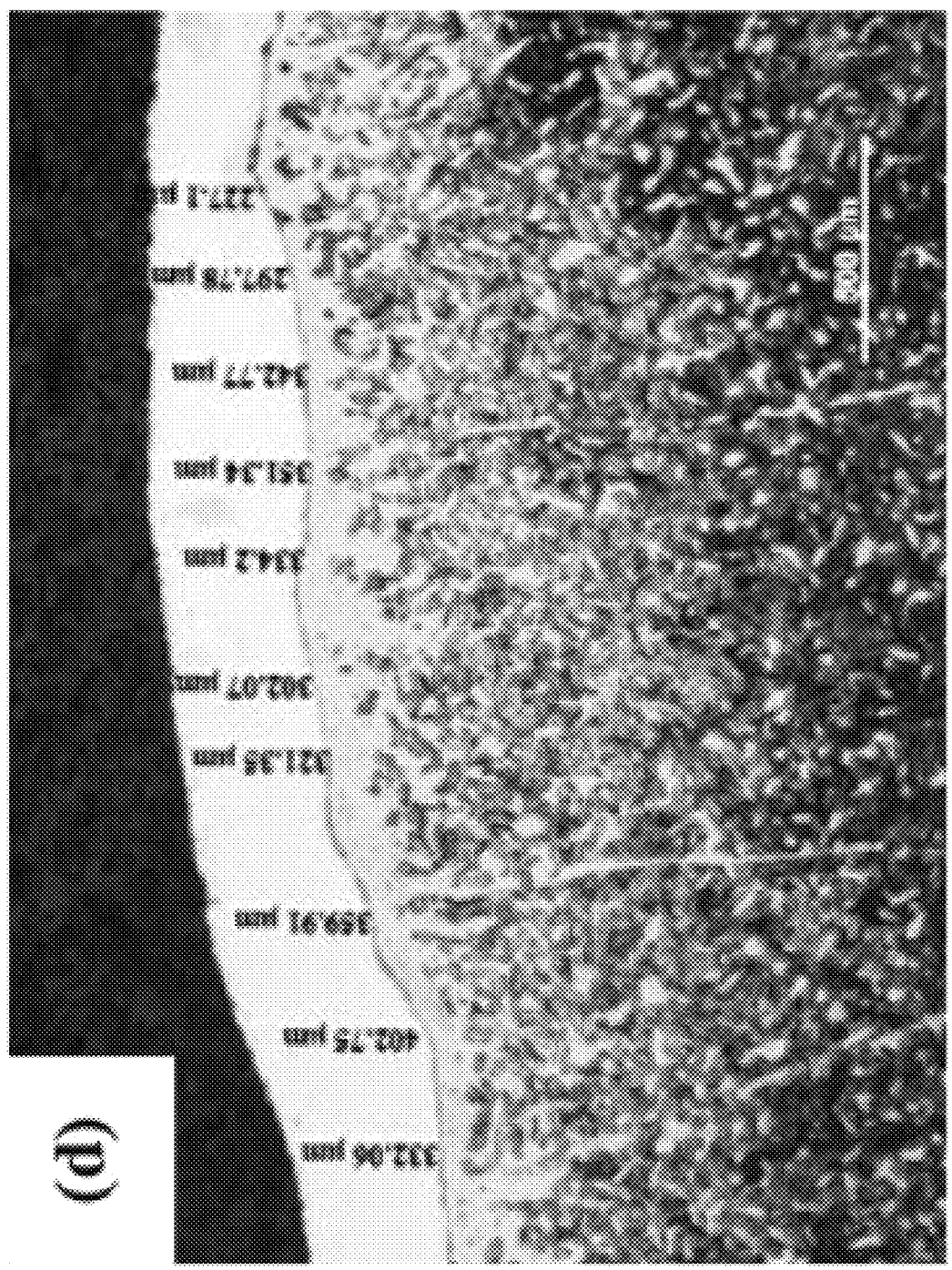
FIG. 4D shows the thickness of the alloyed layer of sample NC1 (8Ni18Cr).
Figure 4E:
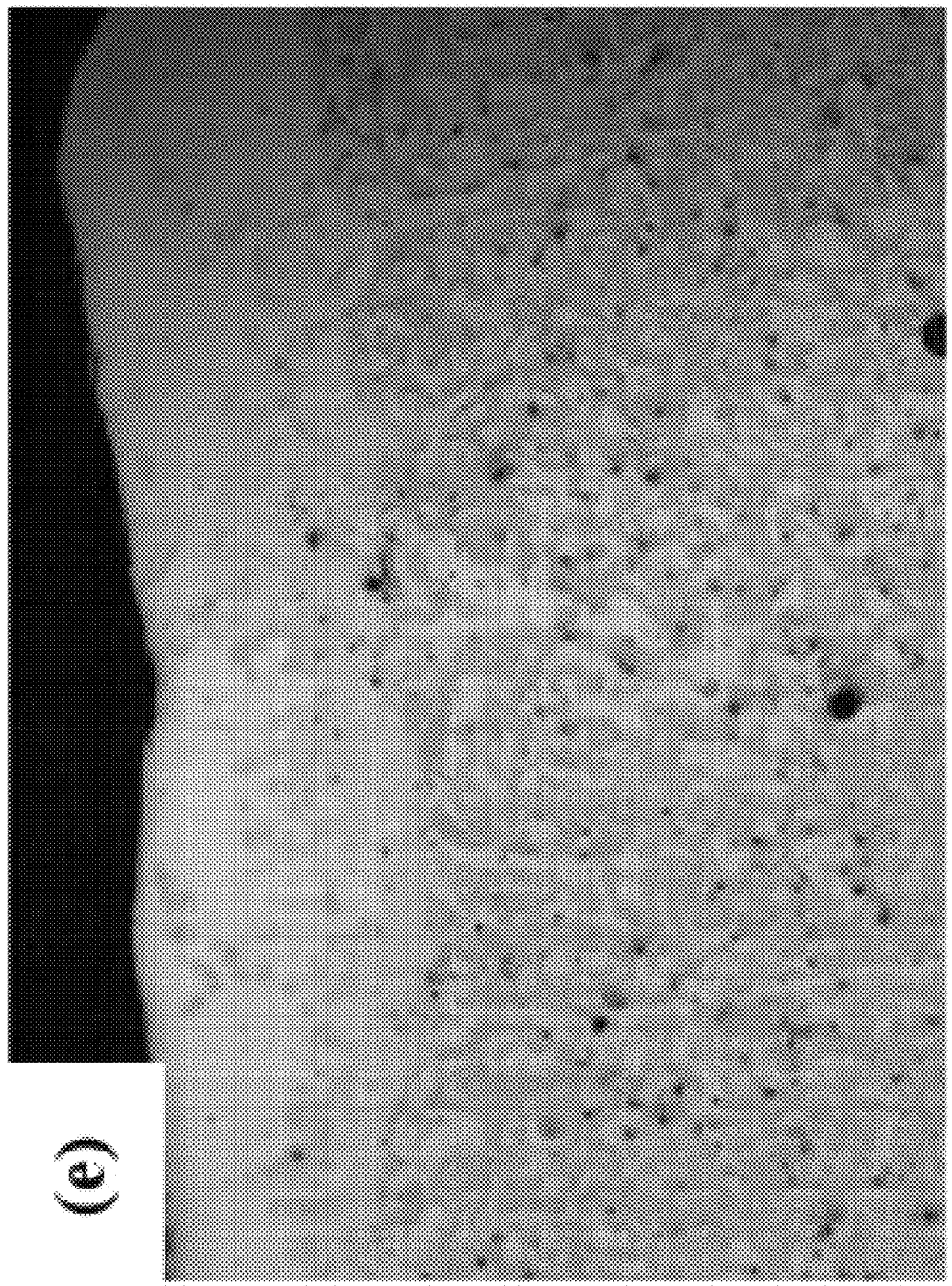
FIG. 4E shows the thickness of the alloyed layer of sample NC2 (10Ni10Cr).
Figure 4F:
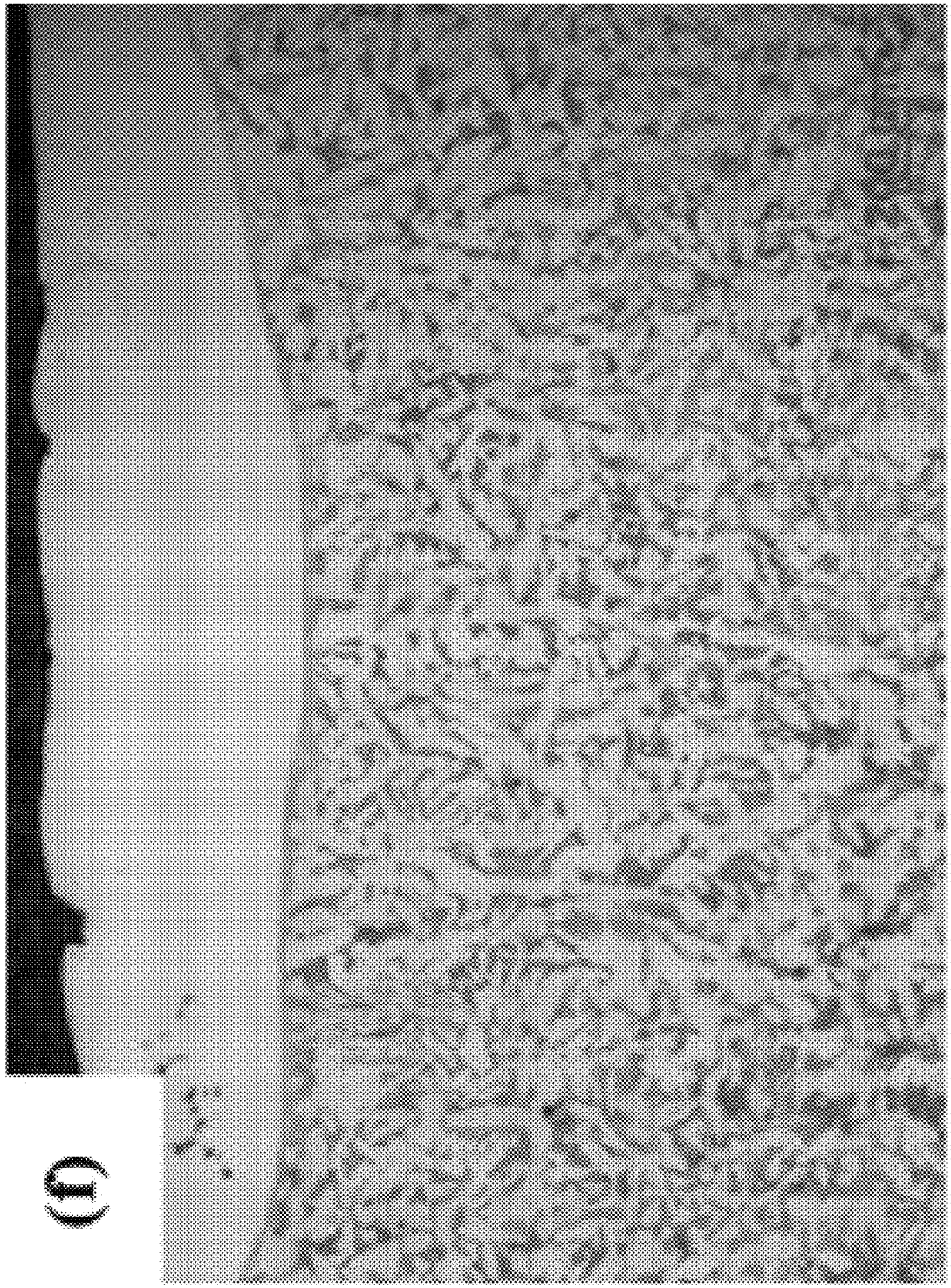
FIG. 4F shows the thickness of the alloyed layer of sample NC3 (15Ni15Cr).
Figure 4G:
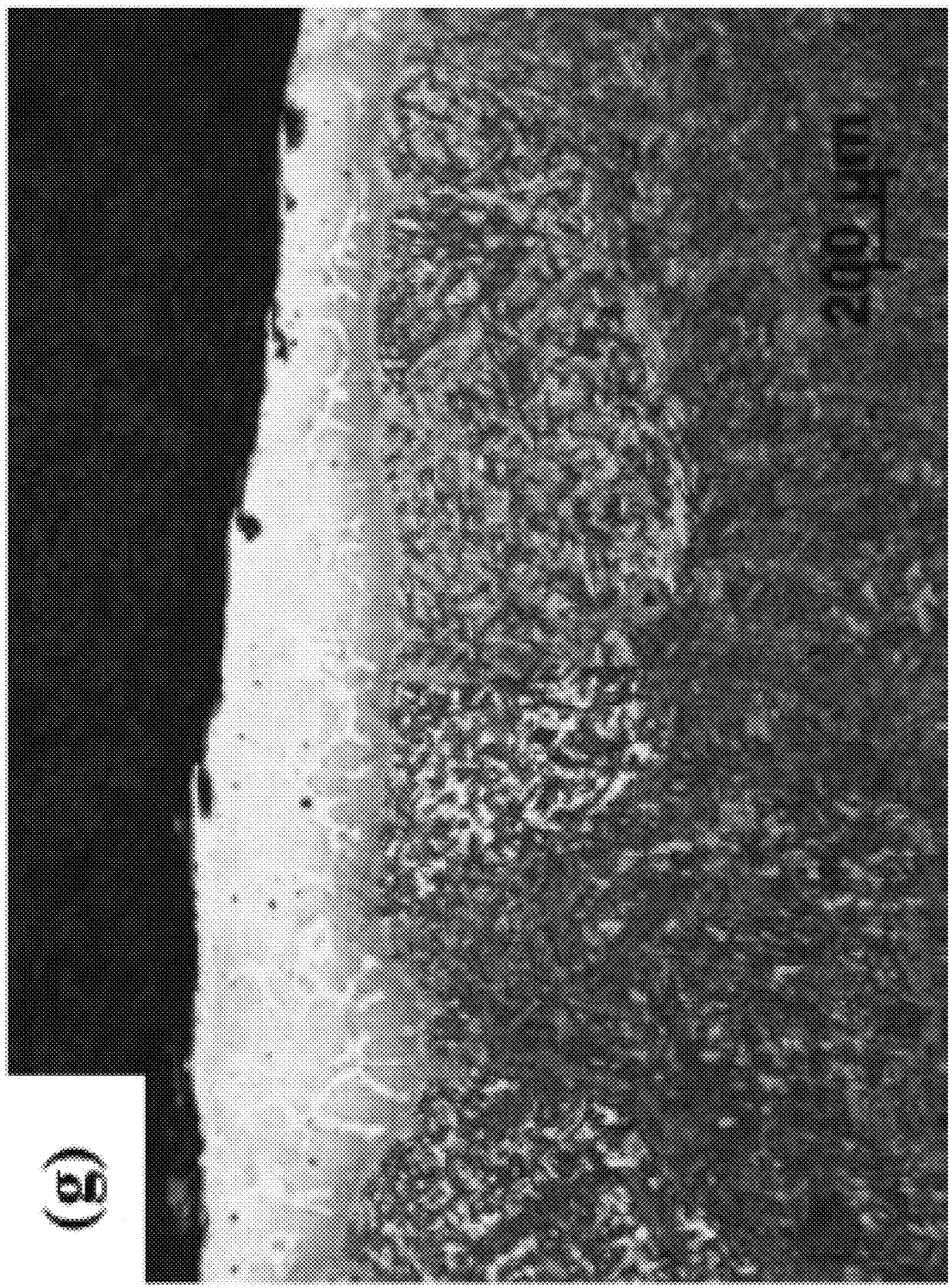
FIG. 4G shows the thickness of the alloyed layer of sample S3 (4SS800).
Figure 4H:
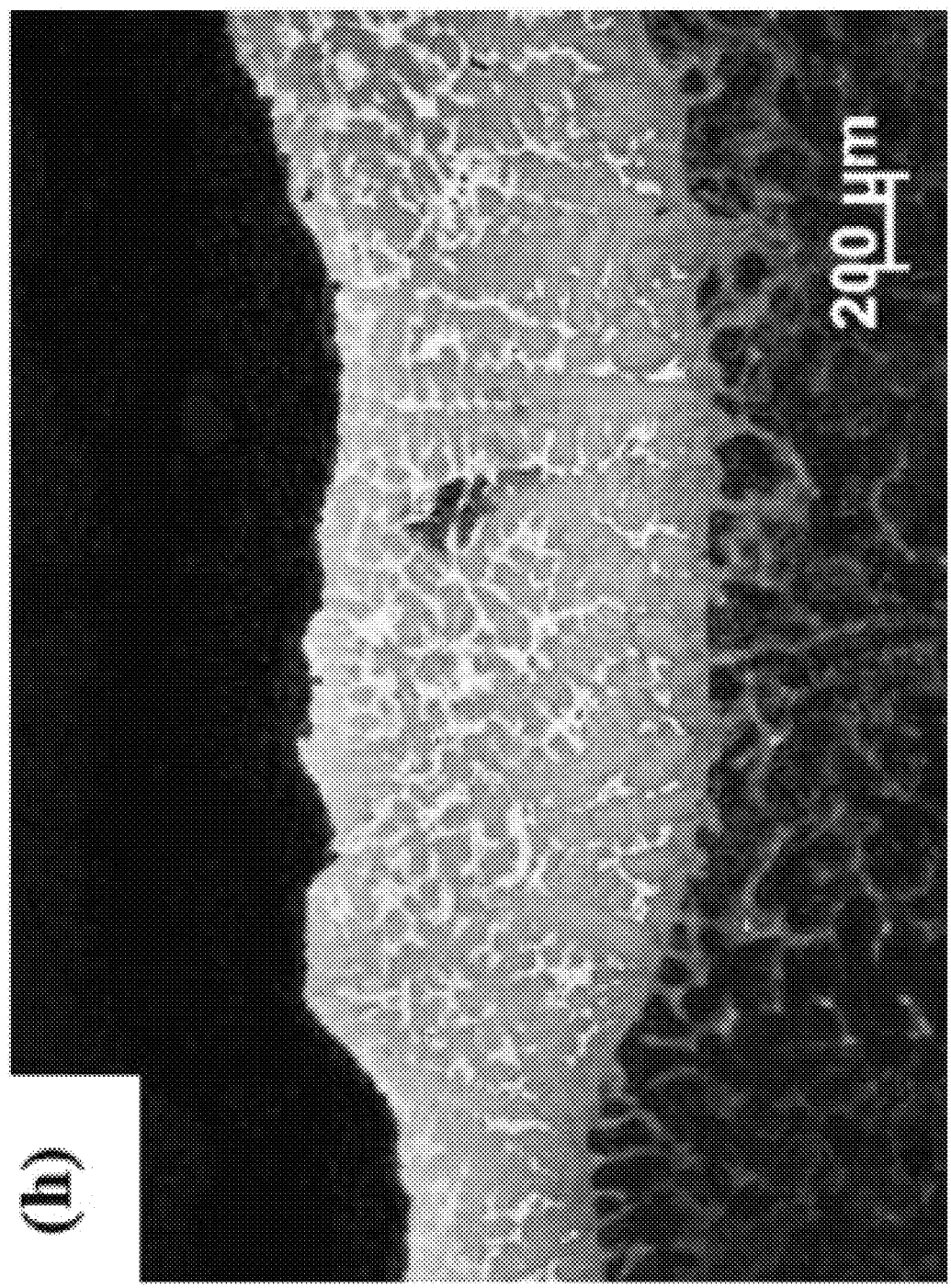
FIG. 4H shows the thickness of the alloyed layer of sample S4 (4SS800).

Maynard provided the sand cores for the experiment and making castings with coated cores at their facility. Sand cores were made from no-bake sand. They were ¾" tall, the bottom circular diameter measured 2", and the top diameter measured 1". FIG. 2A shows 12 sand cores, as well as the molds in which they were made. The final slurry was applied on the cores and dried in a low-temperature furnace at 70° C. for two hours. FIG. 2B shows the slurry-coated core before it was placed in the furnace for drying. FIG. 2C shows the sand core after the furnace drying, with the hardened-on slurry on its surface. The resultant slurry coating uniformly covered the entire surface. FIG. 2D shows the sand cores in the test block mold. In the next step, melt of WCB steel was poured from 10,000 lbs. melts of steel. The temperature of the molten steel during pouring was 1760° C. FIG. 3A demonstrates a cluster of 50 surface-alloyed mild steel blocks made at Maynard Steel. The castings were shaken out of the molds, blasted with steel shot, and the ingates were cut off. Then, the samples underwent a heat treatment cycle, including normalizing and tempering. The first step of the cycle was to normalize the steel at 898° C. for 1 hour per inch thickness, after quenching in water. Then, the sample was tempered at 535° C. for 1 hour per inch thickness, followed by air cooling or quenching in water. FIG. 3B shows the test block with the supposedly enriched internal surface. The center was cut out into a small cube, as the central face is the one that was enriched. FIG. 3C shows where the sample was cut out so that the cross-section through the surface alloyed layer and the substrate below it could be observed.

The test blocks were cut and mounted so that their cross section could be examined. The samples were characterized using optical microscopy, SEM and EDS analysis, XRD analysis, microhardness, and corrosion testing. The Nikon Eclipse TS100 optical microscope, as well as Clemex Image software, were used to investigate the microstructure of the surface-alloyed samples. After the samples were metallographically prepared, optical microscopy was performed to investigate the microstructural differences between the surface of the samples and the substrate. The surface morphologies of the samples were investigated using a Jeol JSM 5800 scanning electron microscope. Energy Dispersive Spectroscopy (EDS) then provided a chemical composition of the surface of the casting as well as in the substrate. Phase identification was carried out using a Bruker D8 Discover X-ray diffractometer (XRD).

Vickers microhardness tests were performed on the surface alloyed layer and compared to the substrate. For these experiments, a 500-gf force with a dwell time of 10 seconds was used. Ten surface measurements and ten substrate measurements were performed on each sample. For the surface measurements, three hardness tests were taken near the top surface, four were taken in the middle of the surface, and three were taken near the surface/substrate interface. For bulk measurements, three tests were taken just below the surface/substrate interface, four were taken near the middle of the substrate, and three were taken at the bottom. Potentiodynamic polarization tests in 3.5% NaCl solution were performed to study the corrosion resistance of the surface-alloyed samples using a Potentiostat, SP-200 BioLogic. The surface alloyed samples and platinum were used as the working electrode and counter electrode, respectively. Standard Calomel Electrode (SCE) was used as a reference electrode. The scan rate was adjusted to 0.16 mV/s.

Example 2: Optical Microscopy

The optical micrographs of the samples, FIGS. 4A-4H, show the presence of the surface alloyed layer on the WCB steel surface. The samples were etched with 3% Nital solution to etch the substrate and leave the surface alloyed layer unetched. The microstructure of the substrate is ferrite and pearlite as a result of normalizing heat treatment. In the case of the surfaces which were alloyed by Ni and SS (FIGS. 4B, 4G, and 4H), surface alloyed layers show a dendritic solidification microstructure suggesting the complete dissolution of powders and solidification of the melt enriched in nickel or nickel plus chromium next to the coated surface of the core. The surfaces enriched with nickel and chromium appear as shiny layers that do not etch with a 3% Nitinol solution the same way that the substrates etched. It is reasonable to suspect that this enriched layer is austenitic, due to the nickel austenite stabilizer, which will be discussed in the following sections. The average thickness of the surface-alloyed layers is listed in Table 3.

TABLE 3

Average thickness of selected surface-alloyed samples

| Sample ID | Sample ID Thickness (μm) |
|---|---|
| Ni (8Ni) | 1342 ± 168 |
| NC1 (8Ni 18Cr) | 342 ± 46 |
| NC2 (10Ni 10Cr) | 229 ± 122 |
| NC3 (15Ni 15Cr) | 289 ± 108 |
| S1 ($2SS_{1000}$) | 282 ± 56 |
| S2 ($4SS_{1000}$) | 309 ± 67 |
| S3 ($4SS_{800}$) | 289 ± 79 |
| S4 ($4SS_{800}$) | 608 ± 134 |

Figure 5A:
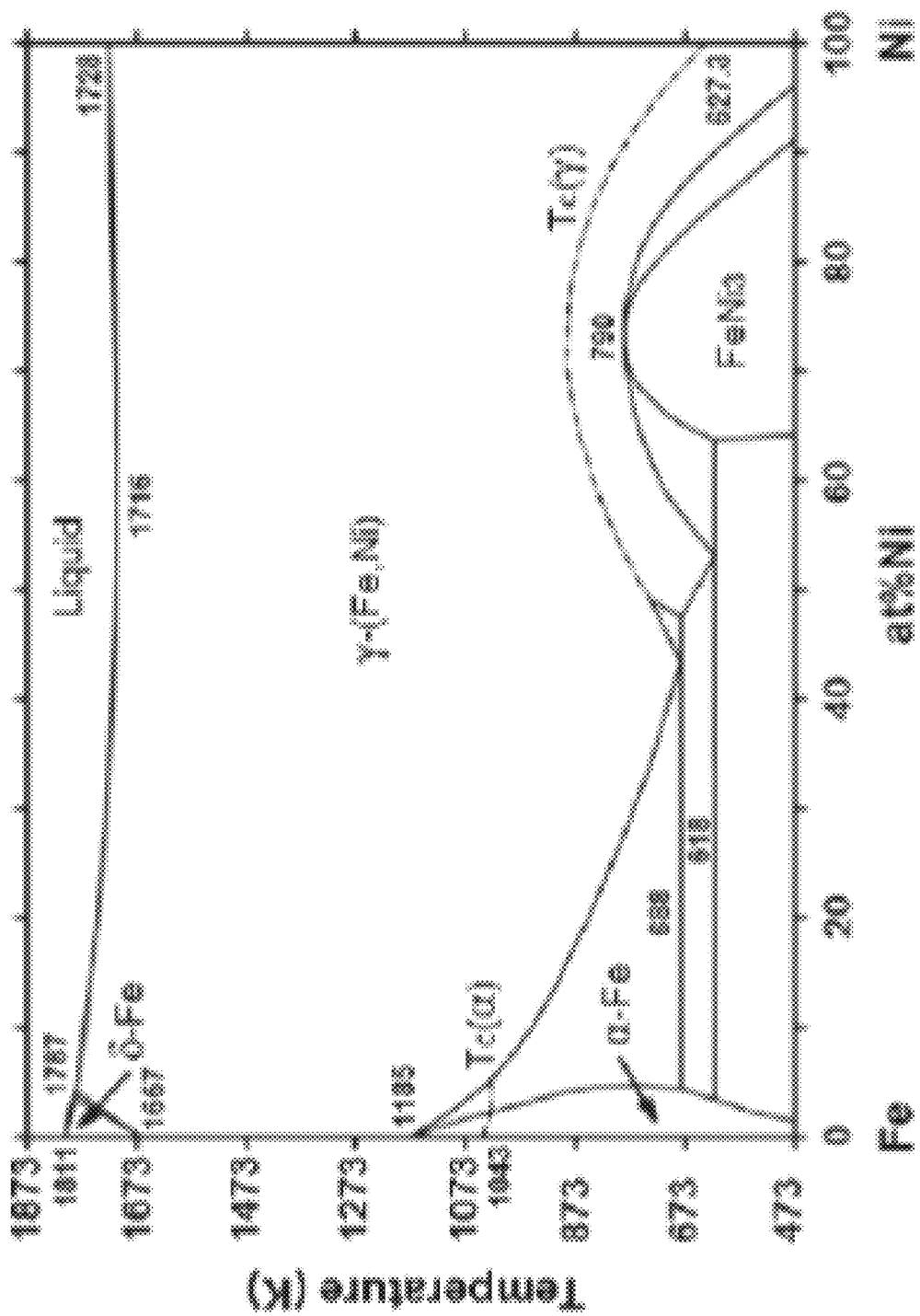
FIG. 5A shows the Fe—Ni system phase diagram.
Figure 5B:
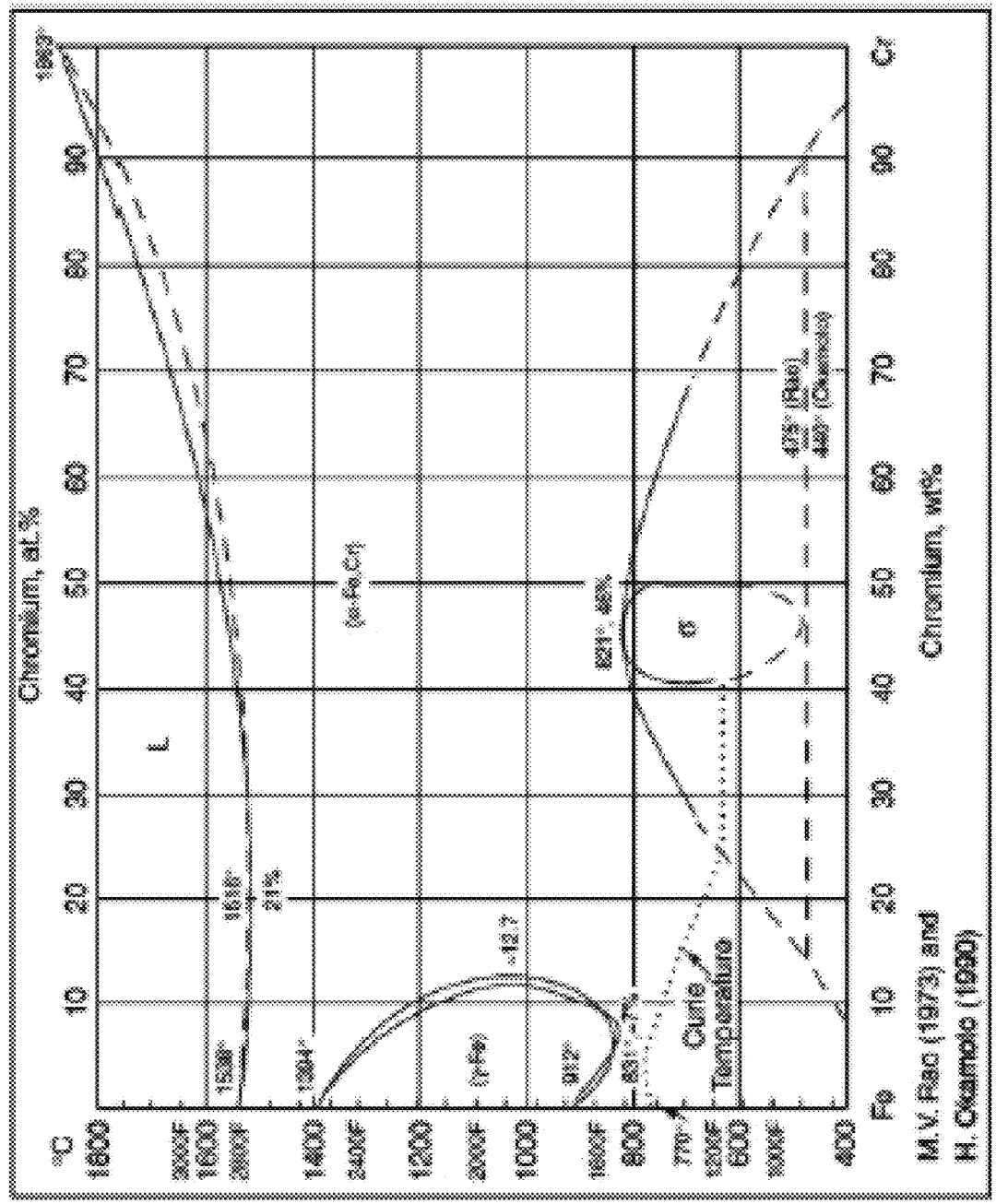
FIG. 5B shows the Fe—Cr system phase diagram.
Figure 6A:
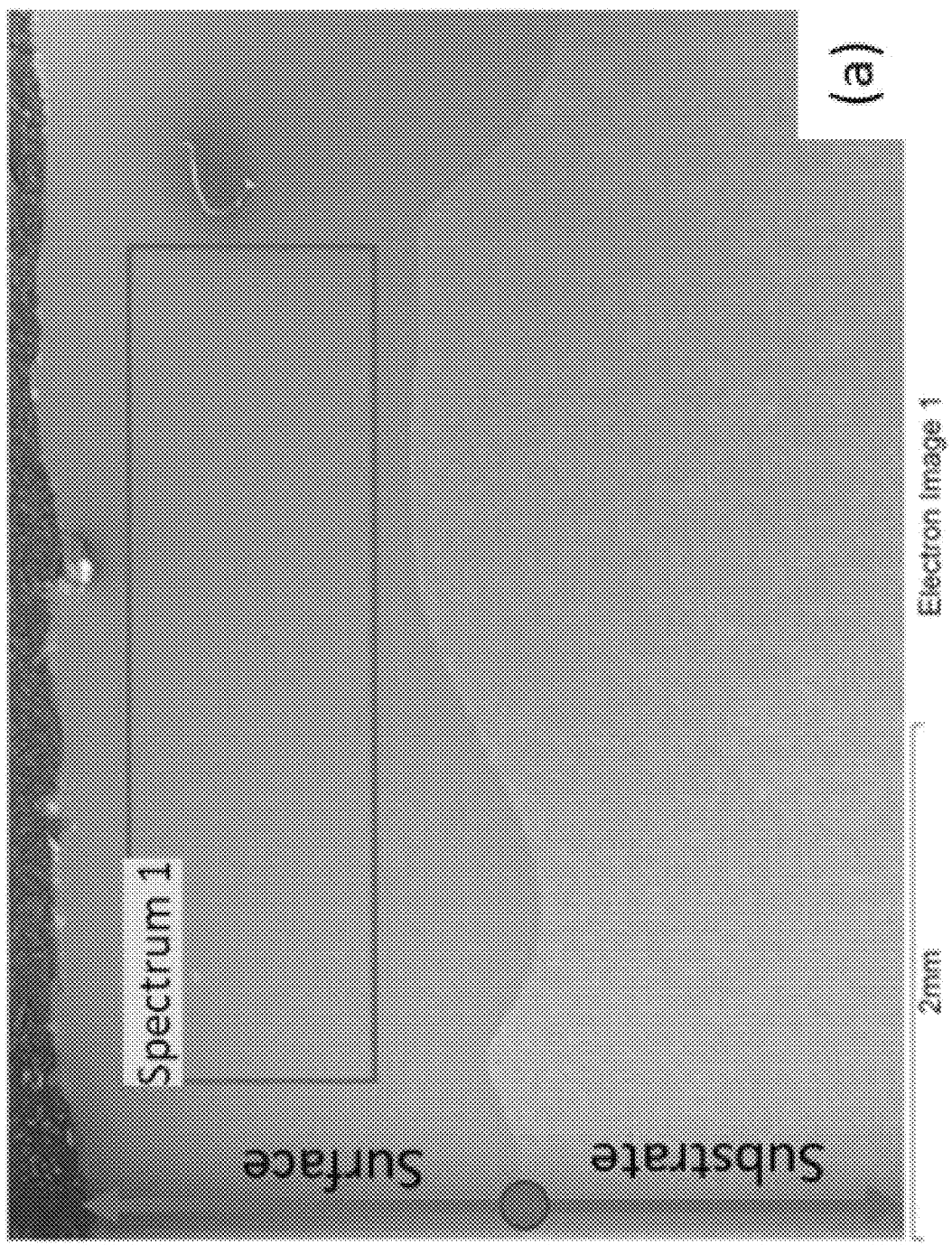
FIGS. 6A-6D shows cross-sectional SEM micrographs showing the EDS area scans for samples N1 and NC1.
Figure 6B:
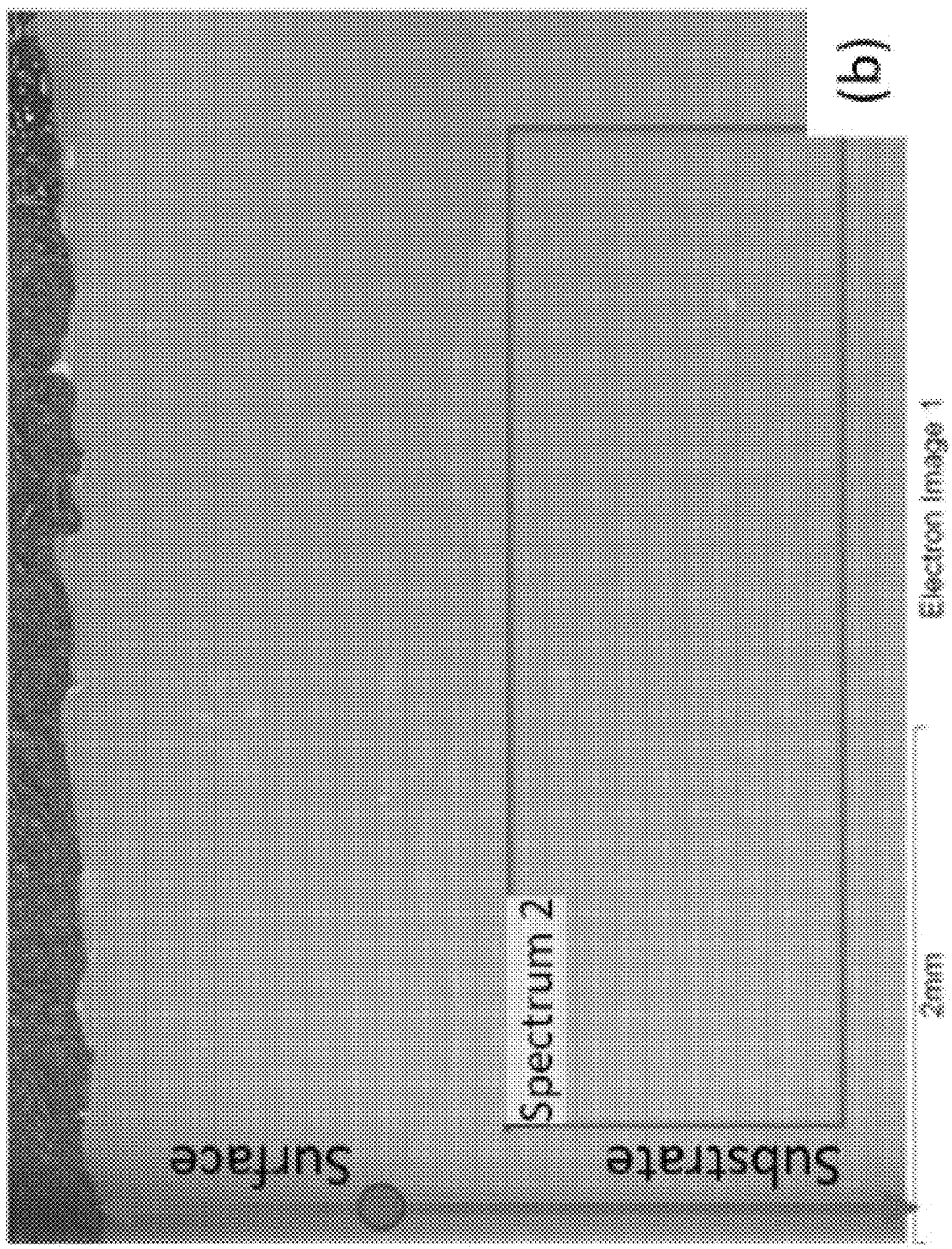
Figure 6C:
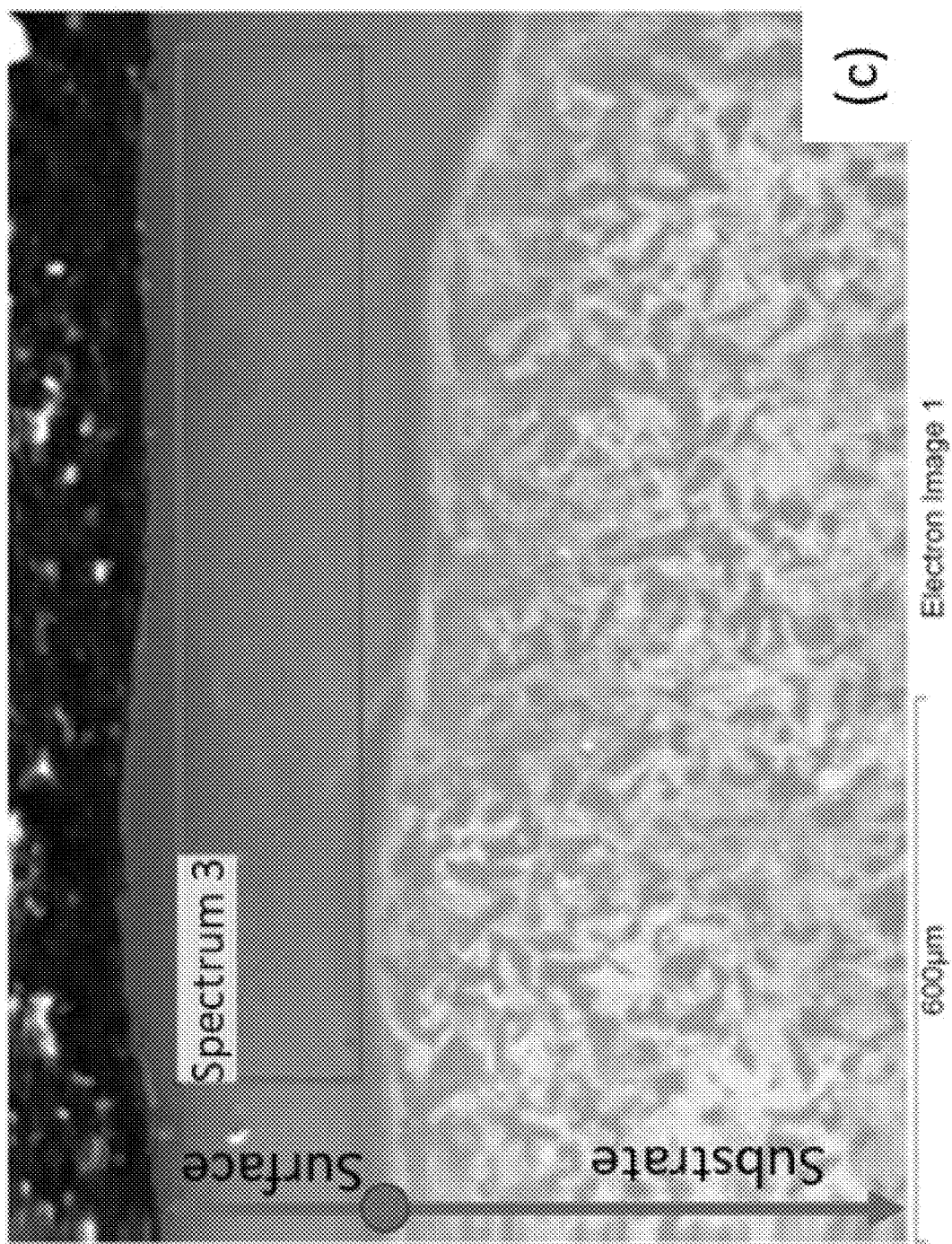
Figure 6D:
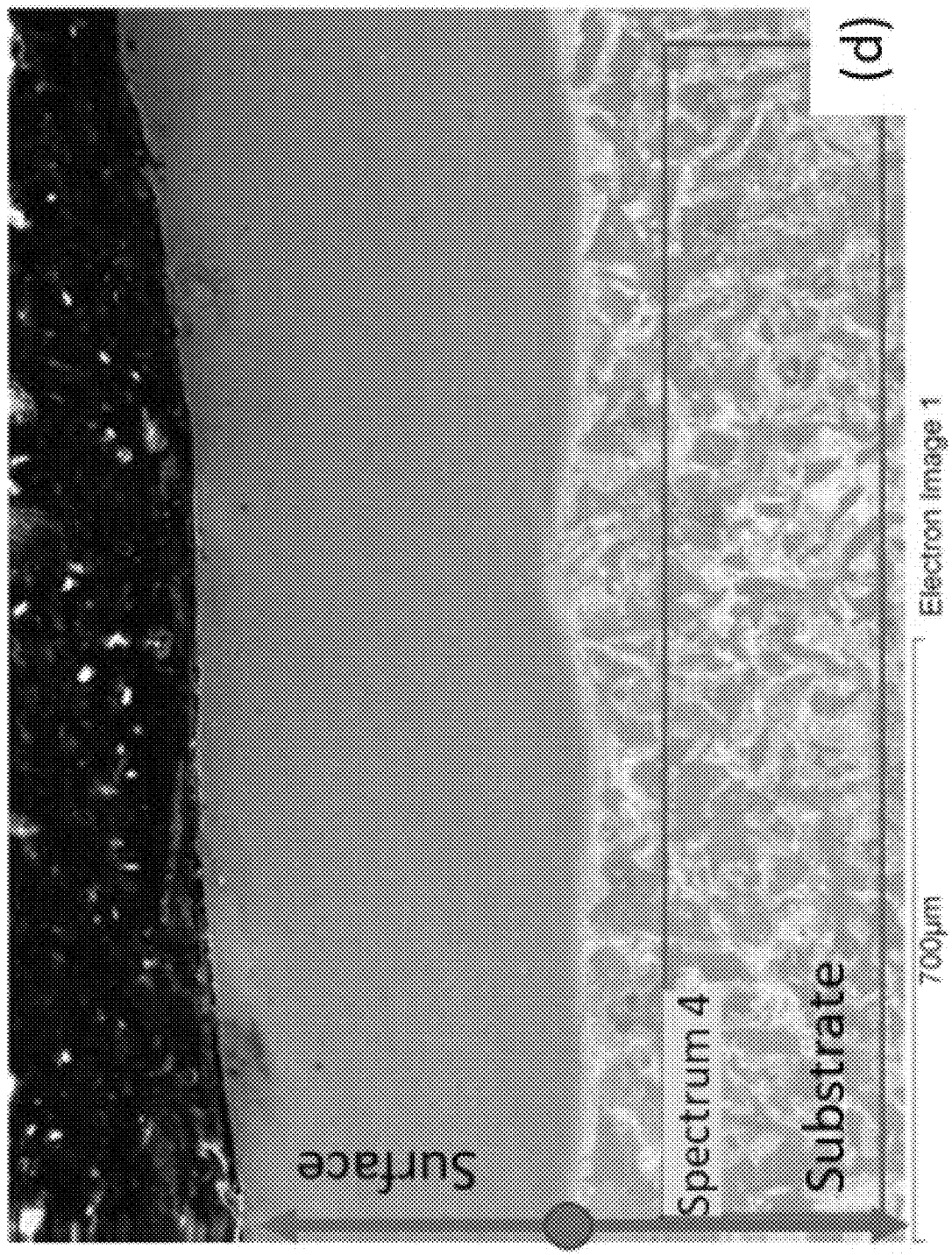

It was observed that the thickness of the surface-alloyed layer was lower when Cr powder was added to the slurry. As shown in FIGS. 5A and 5B, the binary phase diagram of Fe—Ni and Fe—Cr, the melting point of Ni is 1455° C. which is lower than that of WCB steel, which melts at approximately 1460° C. However, Cr has higher melting points at 1907° C. Pouring temperatures were used in the range of 1760° C. to achieve fluidity so that the melt can flow through the mold cavity and initiate the alloying and mixing of the alloying elements. The higher melting point of Cr could be the cause for the lower thickness of the surface alloyed layer when Ni+Cr and SS were used as alloying powders.

Example 3: Scanning Electron Microscopy (SEM) and Energy Dispersive Spectroscopy (EDS) Results FIGS. 6A-6D and FIGS. 7A-7D show the area and line scan EDS analysis of the surface-alloyed samples. The measured values in wt % are presented in Table 4.

TABLE 4

Chemical analysis results of the surface alloyed layer and substrate using EDS.

| Sample ID | Ni (wt %) | Cr (wt %) | C (wt %) | O (wt %) | Fe (wt %) |
|---|---|---|---|---|---|
| Ni (8Ni) (Surface) | 16.32 | — | — | — | Bal. |
| Ni (8Ni) (Substrate) | — | — | — | — | 99+ |
| NC1 (8Ni 18Cr) (Surface) | 7.79 | 15.85 | — | — | Bal. |
| NC1 (8Ni 18Cr) (Substrate) | 0.02 | 0.47 | — | — | 99+ |
| NC2 (10Ni 10Cr) | 3.88 | 4.45 | — | — | Bal. |
| NC3 (15Ni 15Cr) | 8.39 | 12.78 | — | — | Bal. |
| S1 ($2SS_{1000}$) | 6.35 | 5 | 4.91 | 4.09 | Bal. |
| S2 ($4SS_{1000}$) | 5.58 | 5.48 | 7.28 | — | Bal. |

Figure 7A:
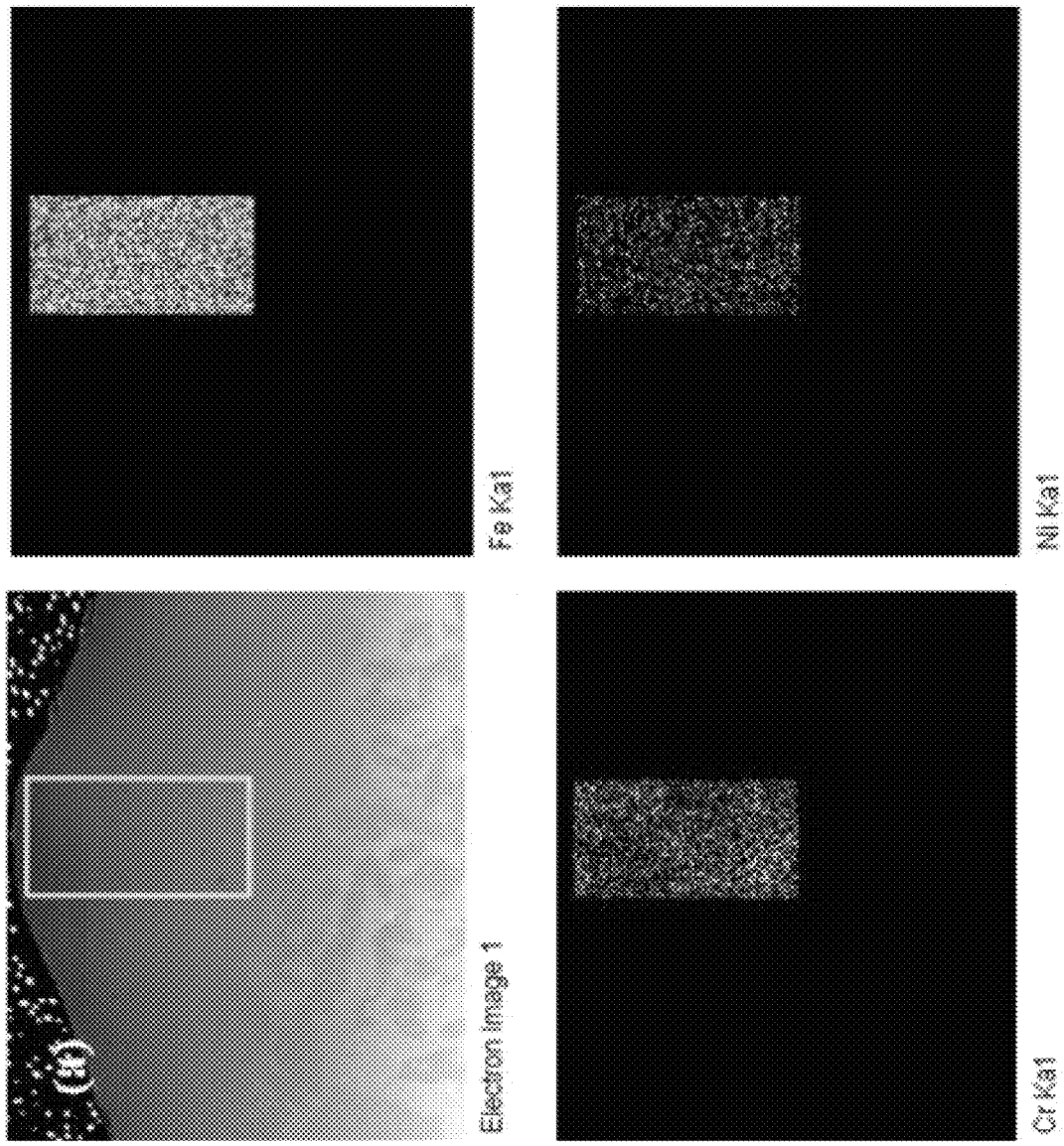
FIGS. 7A-7D shows EDS results for NC2 (10Ni10Cr), NC3 (15Ni15Cr), S1 (2SS1000), and S2 (4SS1000).
Figure 7B:
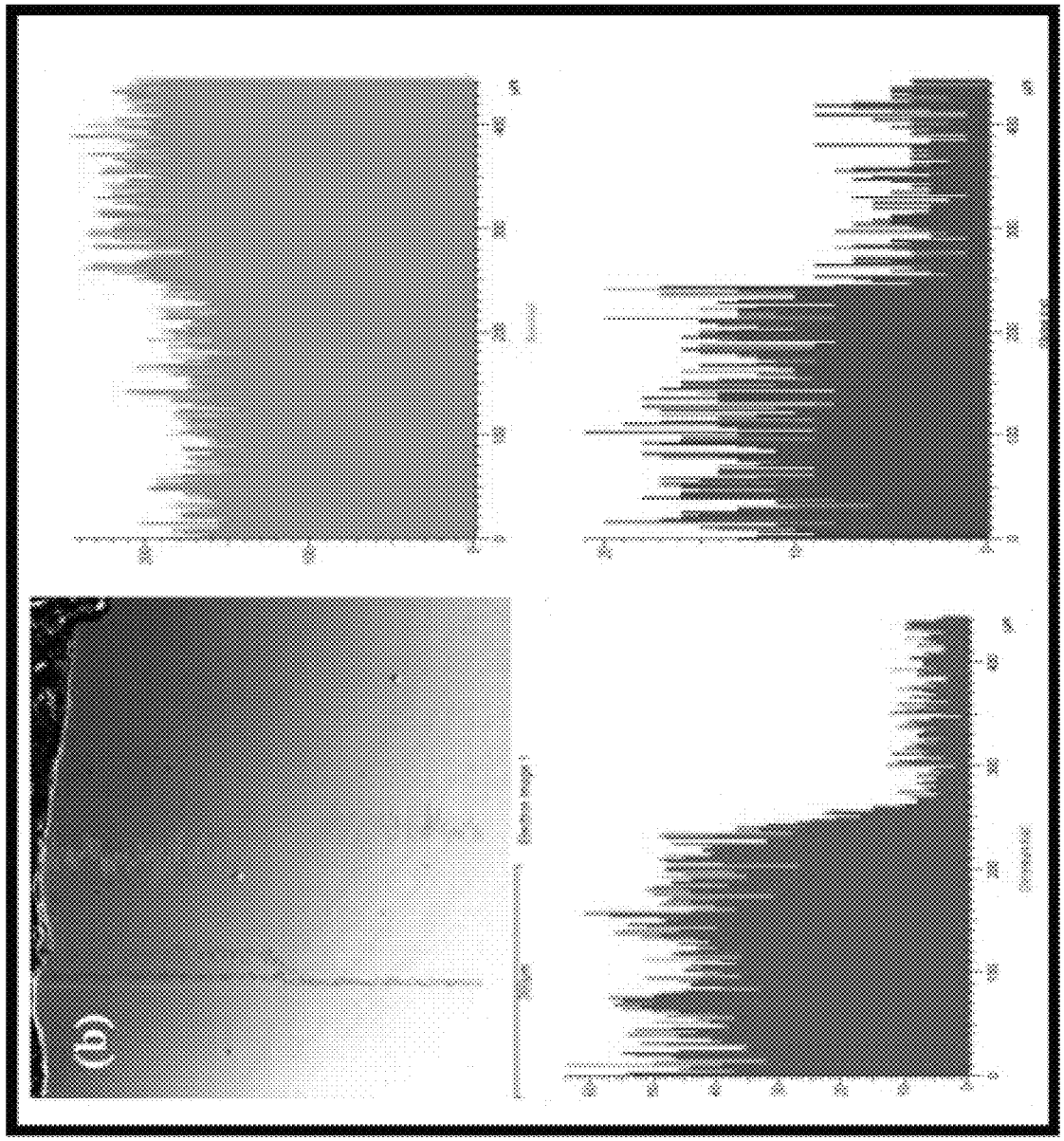
Figure 7C:
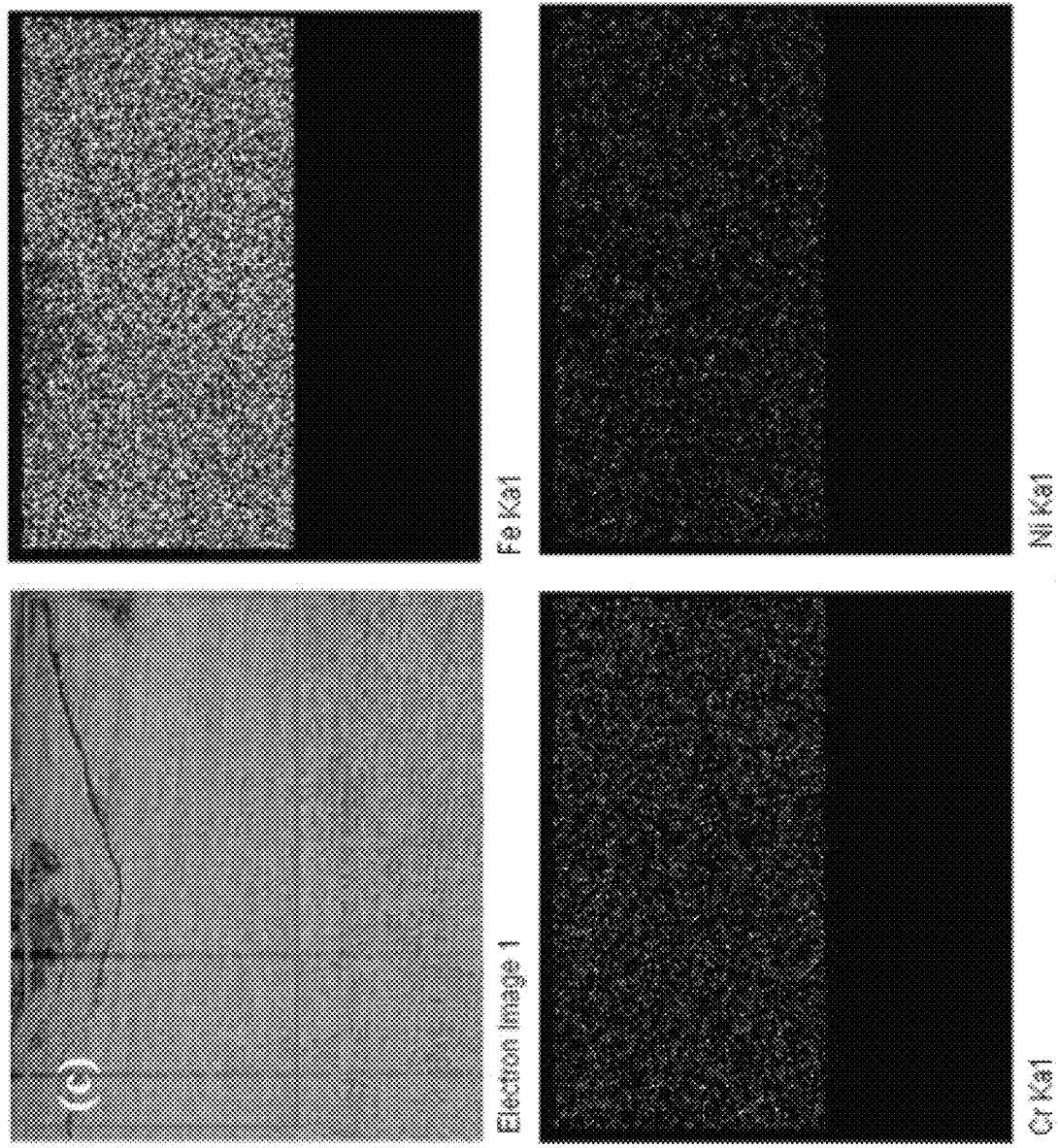
Figure 7D:
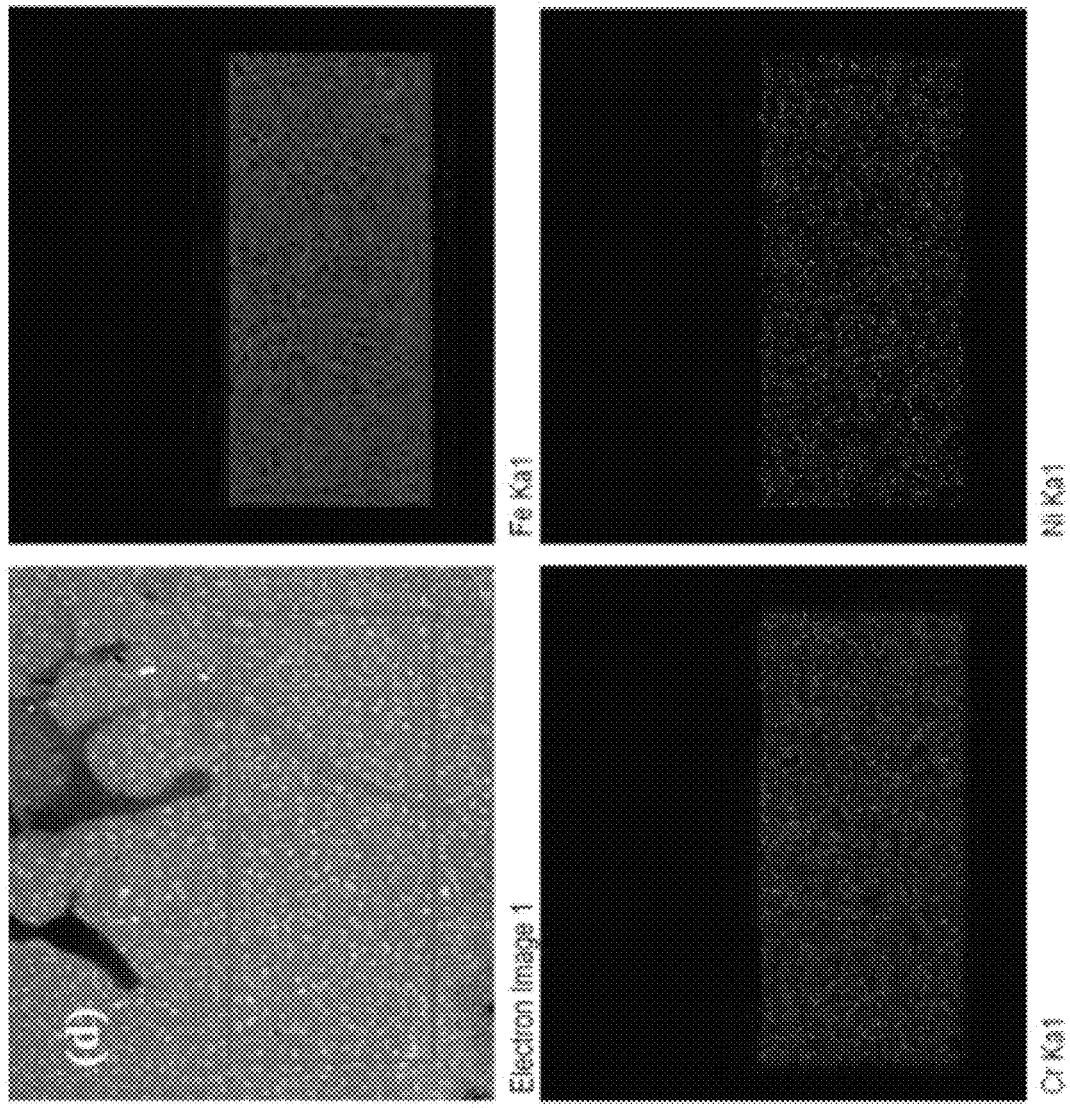

It may be observed that the surface enrichment of nickel in the sample N1 is 16.21%, with a balance of iron, while the substrate is almost entirely iron, with no measurable presence of nickel. This indicates that no measurable diffusion of nickel into the substrate layer occurred during casting. In the case of the sample NC1 (8Ni18Cr), the chemical analysis shows 7.79 wt % Ni and 15.85 wt % Cr in the surface alloyed layer. The analysis of the substrate in sample NC1 (8Ni18Cr) indicates some diffusion of alloying powders during the casting process. However, the chemistry remains within acceptable parameters to the ASTM A216 WCB grade (i.e., 0.5 wt % max for both Cr and Ni). Comparing the samples NC2 (10Ni10Cr) with NC1 (8Ni18Cr), and NC3 (15Ni15Cr), it can be inferred that applying less quantity of alloying powders, Ni and Cr (refer to Table 1), in the slurry results in the formation of a surface-alloyed layer with a lower percentage of Ni and Cr. The line scan of sample NC3 (15Ni15Cr), FIG. 7B, shows that the percentage of Ni and Cr drop to close to zero values after crossing surface/substrate boundary indicating that only surface of the samples was alloyed by the alloying element, while the bulk of samples remained the WCB alloy composition. EDS analysis of SS samples also confirmed the presence of alloying elements nickel and chromium in the surface alloyed layers. Since the 316L stainless steel powder already had over 70% iron, the percentages of nickel and chromium are lower in the surface alloyed layer.

Example 4: X-Ray Diffraction (XRD) Results

Figure 8A:
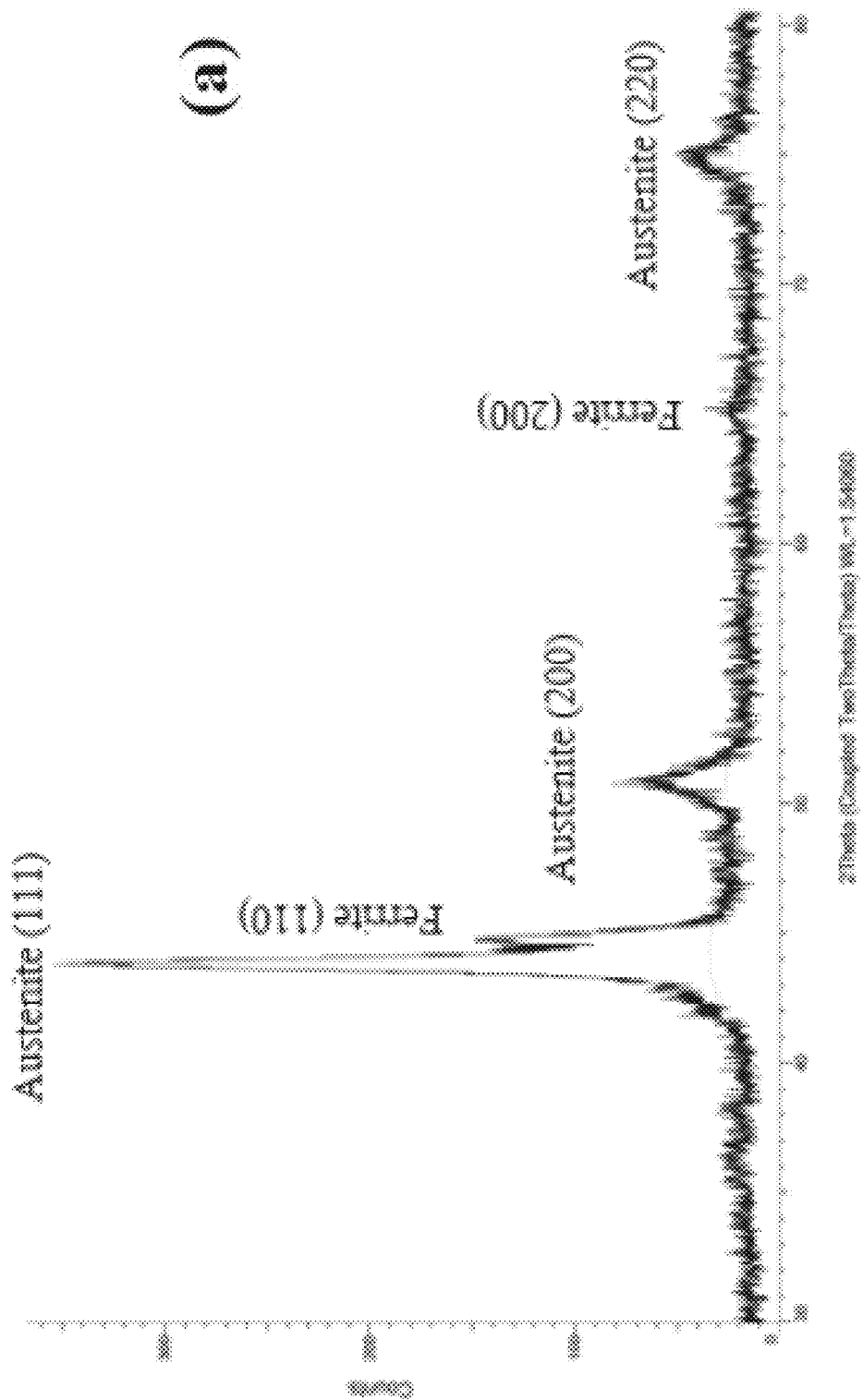
FIGS. 8A-8B show the XRD peaks for the surface of sample NC1 (8Ni18Cr), the surface of the CF3 stainless steel alloy, the surface of sample NC3 (15Ni15Cr), and the surface of sample S2 (4 gm Stainless Steel Powders 1000 um (4SS1000)).
Figure 8B:
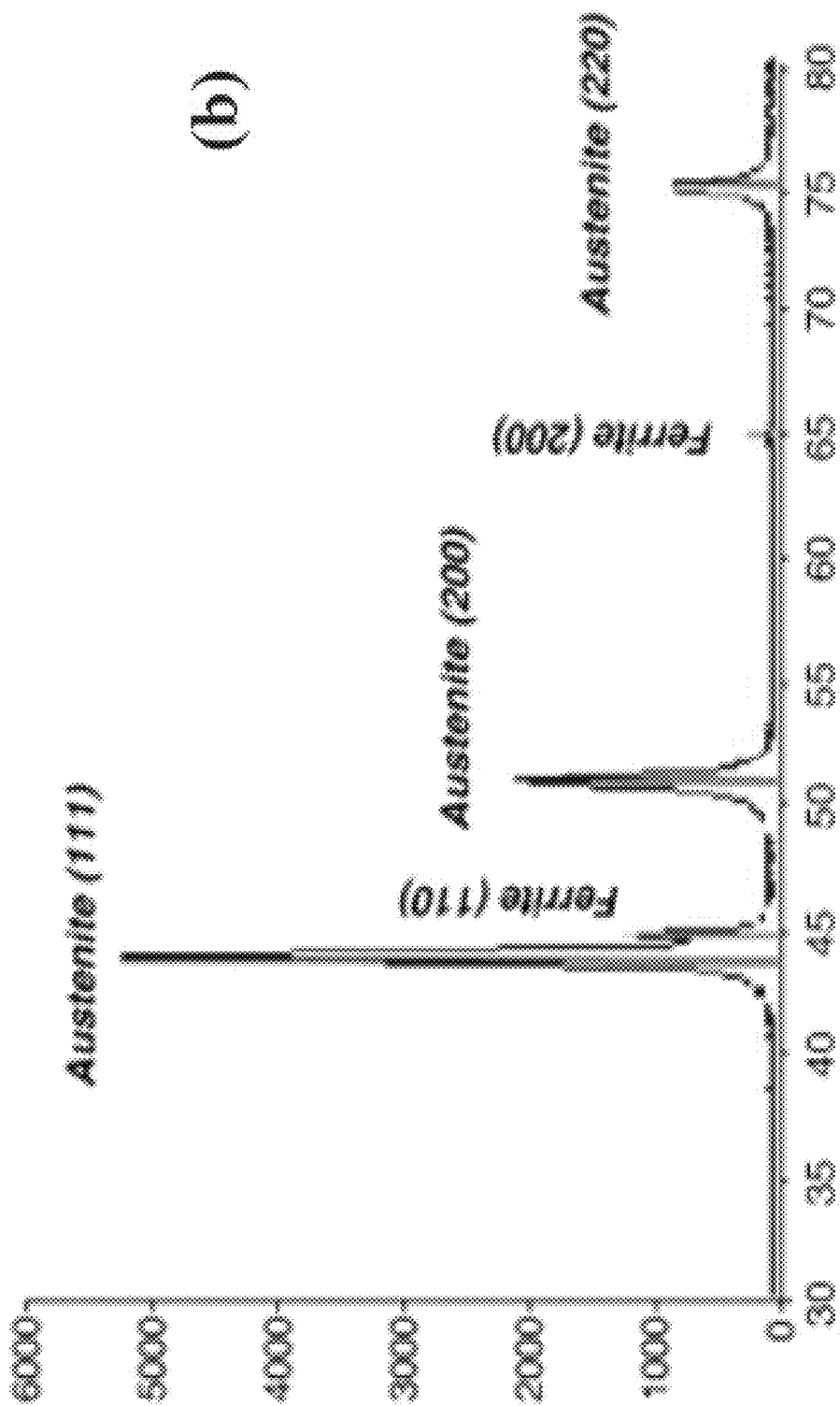

X-Ray Diffraction (XRD) was used to investigate the various crystal phases present on the surface of the samples. Sample NC1 was studied using XRD, and the result was compared to the peaks known for CF3 stainless steel to see if the peaks had similar phases. The result of the enriched surface sample is shown in FIG. 8A. The peaks for the surface of sample NC1 shows the presence of austenite and ferrite. Austenite has peak intensities near 43°, 52°, and 75°, while ferrite has peak intensities near 44° and 65°. When compared to the known XRD peaks for CF3 stainless steel (FIG. 8B), the peaks from sample NC1 are in the same locations, indicating the surface having a crystal structure primarily of austenite and ferrite. This is to be expected, since nickel is a known austenite stabilizer, and chromium is a ferrite stabilizer. CF3 is an austenitic stainless steel, and the results of the XRD show that the phases on the surface of sample NC1 are the same as a CF3 cast alloy. The XRD pattern also shows the presence of ferrite phase in the surface alloyed layer of the sample S2 as the atomic percentage of Cr is higher than that of Ni and thus ferrite is stabilized, whereas the weight percentage of Ni is not enough to stabilize austenite. This pattern was observed in other samples that were cast using 316L stainless steel alloying powder.

Example 5: Hardness Results

Figure 9:
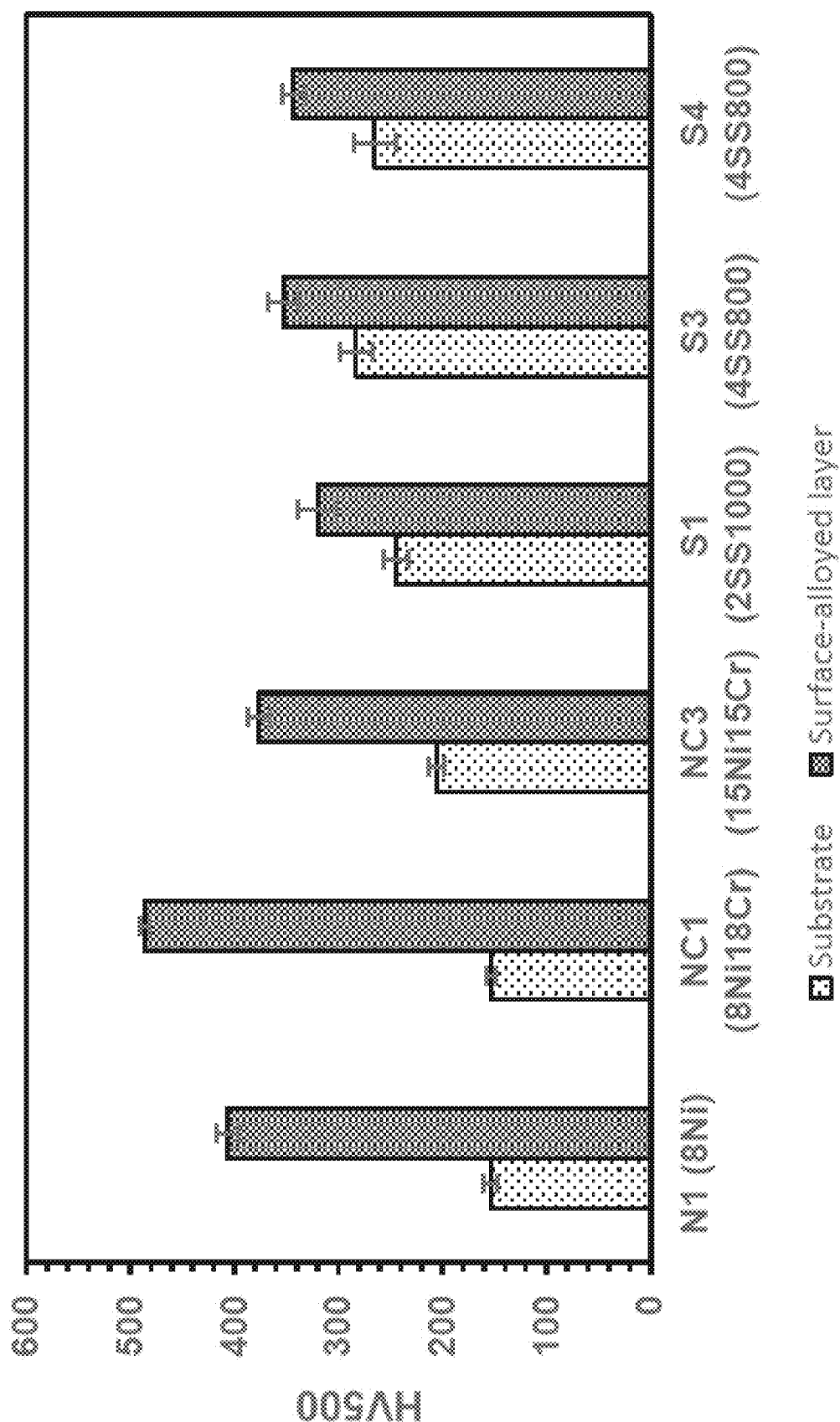
FIG. 9. Microhardness values of surface alloyed-layer and substrate in different surface alloyed samples.

The hardness results shown in FIG. 9 indicate that the average hardness of surface alloyed layers is greater than the substrate. These results show that the hardness increased as the alloying elements were melted and assimilated onto the surface of the casting. According to the results, up to 160%, 216%, and 30% hardness improvements were achieved when Ni, Ni+Cr, and SS were used as alloying powders, respectively. As discussed in section 3.3, there are formations of ferrite and austenite phases. The ferrite phase forms a substitutional solid solution with Ni at room temperature, as seen from FIGS. 6A-6D, and gives rise to a higher hardness as suggested by previous researchers. In sample NC1, the amount of Ni is lower as a result of Cr additions; however, the resultant hardness is higher than sample N1. This is because Cr, being a ferrite stabilizer, increases the ferrite content in the alloy. Higher ferrite leads to the higher dissolution of Ni in ferrite, which in turn leads to increased hardness. The increased hardness of the surface alloyed layer suggests that the wear resistance of the surface alloyed layer may be greater than that of WCB steel.

Example 6: Potentiodynamic Polarization

Figure 10:
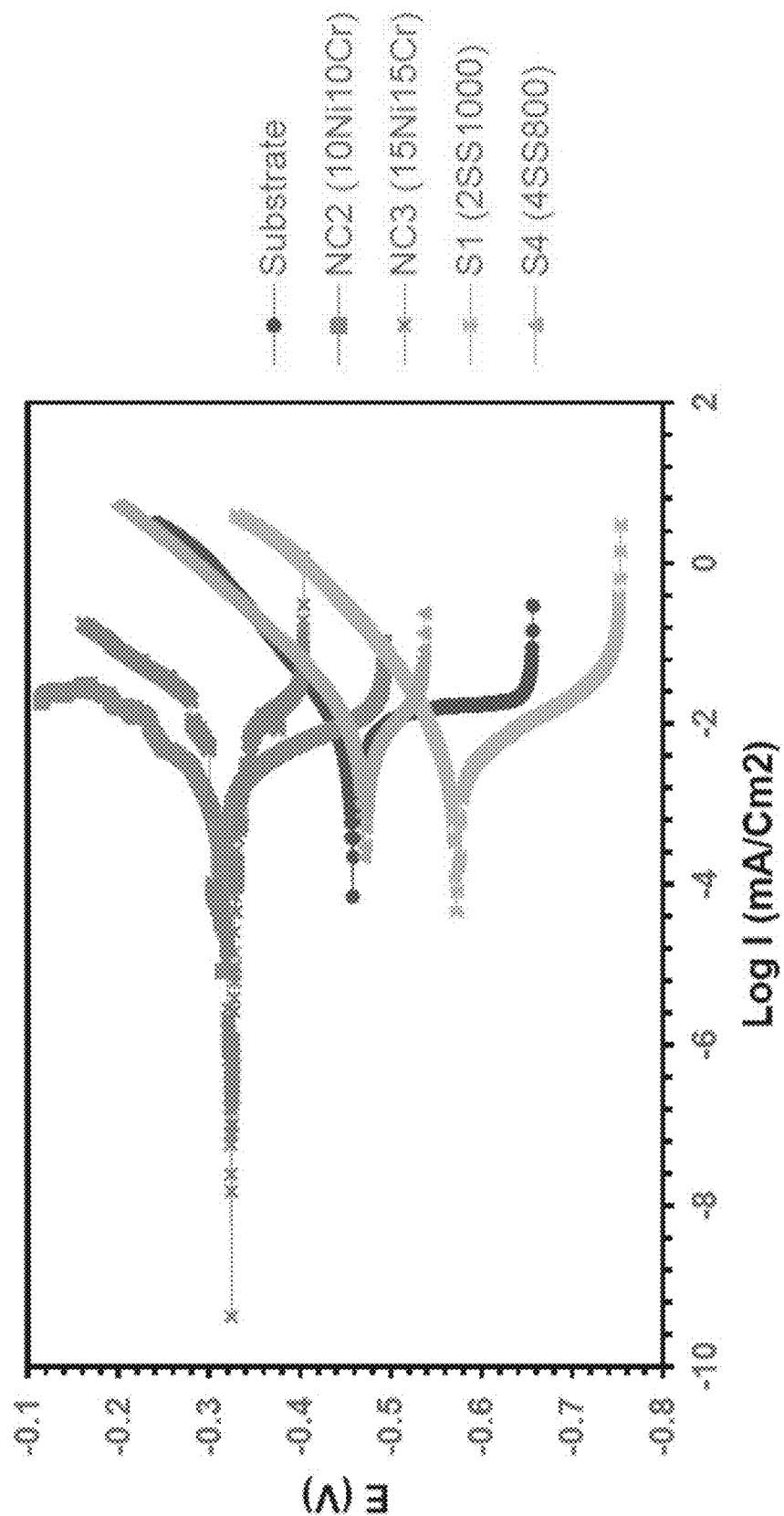
FIG. 10 shows the potentiodynamic polarization curve of selected surface-alloyed samples and substrate in 3.5% NaCl solution at scan rate 0.16 mV/sec

To evaluate the corrosion resistance of the surface-alloyed samples and the substrate, the potentiodynamic polarization test was carried out. FIG. 10 shows Tafel plots of the selected surface-alloyed samples and the substrate, and Table 5 lists their corrosion data.

TABLE 5

Corrosion potential and current density for each sample.

| Sample | $E_{corr}$ (V) | $I_{corr}$ (µA/cm$^2$) |
|---|---|---|
| Substrate | −0.44 | 10.47 |
| NC2 (10Ni 10Cr) | −0.314 | 2.14 |
| NC3 (15Ni 15Cr) | −0.3 | 1.15 |
| S1 ($2SS_{1000}$) | −0.58 | 3.86 |
| S4 ($4SS_{800}$) | −0.48 | 5.227 |

The measured corrosion resistance of the WCB substrate is consistent with the reported potentiodynamic polarization measurements of carbon steel using conventional three-electrode cylindrical Pyrex glass cell. In the reported experiments, 1M HCl solution was used as an electrolyte, which is similar to the 3.5% NaCl solution used in the experiments described herein. A decrease in the corrosion current densities of the surface-alloyed samples was observed when compared to the substrate. The percent decreases are 89% and 63% for samples NC3 (alloyed by Ni+Cr) and S1 (alloyed by SS powder), respectively. The higher corrosion resistance of NC3 compared to Si may be attributed to the higher percentage of Ni and Cr in its microstructure.

In general, there are two different approaches for enhancing the corrosion resistance of iron-based alloys: (1) incorporating alloying elements with greater thermodynamic stability, such as Ni, resulting in an increase in the electrode potential and reduction of anodic activation; and (2) facilitating the growth of a stable and protective passive layer which may resist corrosion by adding elements, such as Cr, to the microstructure. Ni and Cr are common alloying elements for improving the corrosion resistance of various iron alloys. Ni may shift the electrode potential to more positive values thus increasing corrosion resistance. Cr may induce the formation of the chromium oxide layer on the surface, which is highly protective against corrosion reaction. Additionally, as discussed in Example 4, incorporating Ni and Cr facilitates the formation of ferrite and austenite phases in the surface-alloyed layer. It has been reported that, due to the high level of Cr, austenitic stainless steel is the most resistant grade of stainless steel. As a general guideline, increasing the level of Cr in stainless steel compositions improves the corrosion resistance of the alloy. Therefore, the addition of high amounts of Ni and Cr to the metal slurry and the development of a uniform and stable alloyed-layer on the surface may contribute to the improved corrosion resistance of the surface-alloyed samples.

Example 7: Casting Procedure

Figure 11A:
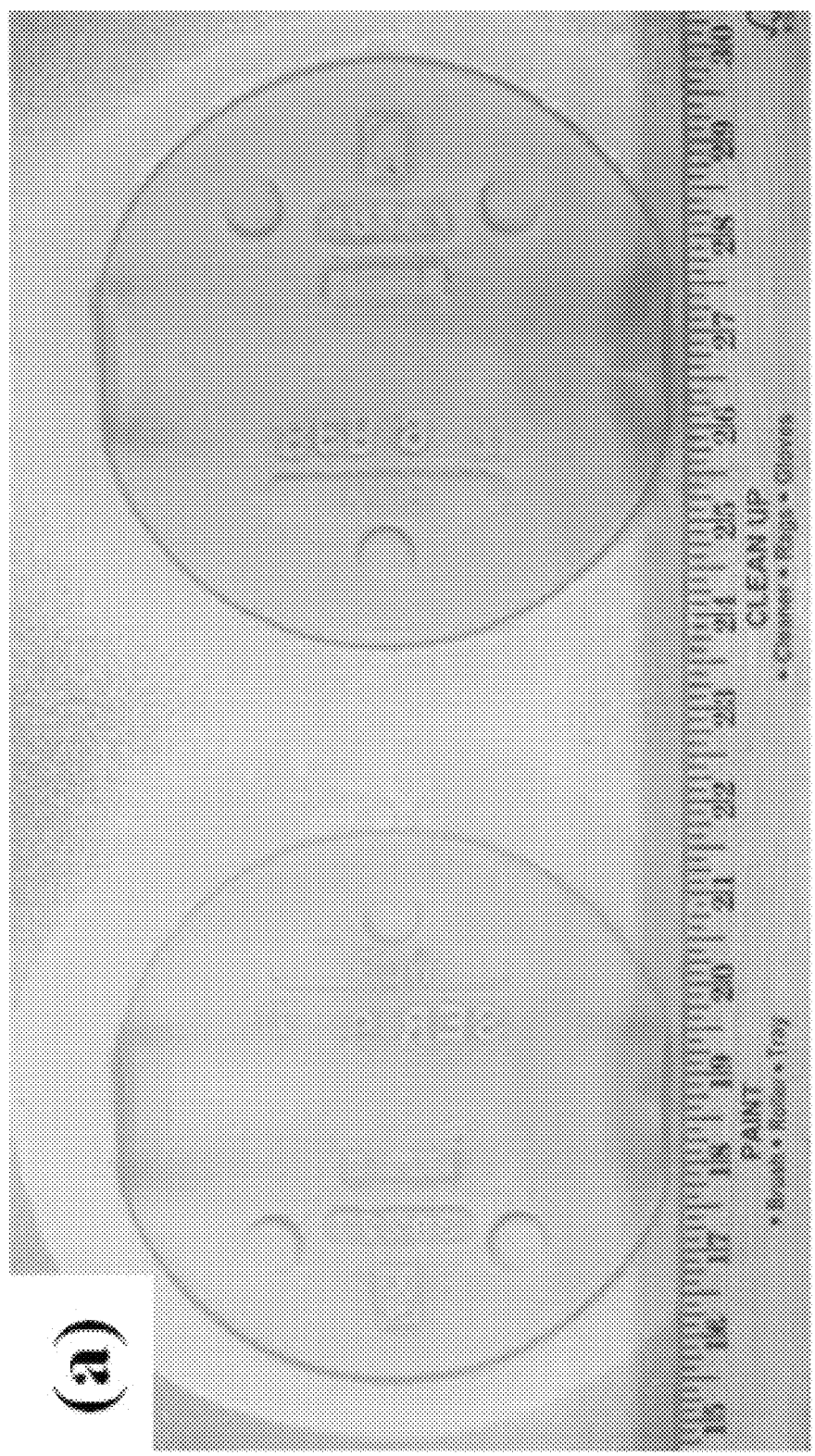
FIGS. 11A-11D show Butterfly Valve molds for industrial casting.
Figure 11B:
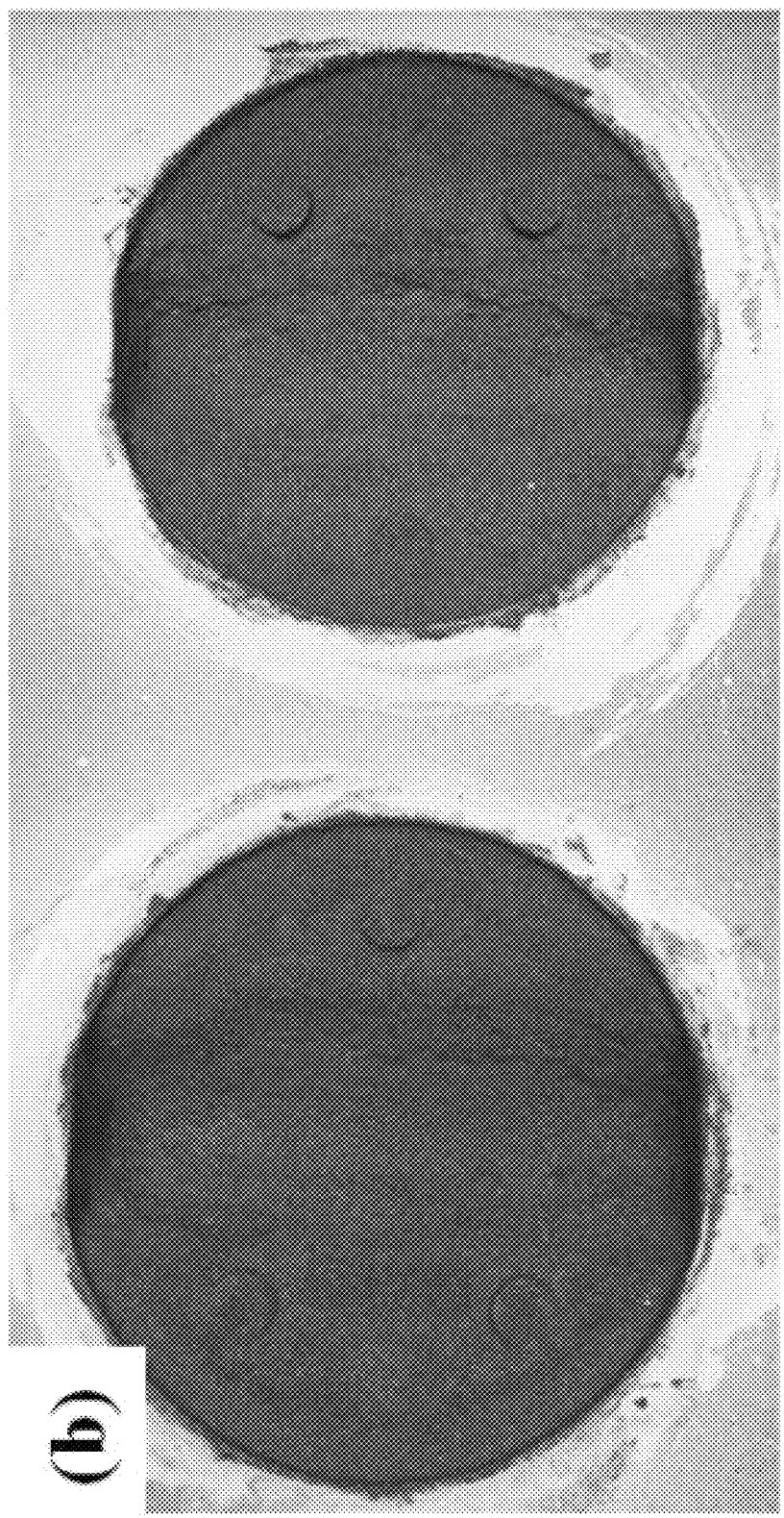
Figure 11C:
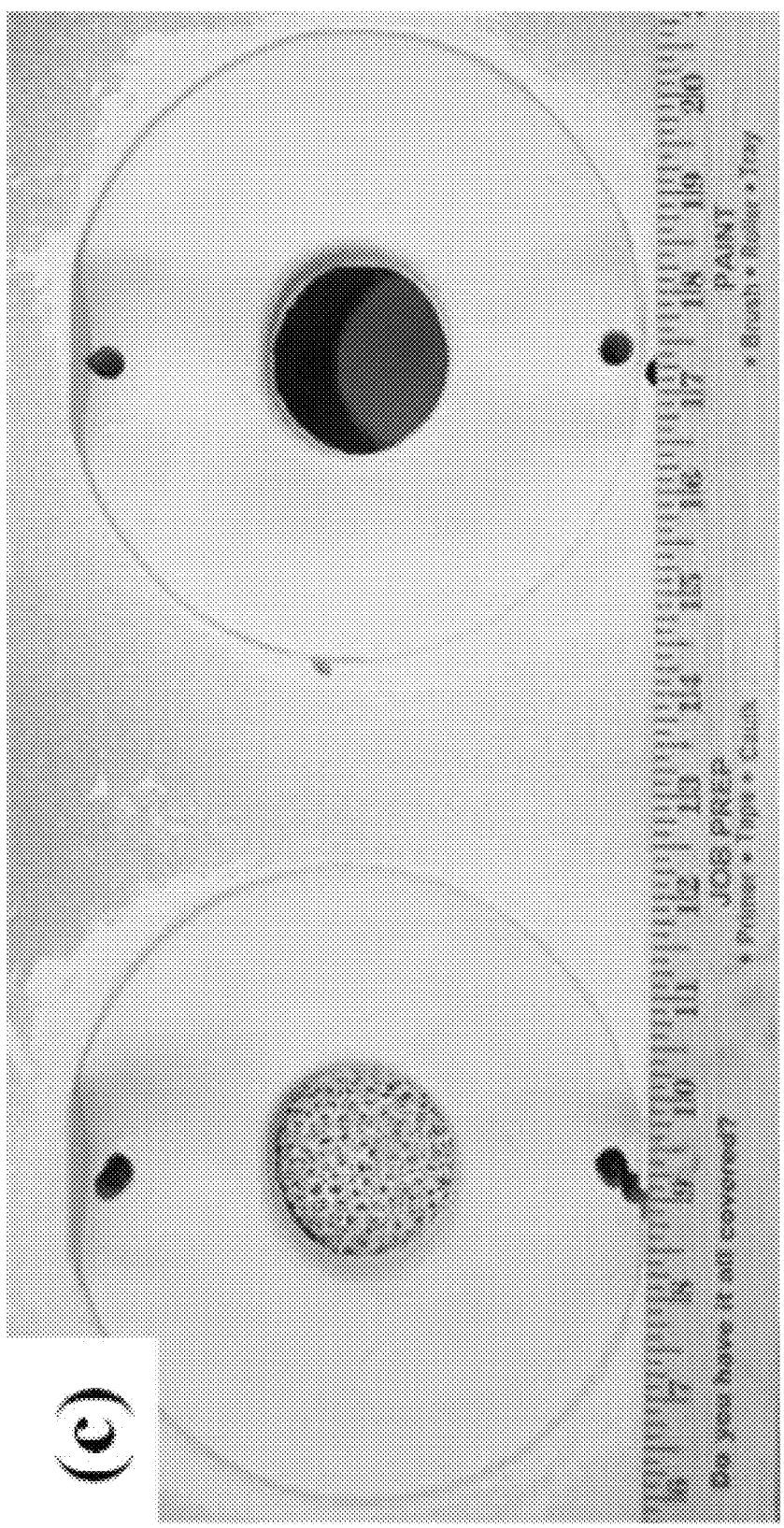
Figure 11D:
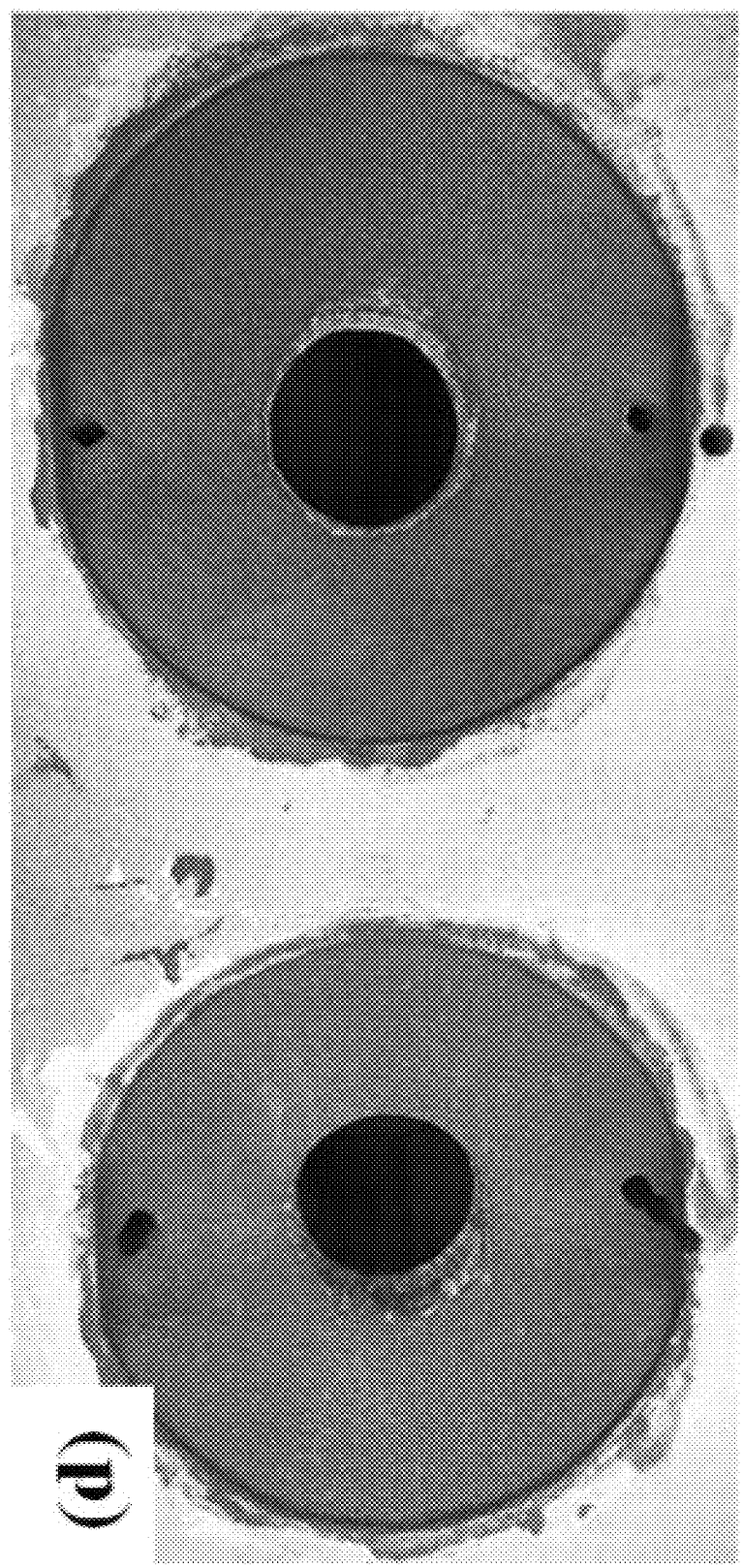

The industrial butterfly valve casting molds (FIGS. 11A-11D) were obtained from Badger Alloys, Inc. (hereby referred to as the industry) based in Milwaukee U.S.A to demonstrate surface alloying. FIGS. 11A and 11C shows pictures of the actual molds. The molds were made from 80-grain fineness silica sand. A phenolic urethane organic binder system (binder level ~1.2%) was used to ensure sufficient gas permeability and surface finish during casting. The catalyst used was set to allow for an 8 to 10-minute work-strip time. The sand and binder/catalyst chemicals were mixed in an Omega Tinker industry mixer and then unloaded onto the pattern. The sand was manually smoothed, as well as with a strike-off bar, and allowed to set for 10 minutes. After the curing was complete, and the mold halves were extracted from the pattern by flipping inversion of the pattern using a manipulator crane. The mold cavities were coated with a refractory wash (REFCOTEC REFCOHOL 1010) to avoid any reaction between the molten metal and the sand. After applying binder and surface alloying elements on mold and allowing the slurry to dry and harden (FIGS. 11B and 11D), the molds were closed, and a zircon filter was placed in the down sprue of the mold.

Figure 12A:
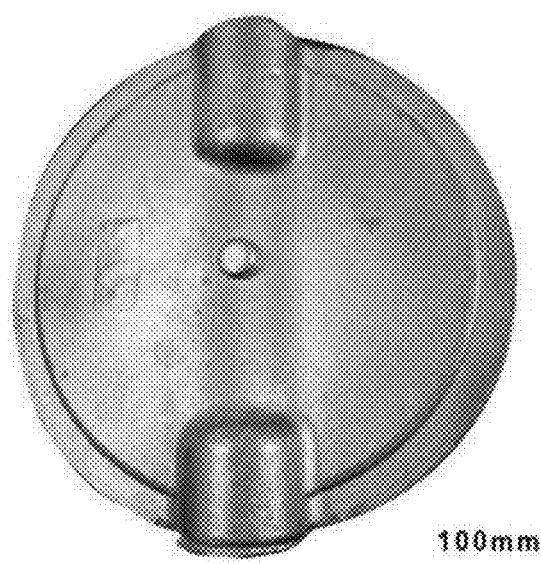
FIG. 12A shows a commercially available butterfly valve.
Figure 12B:
FIG. 12B shows a surface alloyed butterfly valve prototypes cast at Badger Alloys and UWM.

Then, three samples were made using two different techniques. The first two samples were prepared by adding the Ni and Cr powders onto a wet refractory wash coating, and the third sample was made using a slurry containing Ni, Cr, Fe—Mn, Fe—Si, and Mo mixed with Sodium Polyacrylate (NaPA) binder. FIG. 1 shows a schematic representation of the sand mold before the WCB steel melt is poured. Once the mold surfaces were coated, they were sealed using SonicSTIK®—Core & Mold Adhesive. The molds were then transported back to Badger Alloys for casting. Once the castings had been poured, they were shaken out, shot blasted with steel shots, risers and gating were cut off at the industry and were then transported back to the lab for analysis. FIGS. 12A-12B show a commercially available butterfly valve (FIG. 12A), and a surface alloyed butterfly valve (FIG. 12B) prototypes cast at Badger Alloys in the present study. The objective was to quantify the levels of enrichment that could be achieved in an industrial setting for casting a component which requires high quantities of alloying elements on the surface for wear and corrosion resistance. The chemical composition of the WCB base alloy is presented in Table 6.

TABLE 6

Elemental composition of WCB Steel.

| Element | Carbon (C) | Manganese (Mn) | Phosphorus (P) | Sulfur (S) | Silicon (Si) | Iron (Fe) |
|---------|------------|----------------|----------------|------------|--------------|-----------|
| Weight % | 0.3 Max | 1 | 0.04 | 0.045 | 0.6 | Balance |

Example 8: Metallographic Preparation

Surface alloyed cast samples were cut and metallographically prepared. The samples were carefully ground with SiC abrasive papers through a 120-grit followed by a 9 μm diamond suspension, a 3 μm diamond suspension, and finished using Buehler MasterPrep 0.05 μm alumina suspension. The etching was performed using a 5% Nital solution for a period of 5 seconds. This etchant reveals only the microstructure of the base metal but does not affect the surface alloyed layer. The surface alloyed layer was electroetched using a solution of 85% ethanol and 15% HCl and passing a 2 Amp current through the electrode for a period of 1 minute. Kalling's Reagent 2 was used to reveal the grain boundaries of the surface alloyed layer.

Example 9: Optical Microscopy Methods

Optical Microscopy was performed for microstructural study of the sample and to identify the phases present. It was to identify a ferritic (α-Fe) and pearlitic microstructure in the base metal. The Nikon Eclipse TS100 optical microscopes with Clemex Image Analysis software and ImageJ were used to investigate the microstructure of the surface-alloyed samples.

Example 10: Scanning Electron Microscopy (SEM) and X-Ray Diffraction (XRD)

Scanning Electron Microscopy (SEM) was used to quantify the thickness of the interface. Energy Dispersive Spectroscopy (EDS) was used for the chemical composition analysis of the samples. Backscatter mode was utilized to evaluate the distribution of the phases in the surface alloyed layer. JOEL JSM-6460 LV was the system utilized with the accelerating voltage set at 15 kV for SEM and EDS analysis. The EDS scan was used to quantify the levels of Fe, Ni, Cr, Mn, and Mo in the surface alloyed samples. Backscattered electron (BSE) SEM was performed at an accelerating voltage of 20 kV on composition mode imaging. Phase identification was carried out using a Bruker D8 Discover X-ray diffractometer (XRD).

Example 11: Linear Polarization Test

Linear polarization testing was conducted to measure the corrosion current of the surface of the sample. The material was polarized during this test on the order of +/−25 mV on an open circuit potential, and the potential was measured in the absence of current. As the potential of the working electrode is changed, a current will be induced to flow between the working and counter electrodes, and the sample's resistance to polarization is found by taking the slope of the potential vs. current curve. The advantage of this test is that it is nondestructive, unlike the Potentiodynamic polarization test, and it does not change the chemistry of the surface. The samples were conditioned in an ASTM G61 3.56% saltwater solution for one hour and then underwent a linear polarization test for 10 minutes. A potentiostat, SP-200 BioLogic, was used to run the test. The electrolyte used for the corrosion test was 3.5% NaCl solution. The surface-alloyed samples and graphite rod were used as the working electrodes and counter electrodes, respectively. For the reference electrode, Ag/AgCl electrode was used. After the test was completed, the corrosion current was extrapolated from the results of the experiment and was used to calculate the corrosion rate. To calculate the corrosion rate, the corrosion current must be changed to the corrosion current density, using the following equation:

$$i_{corr} = I_{corr}/A$$

where,
$i_{corr}$=Corrosion current density, ($\mu A/cm^2$)
$I_{corr}$=Total anodic current, ($\mu A$)
A=Exposed specimen area, $cm^2$ The equivalent weight is also needed to calculate the corrosion rate. The equivalent weight (EW) for each element and alloy is different, and the equation which follows shows how to calculate an equivalent weight for a pure material. The WCB equivalent weight was treated as a pure material because it consists of over 99% iron. EW may be calculated as:

$$EW = W/n$$

where,
EW=equivalent weight
W=atomic weight of the element
n=the valance of the element For an alloy, the equivalent weight must total the equivalent weights of each metal in the system, and then must be added up and divided by 100. Below is the equation which details how to calculate equivalent the weight of an alloy:

$$Q = \sum (n_i * f_i)/W_i$$

where:
$f_i$=the mass fraction of the $i^{th}$ element in the alloy
$W_i$=the atomic weight of the $i^{th}$ element in the alloy
$n_i$=the valence of the $i^{th}$ element in the alloy The density of the material must also be considered to calculate the corrosion rate. To find the density, the following equation must be applied:

$$\rho = \text{density in g/cm}^3$$

After calculating the necessary components for the corrosion rate equation, they can be substituted back into the equation for the corrosion rate (CR), which is as follows:

$$CR = K_1 * (i_{corr}/\rho) * EW$$

CR is given in mm/year and $i_{corr}$ is given in $\mu A/cm^2$.

Example 12: Microstructural and Phase Analysis

Figure 13A:
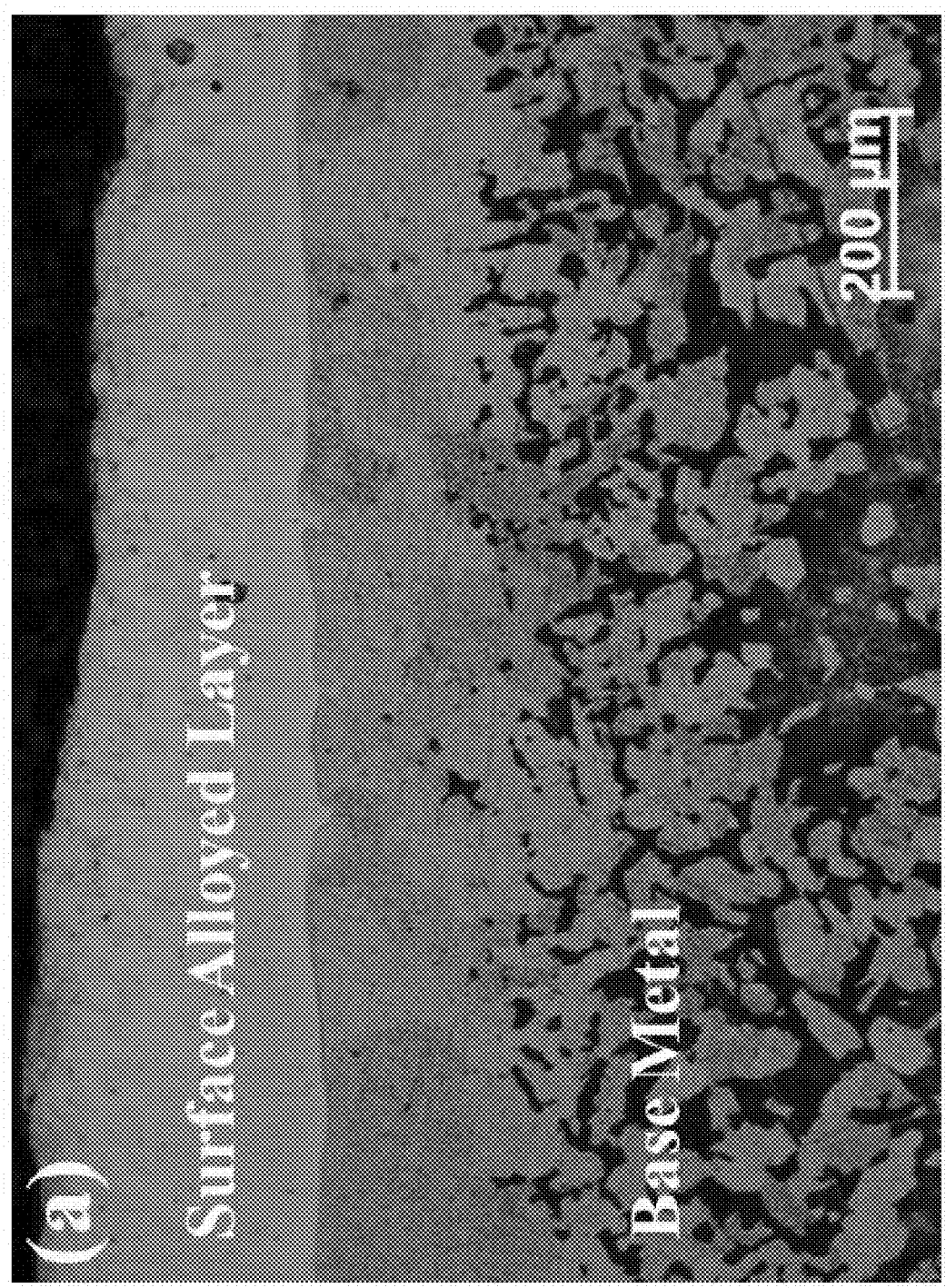
FIG. 13A shows an optical image of the as-cast BV1.
Figure 13B:
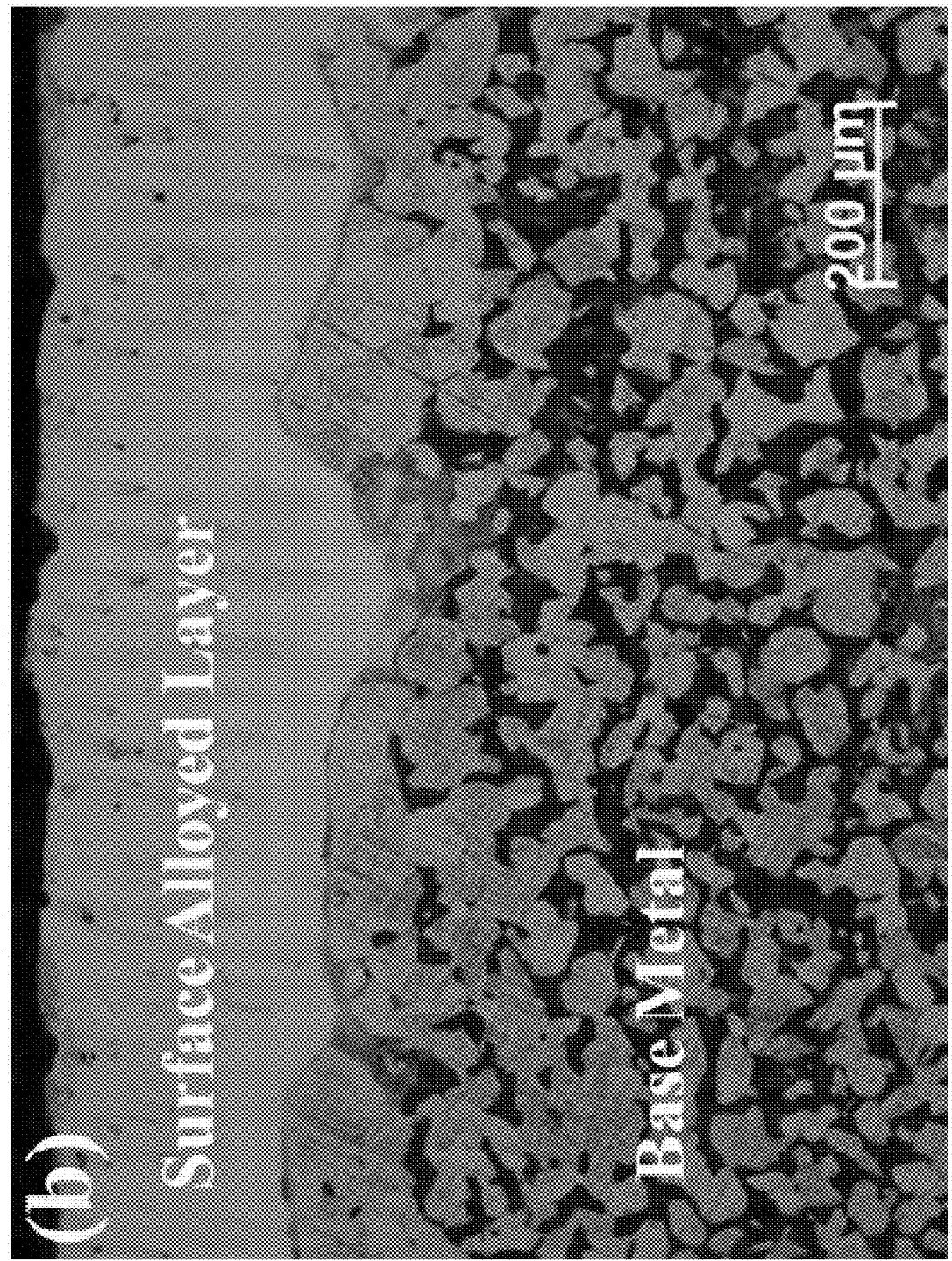
FIG. 13B shows an optical image of the as-cast BV2.
Figure 14:
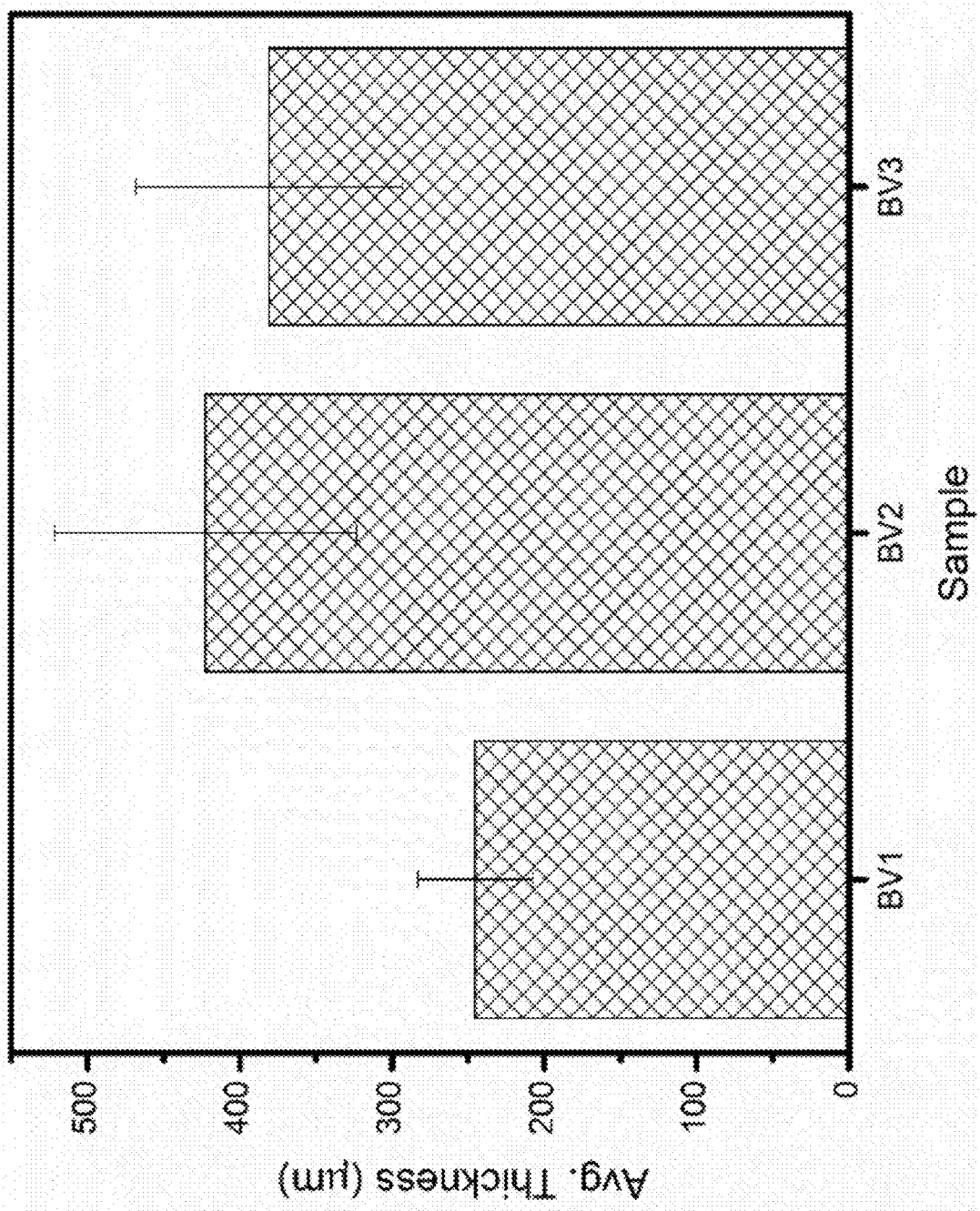
FIG. 14 shows the average thickness of the surface alloyed layer in three castings of surface alloyed butterfly valves.

Optical micrographs of the cross-section of surface alloyed as-cast samples are shown in FIGS. 13A-13B. A relatively uniform and continuous surface alloyed layer was observed in all samples. Occasional microporosity is observed in the surface alloyed layer. The average thickness of the surface alloyed layer is given in FIG. 14.

Figure 15A:
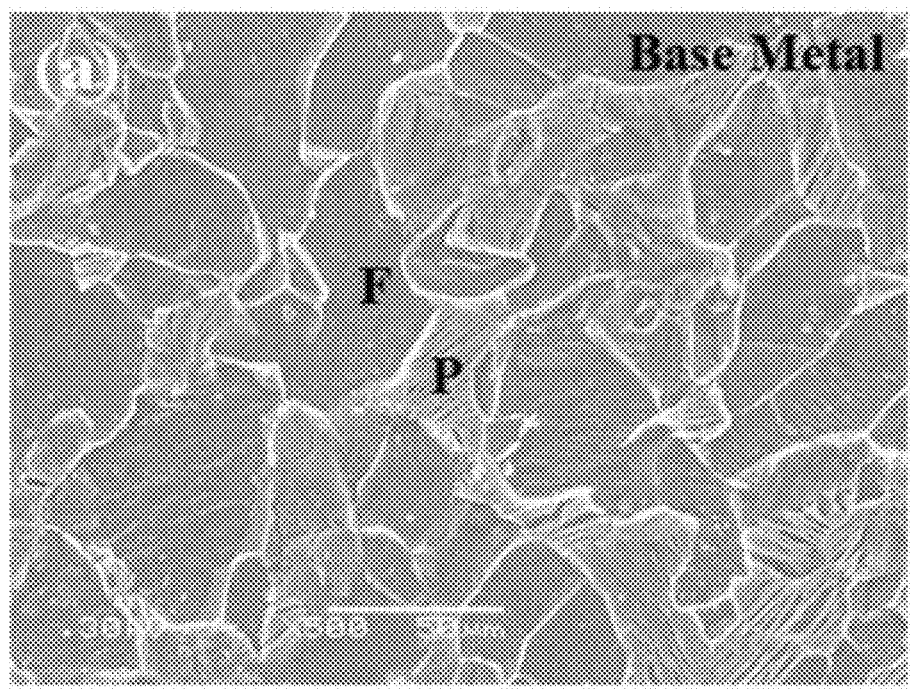
FIG. 15A shows the base metal for the butterfly valve casting #1 (BV1). F=ferrite and P=pearlite.
Figure 15B:
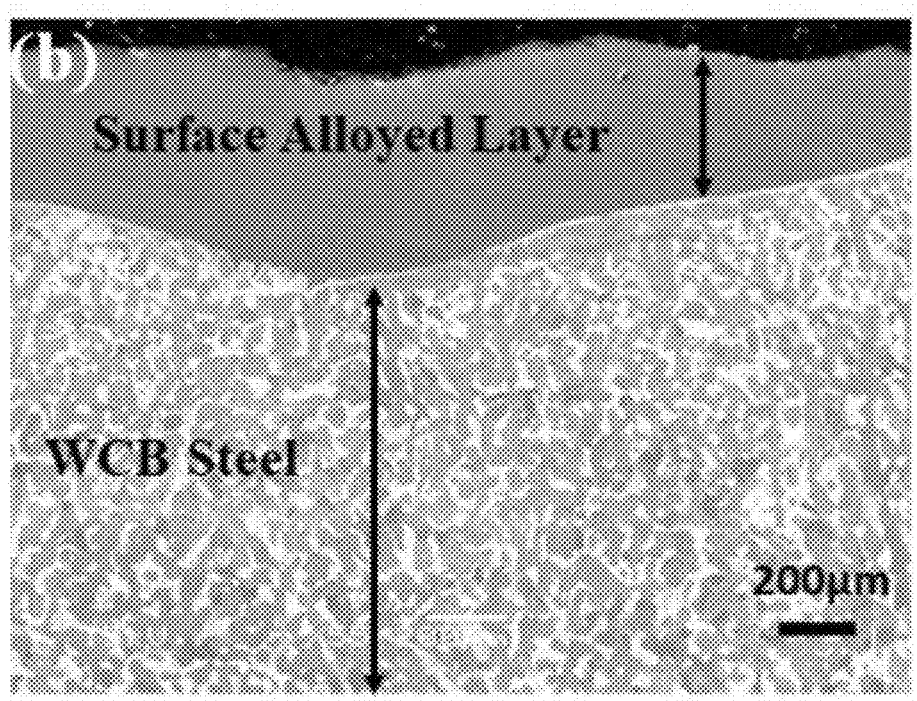
FIG. 15B shows the BV1 surface alloyed layer in as cast condition.
Figure 15C:
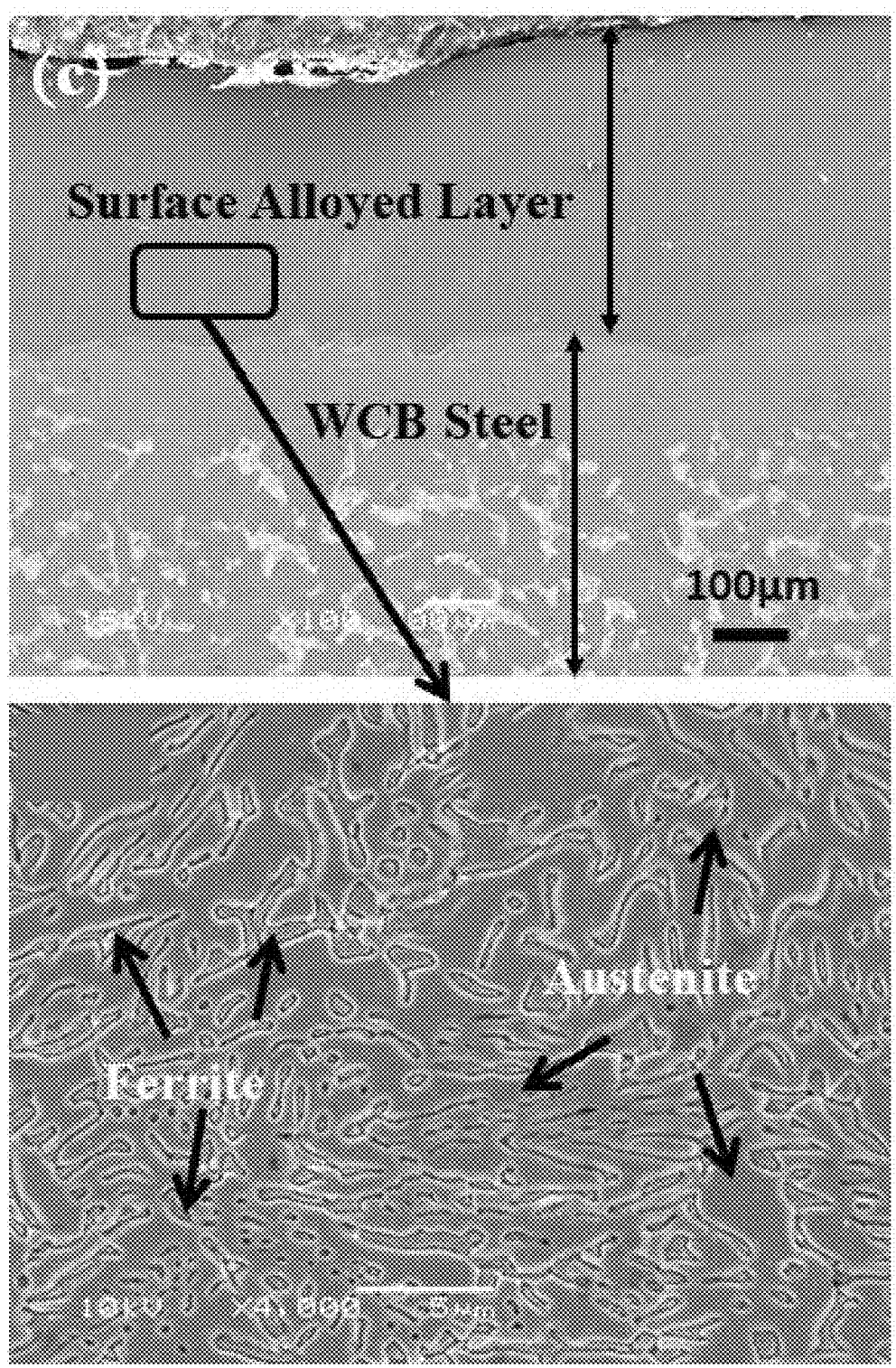
FIG. 15C shows the BV2 surface alloyed layer in as-cast condition (top) and the austenite-Ferrite microstructure of the surface alloyed layer (bottom).
Figure 15D:
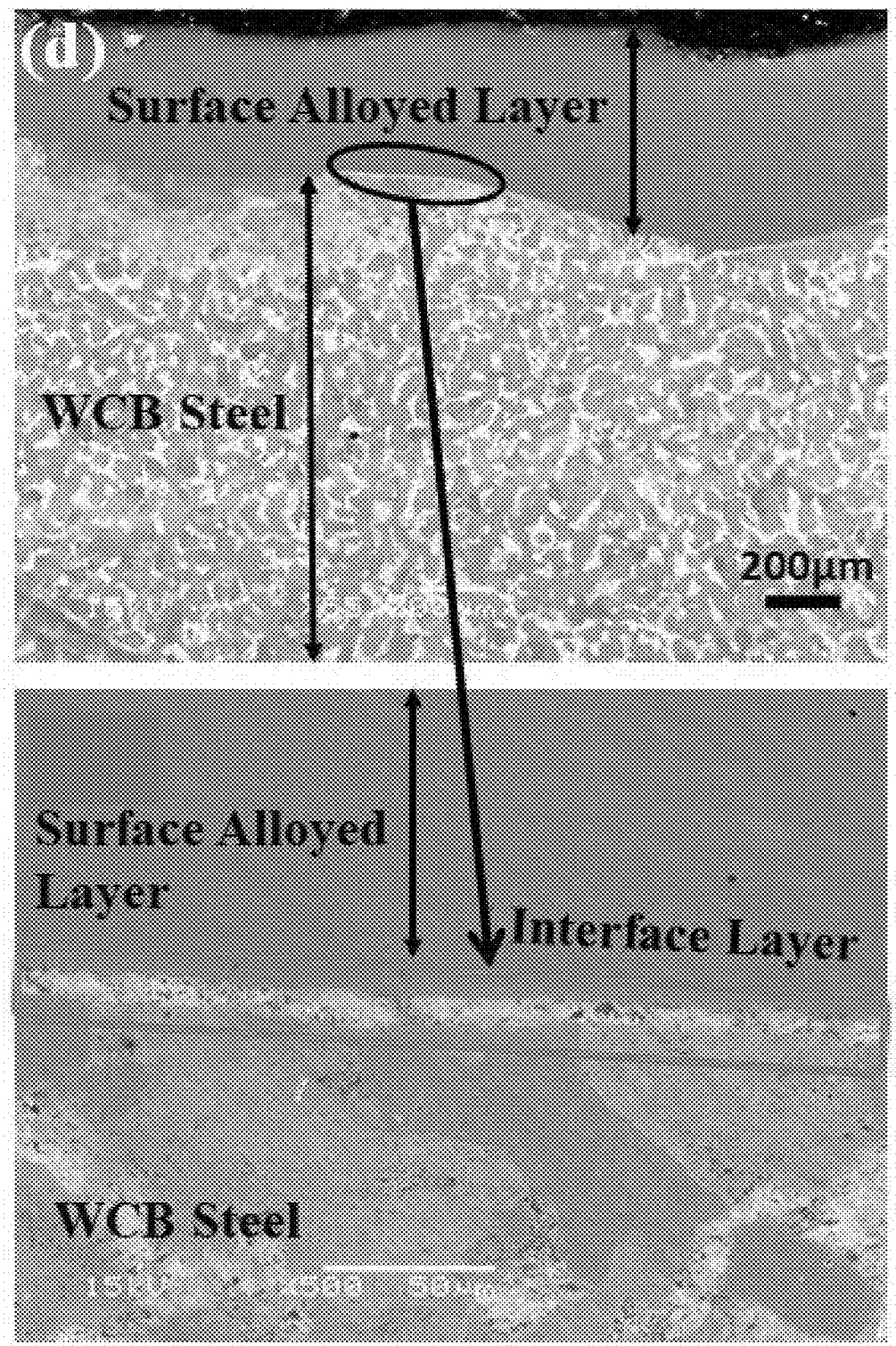
FIG. 15D shows the BV1 surface alloyed layer in as cast condition (top) and the interface layer between surface alloyed layer and the base metal (bottom).

Electro-etching of the surface alloyed layer was performed using an etchant made with 15% HCl and 85% ethanol and passing a 2 Amp current using an electrode placed on the surface alloyed layer. The base metal (FIG. 15A) shows a ferrite (F) and pearlite (P) microstructure, which is typical of WCB steel. FIGS. 15B-15D demonstrate the cross-section macro-morphology of the surface alloyed layer, indicating a surface alloyed layer free of cracks or porosity. The interface layer between the base metal and the surface alloyed layer does not show the presence of cracks.

The microstructure at the interface of the surface alloyed layer, and the base metal shows metallurgical bond. The microstructure in a typical surface alloyed layer (FIG. 15C (bottom)) is composed of austenite (γ) phases in the shape of elongated islands dispersed in the ferritic (α) matrix and free of precipitates. In addition, the morphology of the austenite phase ranged from elongated islands to an equiaxed form. The EDS line scan results of surface alloyed sample BV3 (FIGS. 16A-16B) shows the change in the gradient of various alloying element content from the substrate to the surface alloyed layer. Table 8 lists the composition of the surface-alloyed layer and the interface.

TABLE 7

Weight of alloying elements used for the surface alloying of the butterfly valves.

| Sample | Binder Medium | Ni (g) | Cr (g) | Fe—Mn (g) | Fe—Si (g) | Mo (g) | Powder/Area (g/cm²) |
|---|---|---|---|---|---|---|---|
| BV1 | REFCOHOL 1010 | 0.51 | 1.19 | — | — | — | 0.106 |
| BV2 | REFCOHOL 1010 | 0.8 | 1.84 | — | — | — | 0.165 |
| BV3 | NaPA Binder | 0.56 | 2.19 | 0.11 | 0.12 | 0.30 | 0.205 |

TABLE 8

Chemical composition of the surface alloyed layer and interface layer in sample BV3 (Table 7 as determined using spark spectrometer).

| Elemental Composition (wt %) | Surface Alloyed Layer | Interface Layer | WCB Base Metal |
|---|---|---|---|
| Cr | 23.2 | 3.80 | <0.5 |
| Ni | 6.4 | 3.89 | <0.5 |
| Mo | 3.3 | — | <0.2 |
| Mn | 1.1 | 1.04 | <1 |
| Si | 0.7 | 0.54 | 0.6 |
| Fe | Balance | Balance | Balance |

Figure 16A:
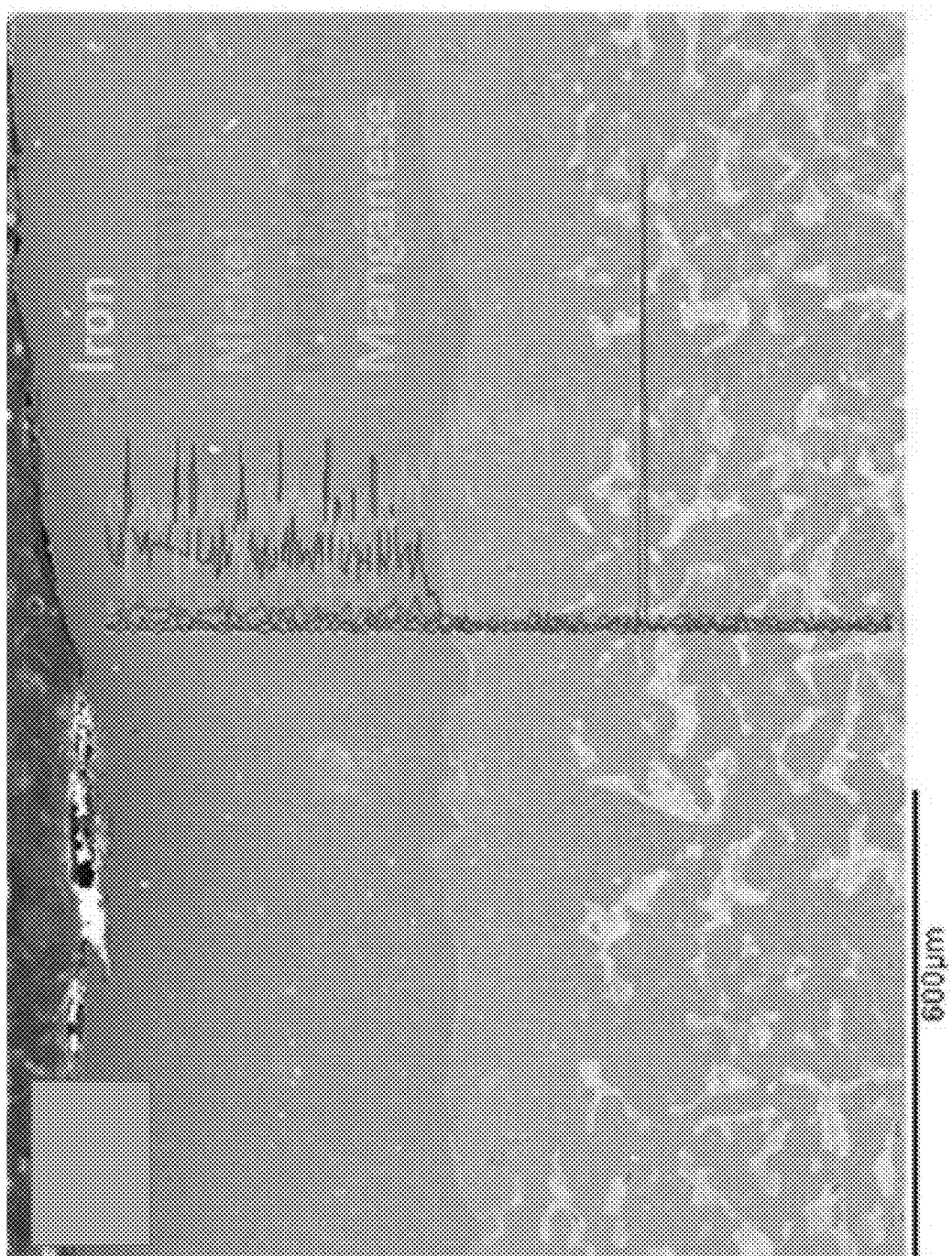
FIG. 16A shows the location of the EDS line scan on the cross-section of the BV3 surface alloyed sample across the base metal and surface alloyed layer.
Figure 16B:
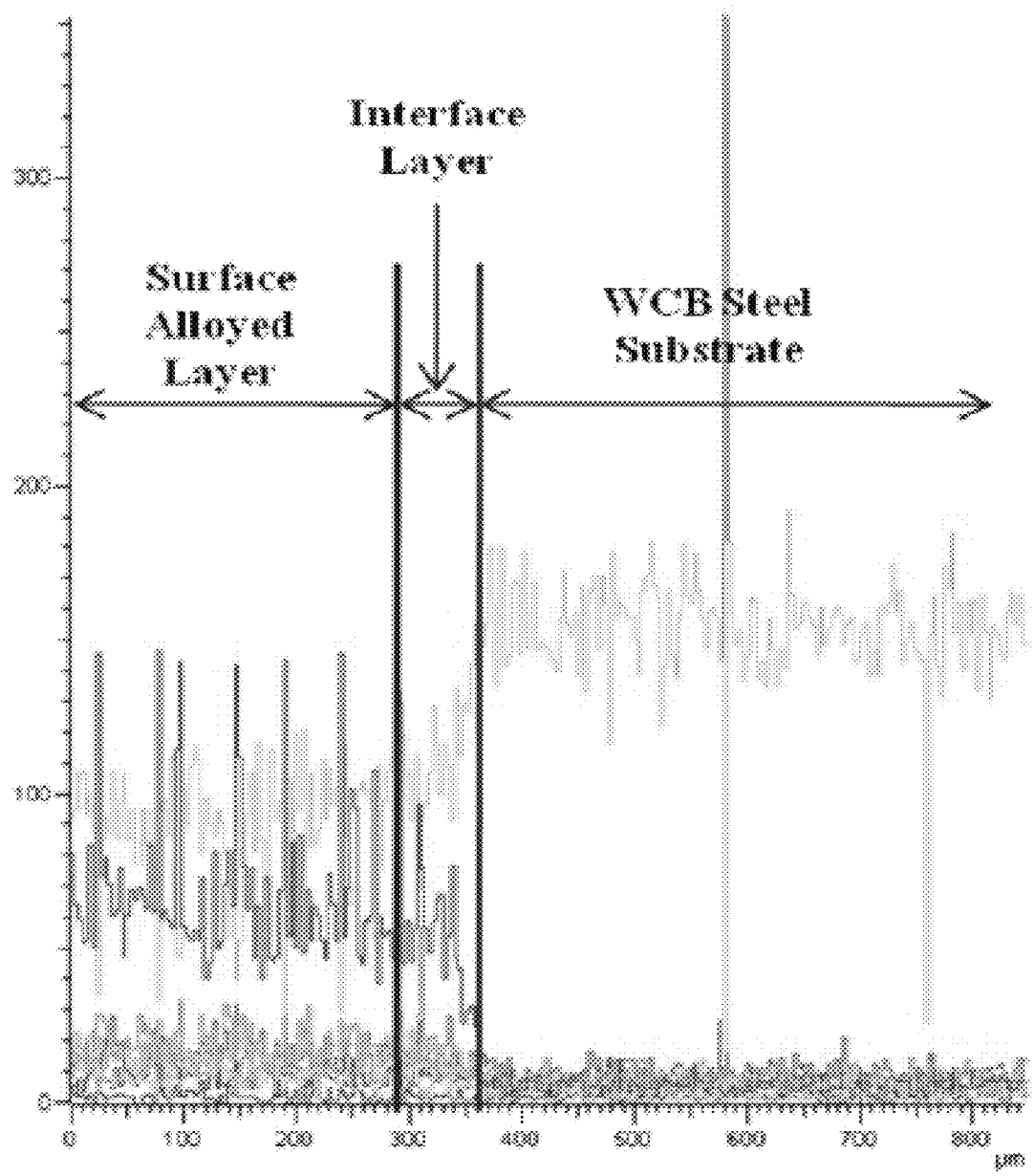
FIG. 16B shows the of elemental concentration vs. distance in the EDS line scan on the cross-section of the BV3 surface alloyed sample across the base metal and surface alloyed layer.
Figure 17:
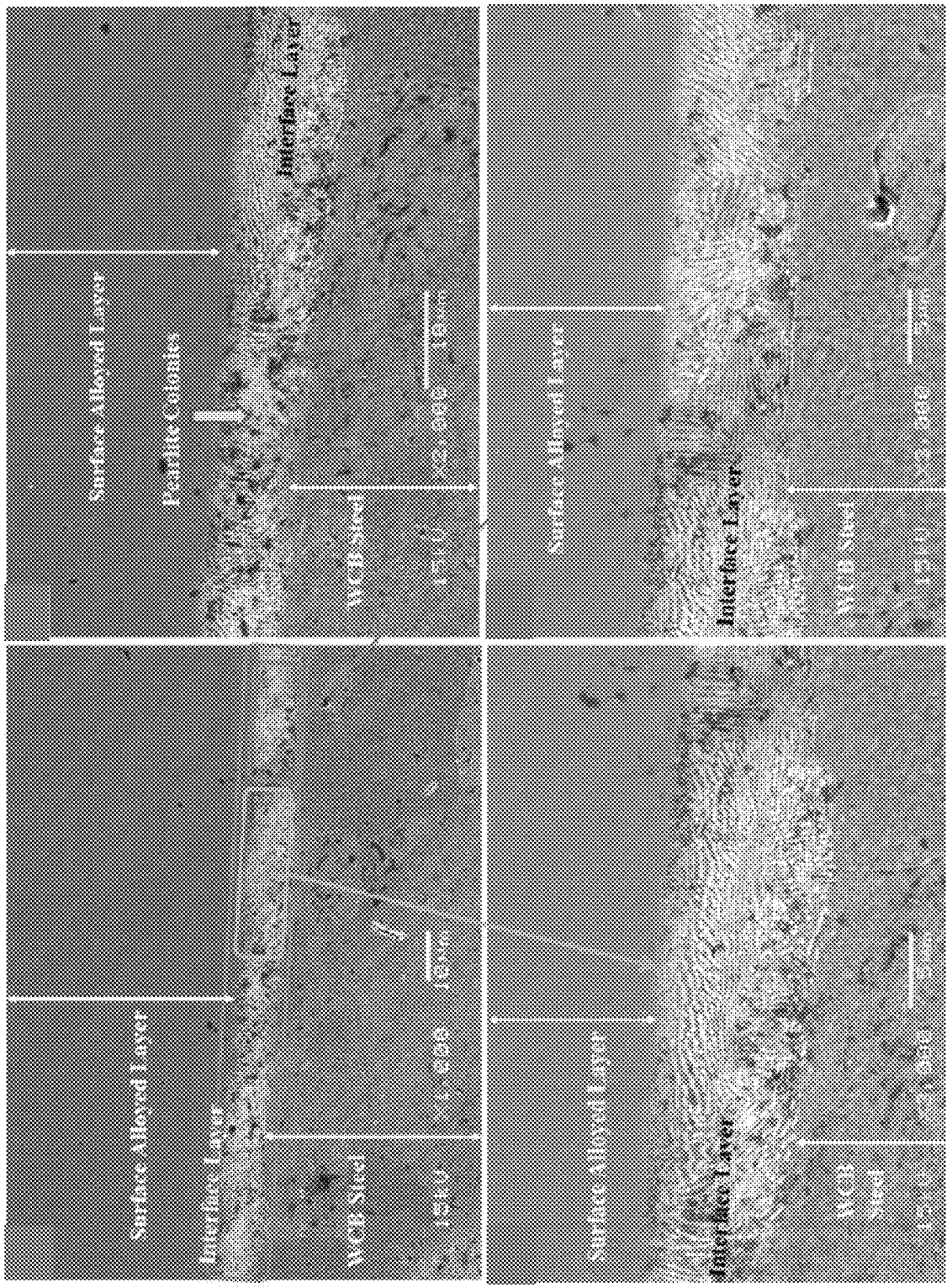
FIG. 17 shows the higher magnification SEM micrographs of the interface layer (top) SEM micrographs of the surface alloyed butterfly valve in as-cast condition and lamellar structure present in the interface layer (bottom). The interface layer between surface alloyed layer and the base metal of surface alloyed sample BV1.

Compared with the original composition of the WCB steel, an increase of Ni, Cr, Mo, Mn, and Si was detected in a surface alloyed layer. The analyses were performed in the ferrite (α-phase) and austenite (γ-phase) regions, indicated in the micrographs (FIG. 15C (bottom)). It was observed that the ferritizing elements, Cr and Mo, were present in a higher percentage in the ferrite phase, and Ni, which dissolves and stabilizes austenite, is present in a higher percentage in the austenite phase. The dissolution of alloying elements added to the slurry coated on molds lead to the formation of the surface alloyed layer. It was observed that the weight percentages of Ni and Cr drop at the interface while that of Fe increases sharply as the concentration plot for each element moves from the surface alloyed layer into the base substrate alloy, as seen in FIGS. 16A-16B. The area near the interface in the surface alloyed layer shows the lamellar structure (FIG. 15B,17). The base metal retains its α and pearlite phase microstructure, the region immediately below the interface shows primarily a α phase with some pearlite. The interface consists of a lamellar structure (FIG. 17).

Figure 18:
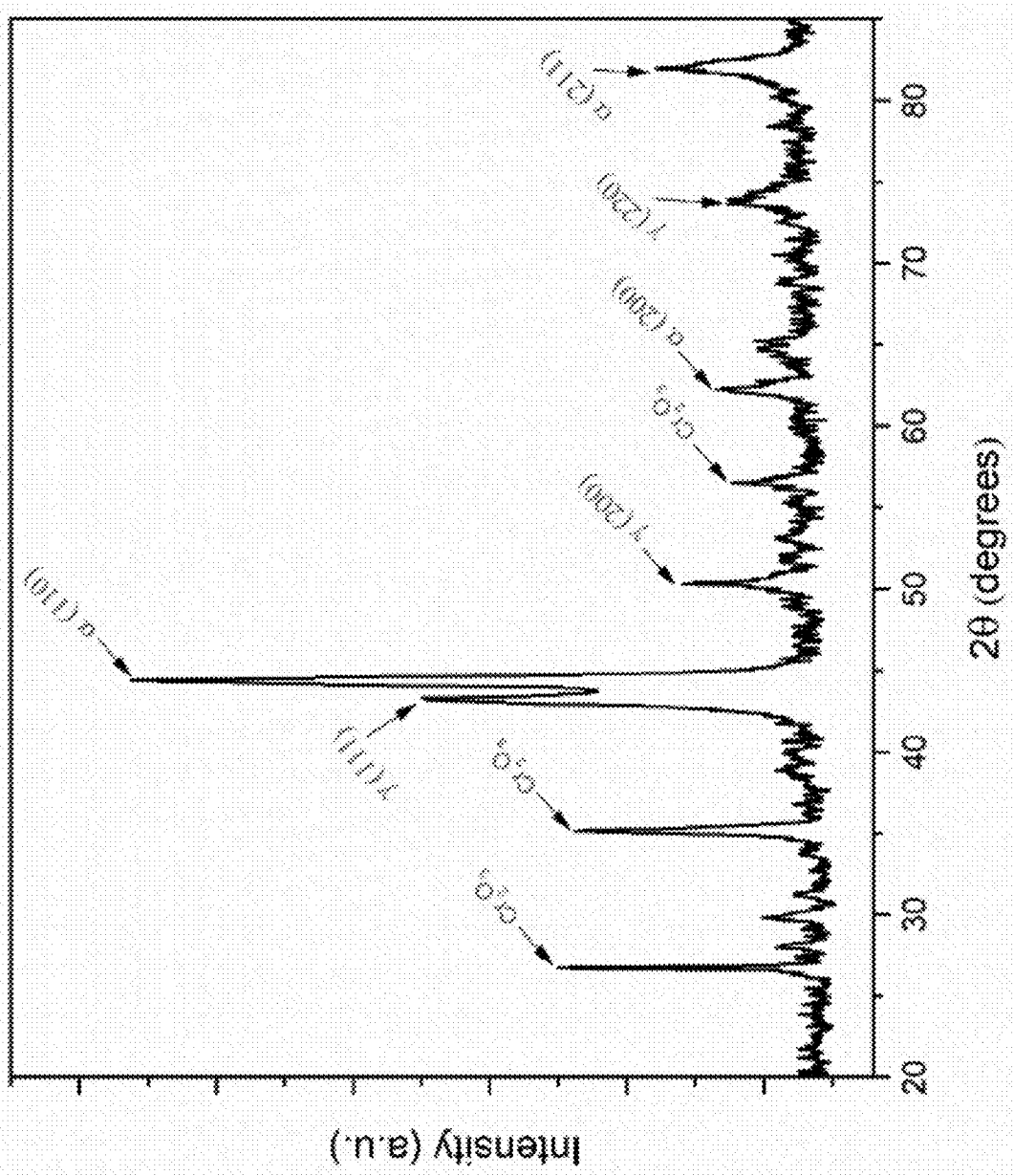
FIG. 18 shows the XRD analysis of the surface alloyed layer of the as-cast surface alloyed BV3 sample shows the presence of austenite (γ) and ferrite (α) as the primary phases in the surface alloyed layer.
Figure 19:
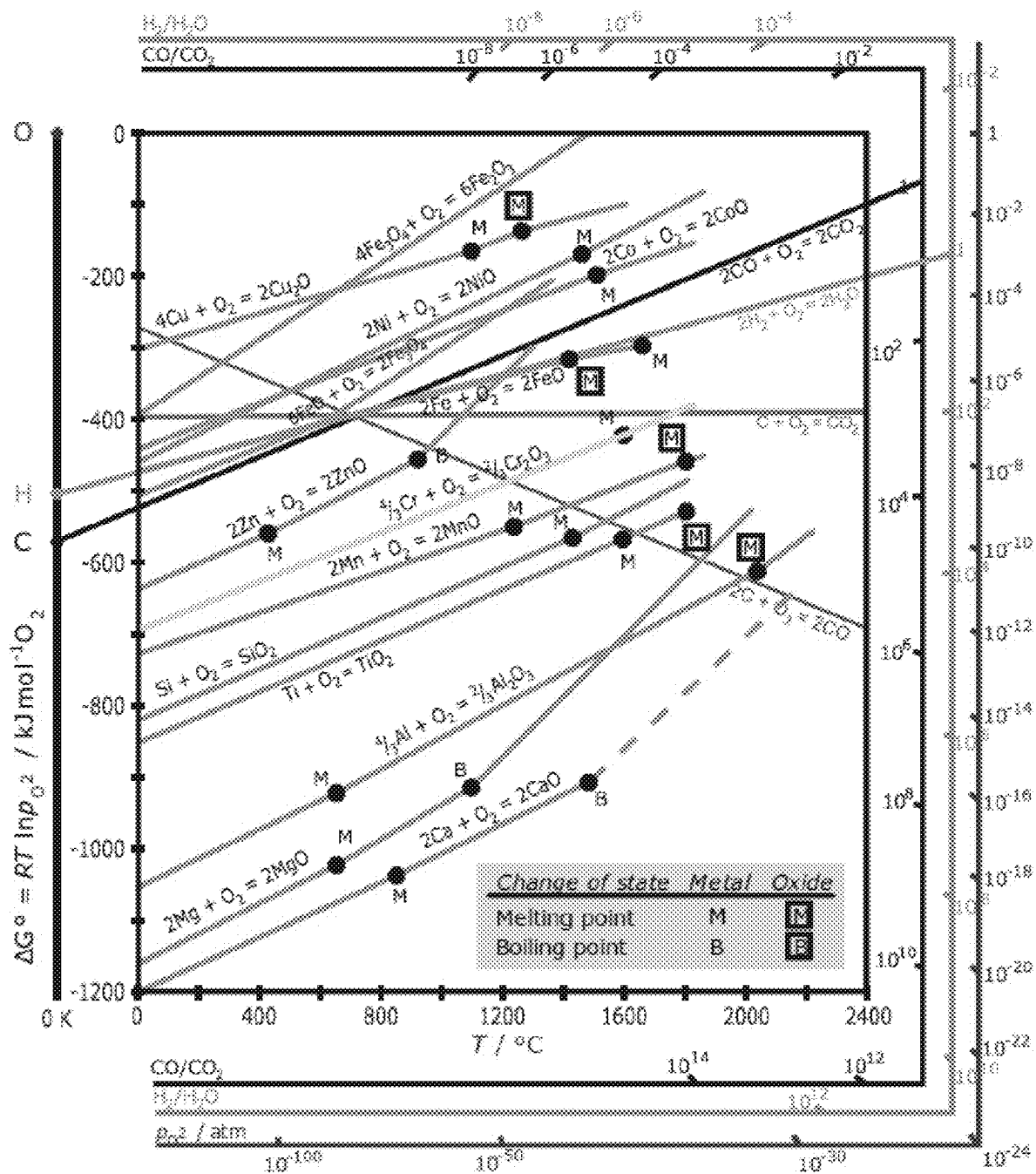
FIG. 19 shows an Ellingham diagram showing the free energy of the formation of oxides of various metals, along with Richardson nomographic scales. The $Cr_2O_3$ line is highlighted in yellow on the diagram.

The XRD analysis of the surface alloyed layer of the surface alloyed sample BV3 is shown in FIG. 18. The analysis confirms the presence of ferrite, austenite, and chromium oxide ($Cr_2O_3$) in the surface alloyed layer. The presence of $Cr_2O_3$ is known to improve the corrosion resistance of the alloy. This oxide can form in ambient conditions; however, heat treatment of the alloy leads to the acceleration of the oxide formation. It should be noted that while all elements present in the system may form oxides (e.g., $FeO$, $Fe_2O_3$, $Fe_3O_4$, $NiO$) at high temperature, not all of these oxides may exist simultaneously in equilibrium with one another. The selective oxidation chromium may be explained by the standard free energy of formation and Ellingham's oxidation curve, as seen in FIG. 19. Ellingham's oxidation curve (FIG. 19) shows that $Cr_2O_3$ is more chemically stable than iron oxide and nickel oxide at all temperatures and $O_2$ partial pressures. The high degree of $Cr_2O_3$ peaks may be attributed to the high percentage of Cr (>23%) in the system.

Example 13: Hardness Measurements

The hardness of the surface alloyed layer and the base metal in the as-cast condition was measured using the Vicker's Microhardness test. The enrichment of the surface alloyed layer by alloying elements Ni, Cr, Mn, Si, and Mo led to an increase in the hardness of the surface alloyed layer. The addition of Mo, Si, Cr may also lead to an increase in the hardness, 0.2% proof stress, and tensile strength of the iron matrix.

Figure 20:
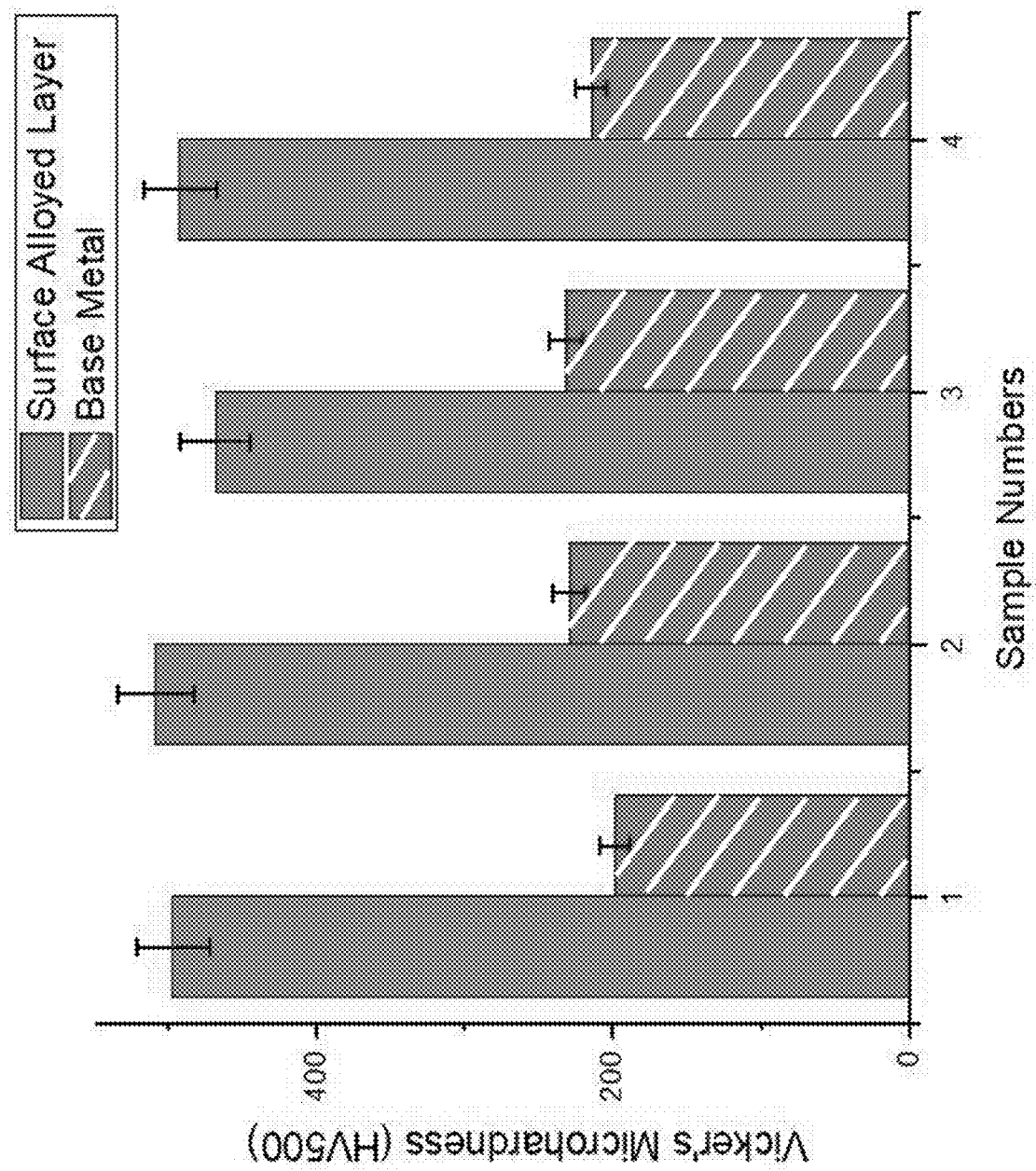
FIG. 20 shows a bar graph comparing the hardness of the surface alloyed layer and the base metal indicating a consistent increase in the as-cast condition.

The samples were tested in an as-cast condition with each sample undergoing multiple measurements through the cross-section to ensure the average value is taken over the sample. The hardness measurements did not show scatter within the surface alloyed layer suggesting that the distribution of alloying elements in the surface alloyed layer is quite uniform (FIG. 20).

Example 14: Corrosion Resistance

Two methods for improving the corrosion resistance of iron-based alloys are: (1) to improve thermodynamic stability the iron-based alloy by adding alloying elements with higher thermodynamic stability (e.g., Ni and Cr) to the solid solution to increase its electrode potential and to decrease the anodic activation and (2) to promote the formation of stable passivation on the surface and to improve its resistance on corrosion reaction by adding elements such as Cr and Mo. Therefore, the increase in the Ni and Cr content in the surface alloyed layers as a result of surface alloying may improve its corrosion resistance. Additionally, the increase in austenite in the microstructure of the alloyed layer will also improve the corrosion resistance. The fine microstructure as a result of relatively rapid solidification in the surface-alloyed layer may also decrease the corrosion by the micro-cell effect. Table 9 lists the corrosion rates of surface-alloyed butterfly valves samples and the base WCB steel.

TABLE 9

Corrosion rate values for surface-alloyed samples and WCB.

| Sample | Corrosion Rate (mm/year) |
|---|---|
| WCB base metal heat-treated (normalized and tempered) | 0.12 |
| Normalized & Tempered Surface alloyed sample BV1 | 0.06 |

Figure 21A:
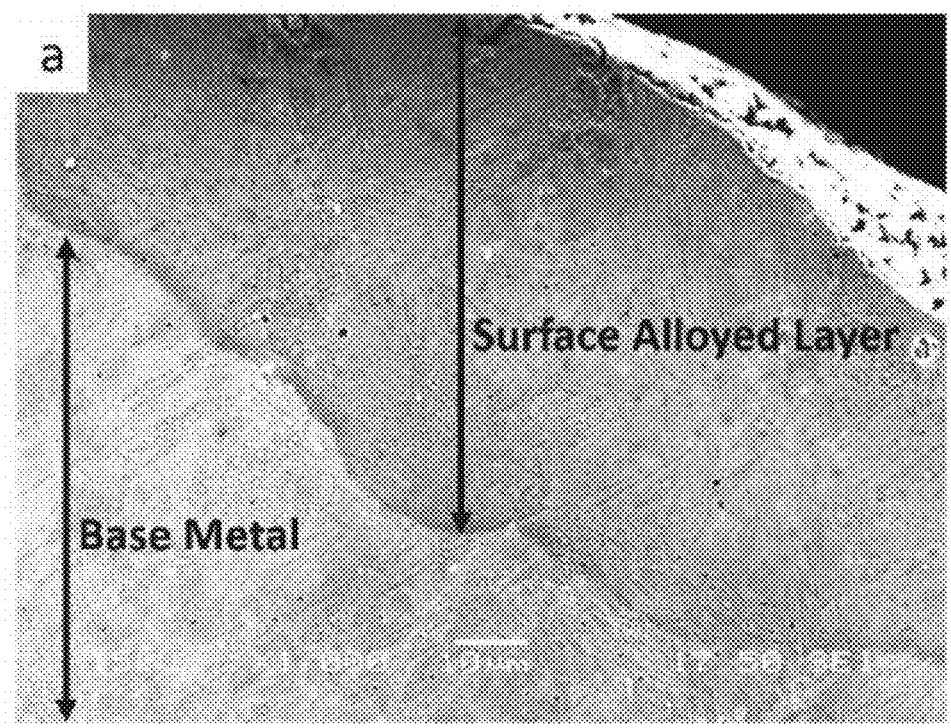
FIG. 21A shows the absence of the a phase in the surface alloyed layer of surface alloyed sample BV3 after solution annealing at 850° C. for a period of 100 seconds.
Figure 21B:
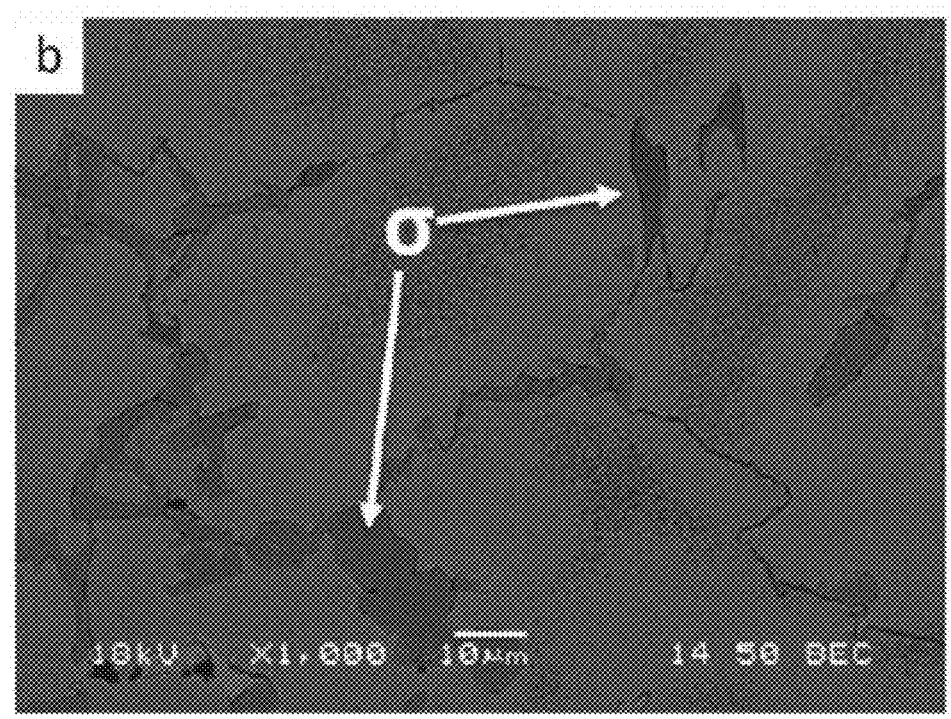
FIG. 21B shows the presence of intermetallic a phase in the surface alloyed layer of surface alloyed sample BV3 before heat treatment.

The data in Table 9 shows that the heat-treated (normalized and tempered) surface alloyed sample shows a half corrosion rate compared to heat-treated (normalized and tempered) WCB. The base metal WCB steel has a higher pearlite content, and it has been shown that there is accelerated galvanic corrosion between lamellar cementite and ferrite phase in pearlite banded structures. Surface alloying and subsequent heat treatment transforms the microstructure to predominantly ferrite and austenite. The as-cast microstructure of the surface alloyed layer showed the presence of intermetallic a, which can be detrimental to the corrosion resistance of the surface alloyed layer. The solution annealing treatment led to the dissolution of the intermetallic phase, which is expected to improve the corrosion resistance of the surface alloyed layer (FIGS. 21A-21B).

B. General Materials for Examples 15-23

The chemical compositions of WCB steel, 316L SS, and 2205 DSS steels which are used for corrosion resistant components, are listed in Table 10.

TABLE 10

Chemical composition of WCB steel, 316 L SS and 2205 DSS.

| Material | Cr (wt %) | Ni (wt %) | C (wt %) | Mn (wt %) | P (wt %) | S (wt %) | Si (wt %) | Mo (wt %) | Fe (wt %) |
|---|---|---|---|---|---|---|---|---|---|
| WCB Steel | — | — | 0.3 | 1 | 0.04 | 0.3 | 0.6 | — | Balance |
| 316 L Stainless Steel | 16-18 | 10-14 | 0.03 | 2 | 0.045 | 0.03 | 1 | 2-3 | Balance |
| 2205 Duplex Stainless Steel | 22-23 | 4.5-6.5 | 0.03 | 2 | 0.03 | 0.02 | 1 | 3-3.5 | Balance |

The objective of the experiments was to enrich the surface of cast WCB steel with different combinations of Ni, Cr, Mn, and Si as the alloying elements to enhance surface hardness and corrosion resistance. Ni is a solid-solution strengthener that is used with Cr in stainless steels such as 316L SS and 2205 DSS steels. Cr creates a passivation layer of $Cr_2O_3$ on the stainless-steel surface, improving the corrosion resistance. Ni is also an austenite stabilizer and is required to achieve a dual-phase structure that is seen in 2205 DSS. Mn and Si are both deoxidizers and degasifiers and react with sulfur to improve forgeability. They also improve tensile strength, hardness, hardenability, and resistance to wear. As prior literature suggests, stainless steel has better corrosion and wear resistance as compared to WCB steel, and hence, elements including Ni, Cr, Mn, and Si were used to enrich the surface alloyed layer on WCB steel.

Example 15: Slurry Preparation

The binder used in the current study was REFCOBAR 1010 Gel, which is a water-based binder and can be directly mixed with metal powders. The use of such a binder allows the addition of greater amounts of alloying powders to form the slurry and their transfer to the surface alloyed layer in castings. The slurry preparation involved calculating the required weights of the powder per unit volume of the surface alloyed layer. For a targeted thickness of the surface alloyed layer in the range, 1000-4000 μm, for each pour, the mass of steel occupying a volume equal to the product of the layer thickness and unit area was calculated. Depending on that mass, the quantities of alloying elements to be added to the slurry were calculated based on the weight percentages of each alloying element targeted. The powders were measured accurately and mixed with water and binder to prepare a slurry for coating on the mold surface. The binder added was approximately a quarter of the total weight of powders. An equal amount (in weight) of water was added to the slurry to provide fluidity. This slurry was then applied using a brush that provided consistent coatings on the mold cavity followed by air drying for 1 hour at 70° C. It is anticipated that under industrial conditions, automated spraying techniques would be applied to coat this slurry on the mold surfaces. Samples R1-R4 were made with only Ni and Cr present in the slurry while R5-R12 were made with Ni, Cr, Fe—Mn, and Fe—Si present in the slurry. The coated area of the surface of samples R1-R5 was 34 $cm^2$, while the surface area of samples R6-R12 was 75 $cm^2$. Table 11 lists the sample designations of lab scale castings made, the targeted thickness of the surface alloyed layer, and the amounts of powders added to the slurry for surface alloying.

TABLE 11

Sample designations with the composition of the alloying powders, targeted depth of surface alloyed layer.

| Experiment | Sample | Targeted Thickness of Alloyed Layer (μm) | Ni (g) | Cr (g) | Fe—Mn (g) | Fe—Si (g) |
|---|---|---|---|---|---|---|
| Quartz Tube | R1 | 1000 | 0.76 | 1.38 | — | — |
| | R2 | 2000 | 1.45 | 2.62 | — | — |
| | R3 | 3000 | 2.05 | 3.71 | — | — |
| | R4 | 4000 | 2.97 | 5.37 | — | — |
| | R5 | 1000 | 0.62 | 1.72 | 0.38 | 0.02 |
| Open Pour | R6 | 1000 | 0.82 | 2.27 | 0.51 | 0.03 |
| | R7 | 2000 | 5.85 | 16.26 | 3.64 | 0.23 |
| | R8 | 2000 | 2.92 | 8.13 | 1.82 | 0.11 |
| | R9 | 1000 | 2.92 | 8.13 | 1.82 | 0.11 |
| | R10 | 1000 | 1.95 | 5.42 | 1.21 | 0.07 |
| | R12 | 2000 | 3.9 | 10.84 | 2.42 | 0.156 |

WCB steel melt (referred to as base metal) was then poured into the mold.

Example 16: Sample Preparation and Characterization

The surface alloyed samples were cast using two techniques, quartz tube experiments conducted in vacuum to prevent oxidation of steel and open pour experiments to replicate industrial casting practice. Samples R1-R5 were cast using the quartz tube experiment with the final castings weighing 0.75 lbs. while samples R6-R12 were cast using the open pour technique with the final castings weighing 1.25 lbs. as shown in FIGS. 22A-22C. The pouring temperature was 1700° C. (base metal, WCB steel has a melting point of 1400° C.) to ensure adequate superheat for the flow of steel and allow for alloying of the powders into the base metal. The castings were characterized in as-cast condition and heat-treated condition after mounting and polishing. Sample R9 was normalized at 898° C. for 1 hour/inch thickness, followed by tempering at 535° C. for 1 hour/inch thickness. Buehler MetaServ 250 Grinder-Polisher was used to grind and polish the mounted samples, followed by etching to reveal the microstructure. 5% Nital solution was used to etch the samples to reveal the surface alloyed layer and the interface. Kalling's No. 2 Reagent was used to etch the surface alloyed layer to reveal its microstructure.

Example 17: Quartz Tube Experiments

Figure 23:
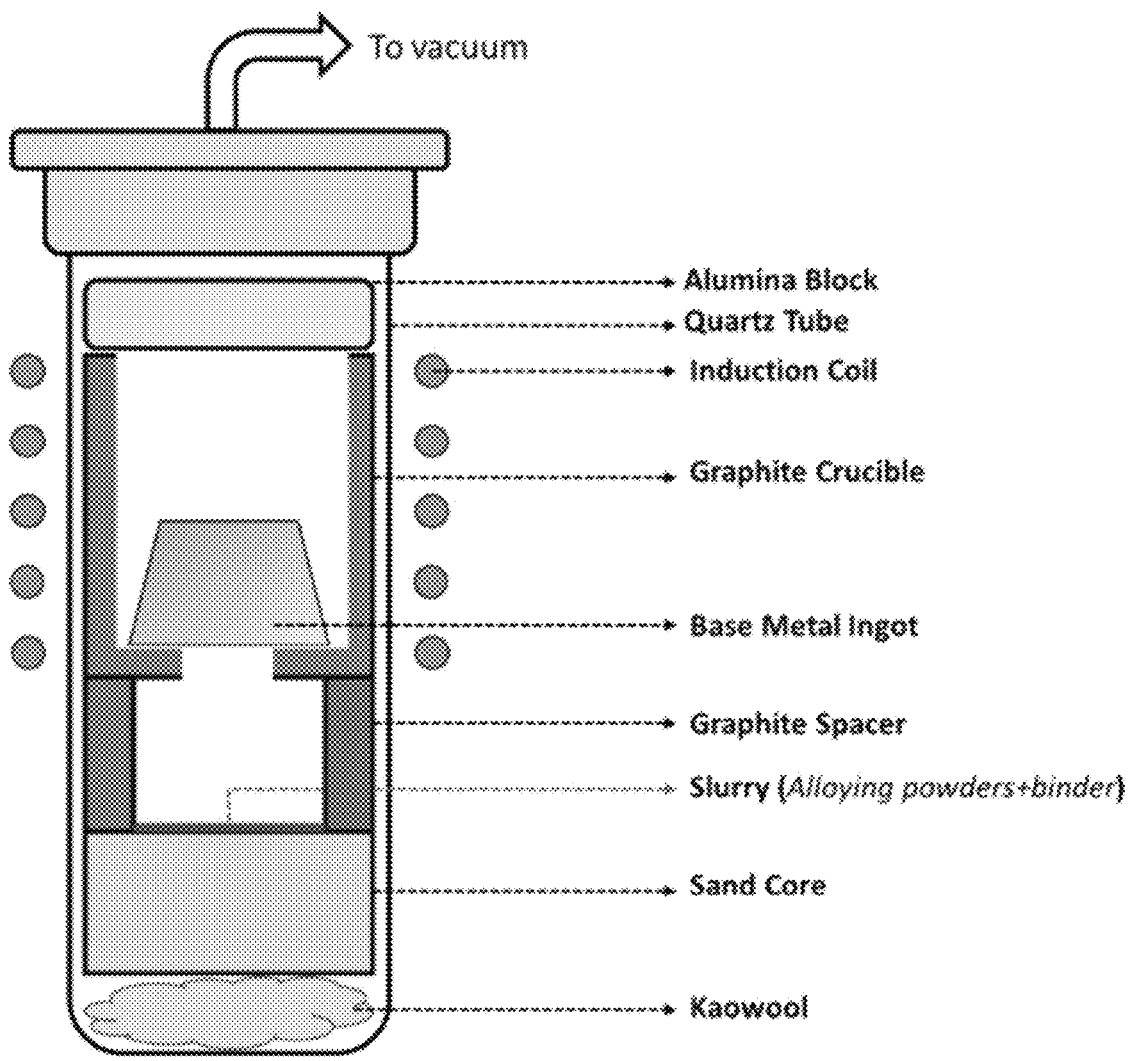
FIG. 23 shows the cross-sectional view of the experimental setup of components used for casting surface alloyed samples in the quartz tube experiments.
Figure 24:
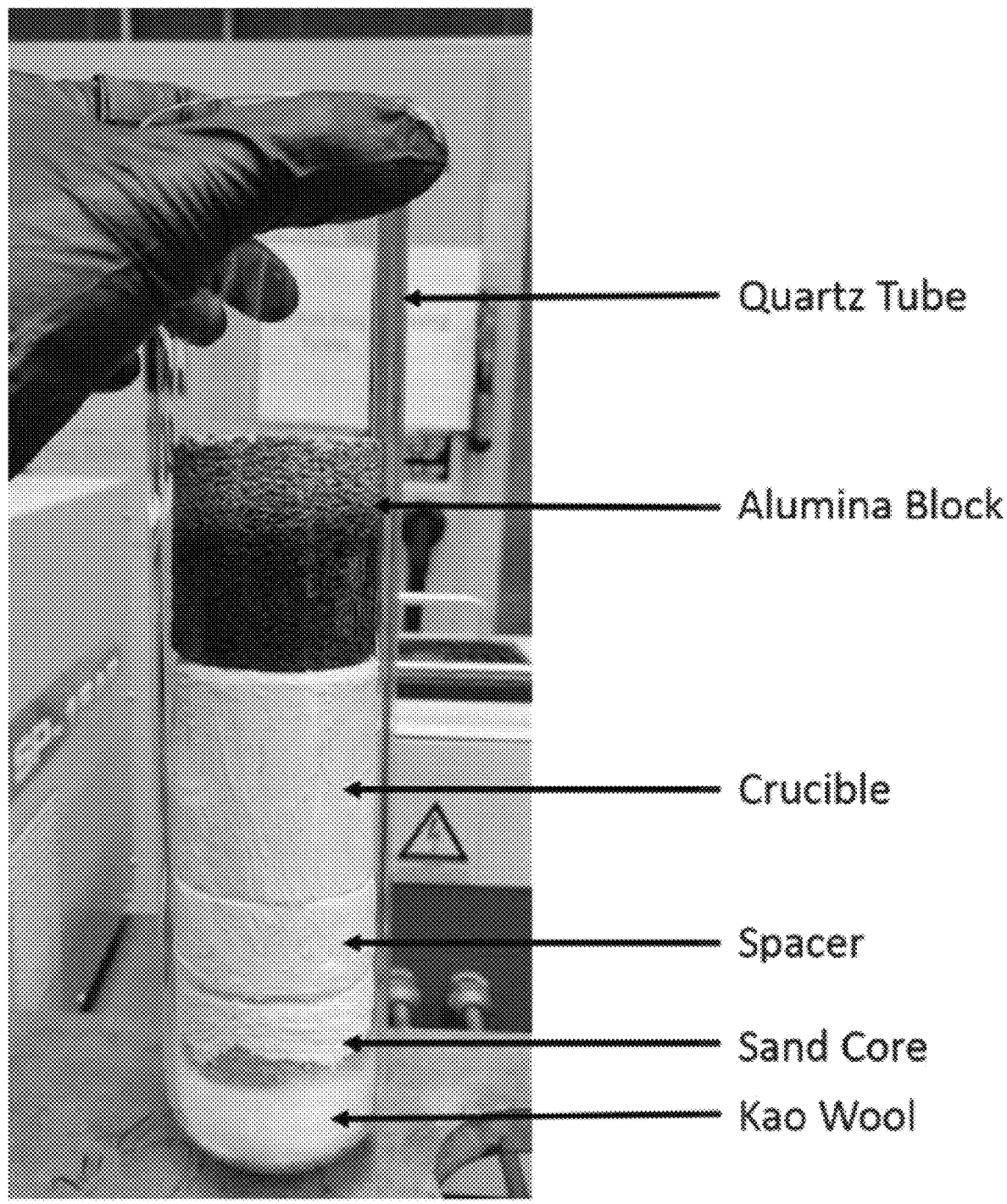
FIG. 24 shows the actual view of the experimental setup of components used for casting surface alloyed samples in the quartz tube experiments.

The first set of experiments was carried out in a quartz tube, as seen in FIGS. 23-24. The quartz tube used for the experiments was 5 cm diameter and 30 cm in height. Kaowool was placed at the base of the tube to act as a resting stage for the sand core. The sand core was made from sodium silicate bonded sand and coated with a slurry of binder and alloying powders. The spacer was cut from a hollow graphite cylinder and was about 2.5 cm in height was placed on top of sand core. The function of the spacer was to act as a separation between the crucible and sand core. The spacer was coated with a layer of refractory wash, which prevented the transfer of carbon from graphite into the molten steel. The crucible was also made of graphite and was a cylinder with the base covered and containing a hole for molten steel to flow from onto the sand core (FIGS. 23-24). A thick coating of refractory wash was applied to the crucible to prevent graphite from dissolving in steel. Small ingots of WCB steel were placed in the crucible. When the temperature reached approximately 1700° C., the molten steel flowed from the bottom of the crucible through a hole onto the sand core. An alumina block was placed on top of the crucible to protect the silicone o-rings (used to secure the vacuum). The setup was secured in between the induction coil with the crucible directly heated due to the current flowing through the coil. The induction coil used in these experiments had a diameter of 7.5 cm and seven turns of the coil. Water flowed through the coils continuously throughout the experiments to ensure the high temperatures generated during the heating process did not damage the induction coil. The induction coil used was MTI SP-15AB.

The current flowing through the coils started at 55 A and was increased at a rate of 10 A every 100 seconds.

The heating cycle was preset to 100 seconds cycles, and the current was varied manually. The current was increased to a maximum of 200 A where complete melting of WCB steel was expected to occur. The coil was then shut-off, and the tube, along with all its components, was left to cool in the coil water flowing through the coils.

Example 18: Open Pour Experiments

The open pour experiments were the second set of experiments conducted. The experiments were aimed to simulate the industrial metal casting environment in ambient air in a lab setting. The sand molds (12"×6") were made using no-bake chemically bonded industrial quartz sand. The size of the casting cavity was (1"×1") which was coated with the metal slurry The chemicals used in the process included Uniset Bio-Zero Part I, Uniset Bio-B57, and Accelerator 750W. The chemicals were mixed into the sand while agitating continuously to ensure the entire batch of sand was mixed with the chemicals. Uniset Part I and accelerator were mixed first, and Bio-B57 was added later. The quantities of chemicals used for 25 lbs. batch of sand is mentioned in Table 12.

TABLE 12

Quantities of chemical binding agents added to 25 lbs. of quartz mold sand.

| Chemical | Quantity (oz) |
| --- | --- |
| Uniset Bio-Zero Part 1 | 3 |
| Uniset Bio-B57 | 3 |
| Accelerator 750 W | 0.05 |

3D-printed patterns were used to prepare the mold cavity. The setting time for sand was approximately 30-45 minutes. Sprue and degassing holes were cut into the drag after it had hardened. The mold cavity was coated with a few layers of Refcohol 1010 (Refractory wash) to prevent any interaction between the molten metal and sand and to provide a surface finish to the castings. The cope and drag were shut using an industrial bonding agent, and the metal was poured. A refractory wash coated graphite crucible was used for melting steel, and the furnace used for these pours was the same induction coil furnace from quartz tube experiments, as seen in FIG. 22B. Metal ingots weighing approximately 1.5 lbs. were placed inside the crucible and heated to a temperature of 1700° C. to melt the steel with sufficient superheat. Characterization of cast samples was done using Nikon Eclipse TS100 for optical microscopy, JOEL JSM-6460 LV was used for SEM-EDS, Bruker D8 Discover X-Ray Diffractometer was used for phase identification, and Vicker's Microhardness and Agilent Technologies G200 Nanoindentor was used for quantifying the hardness of the surface alloyed layer. A potentiodynamic polarization test was performed to get an idea of the corrosion resistance of the surface alloyed samples. A potentiostat, SP-200 BioLogic, was used to run the corrosion test. The electrolyte used for the corrosion test was 3.5% NaCl solution. The surface-alloyed samples and graphite rod were used as the working electrodes and counter electrode, respectively. For the reference electrode, Ag/AgCl electrode was used.

Example 19: Microstructural Study

Figure 25:
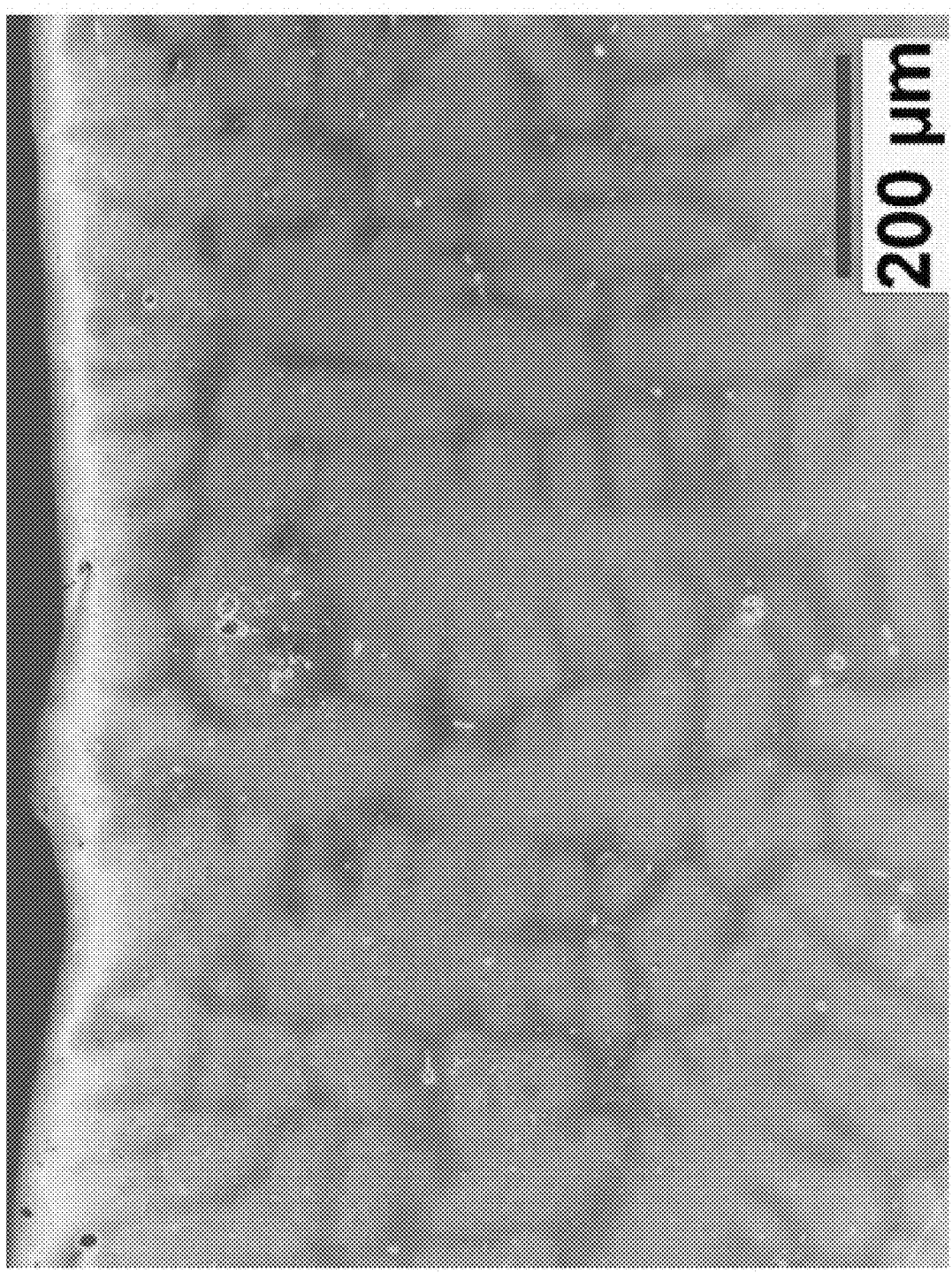
FIG. 25 shows the as-cast microstructure of sample R5 cast at the UWM Foundry Lab in quartz tube experiment (Ni, Cr, Fe—Mn, and Fe—Si were used as alloying powders in R5).
Figure 26:
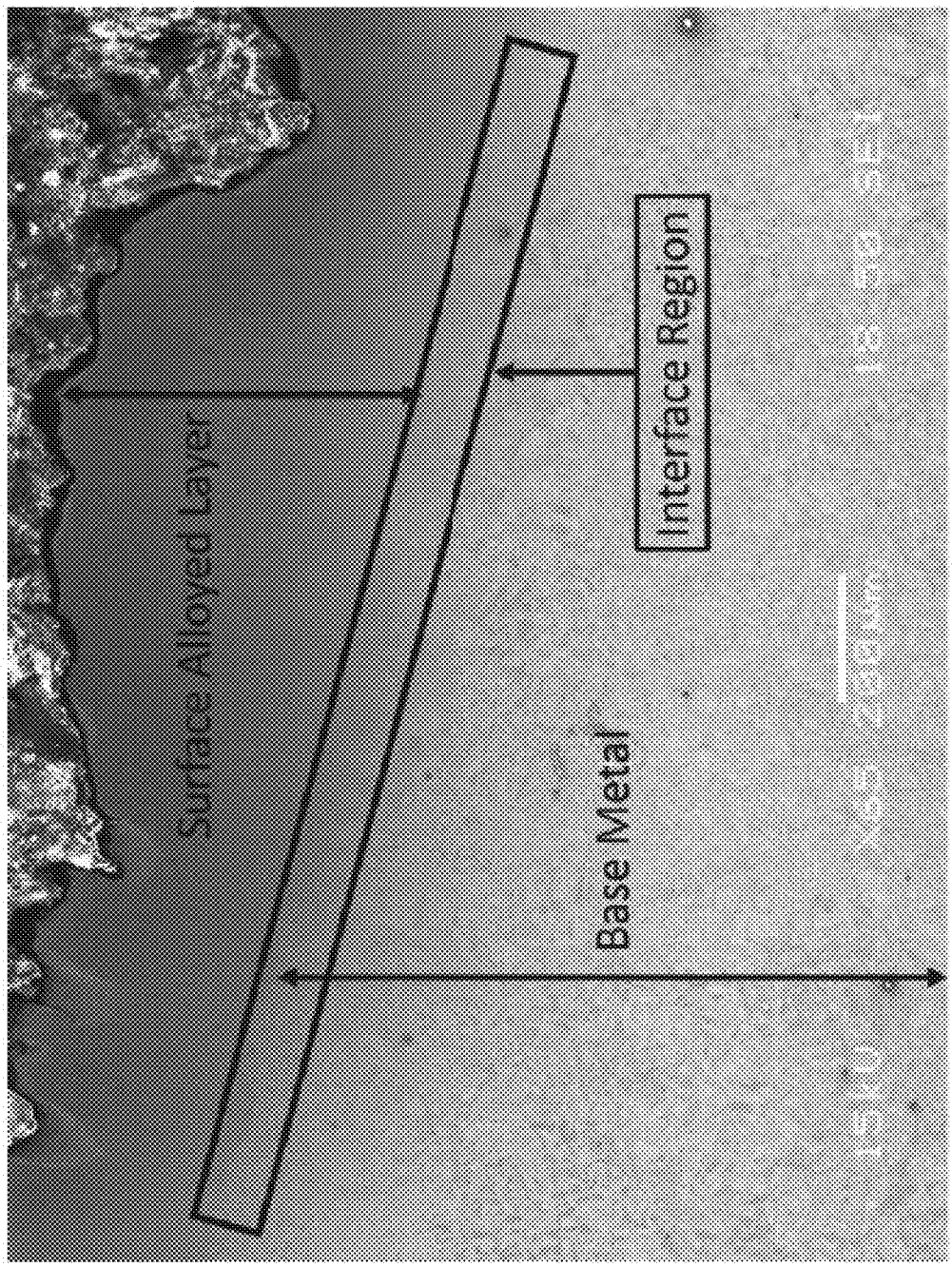
FIG. 26 shows the lamellar structure formed at the interface layer between the as-cast surface alloyed layer and the base metal of sample R12.

The objective of the study was to form a surface alloyed layer on WCB castings to increase the corrosion resistance and surface hardness of the casting. Ni and Cr were the main elements added for surface alloying; in some experiments in addition to Ni and Cr, Fe—Mn and Fe—Si were also incorporated in the surface alloyed layer since they are incorporated in super duplex steels. The microstructure of the surface alloyed layer of sample R5 is shown in FIG. 25. The microstructure showed the formation of fine dendrites through the surface alloyed layer, which was a sign of complete melting and dissolution of the powders in the slurry followed by solidification during the casting process. A lamellar structure was observed at the interface of the surface alloyed layer and base metal (FIG. 26). The compositional analysis performed using line scanning in EDS shows a decrease in the weight percentage of Ni, Cr, Si, and Mn as one moves from the surface alloyed layer into the base metal.

Figure 27:
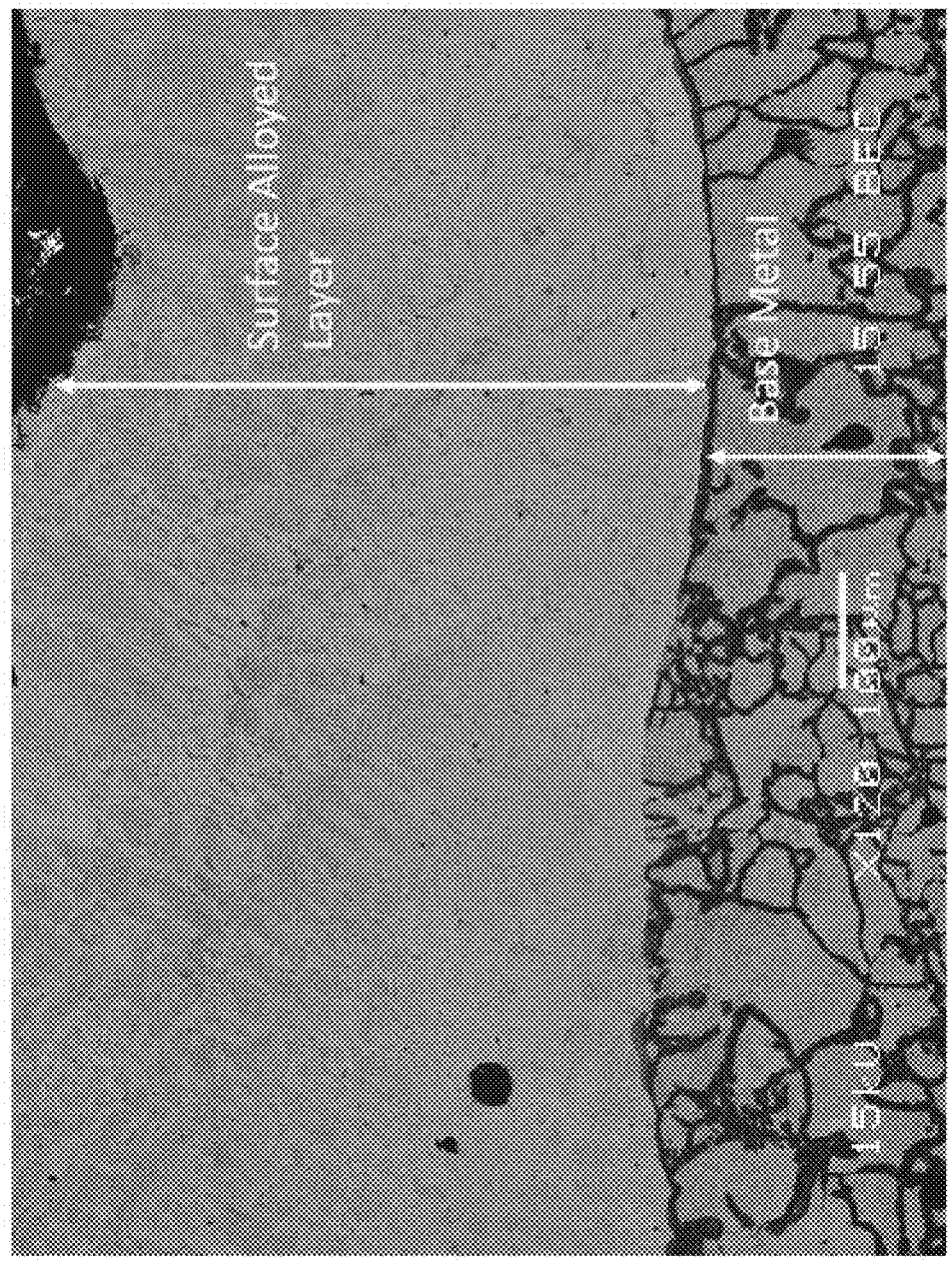
FIG. 27 shows the normalized and tempered microstructure of the base metal, and the surface alloyed layer of sample R12 showing a dendritic microstructure.

The heat-treated microstructure of the surface alloyed layer of sample R12 shows a dendritic structure, as shown in FIG. 27. It was also found normalizing at 898° C. for 1 hour/inch thickness, followed by tempering at 535° C. for 1 hour/inch thickness leads to the dissolution of the lamellar structure at the interface. The base metal, WCB steel, exhibits an absence of a ferrite-pearlite microstructure after heat treatment, which can be seen in FIG. 27.

Figure 28:
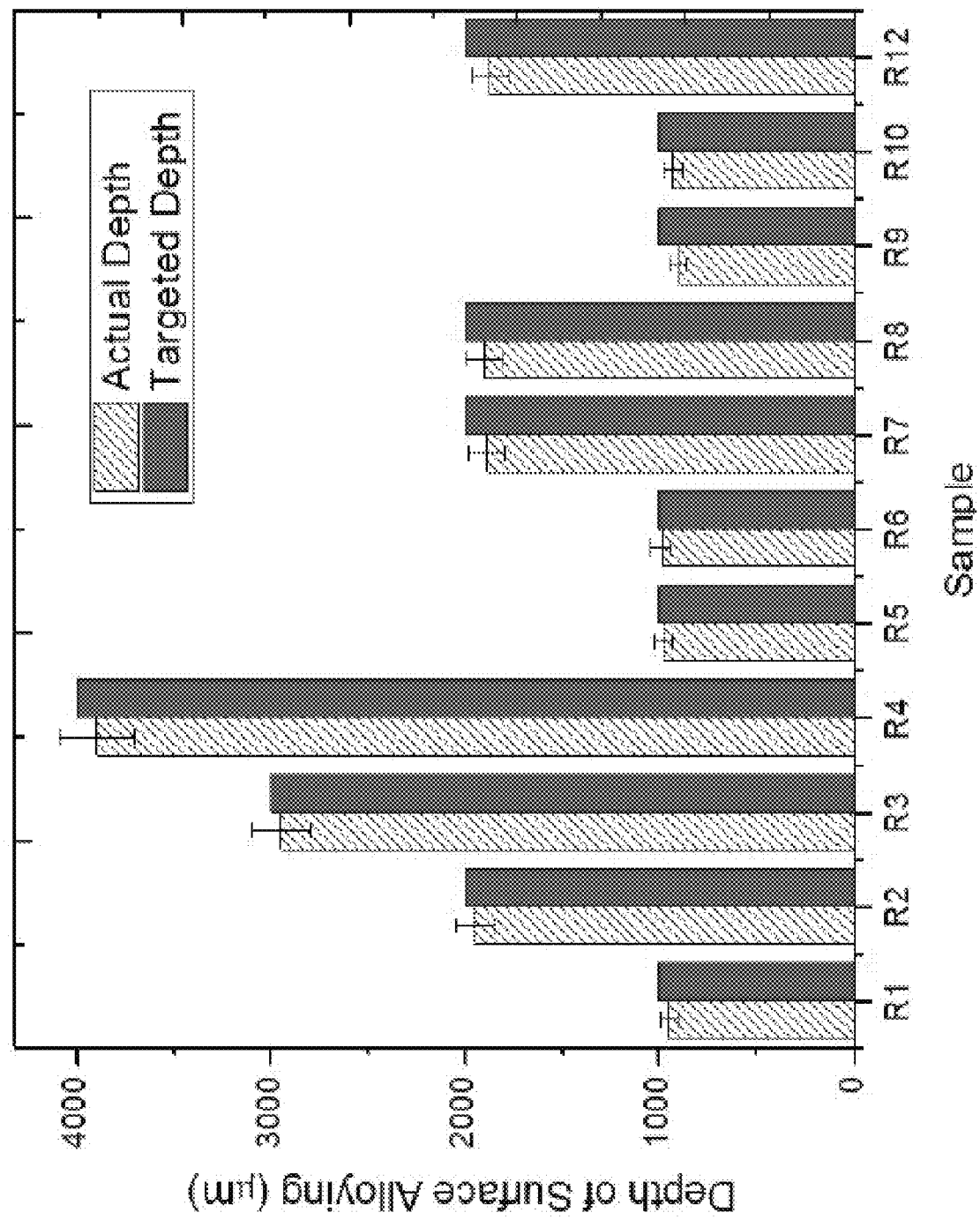
FIG. 28 shows the average depth of the surface alloyed layer measured and targeted depth of the surface alloyed layer.
Figure 29:
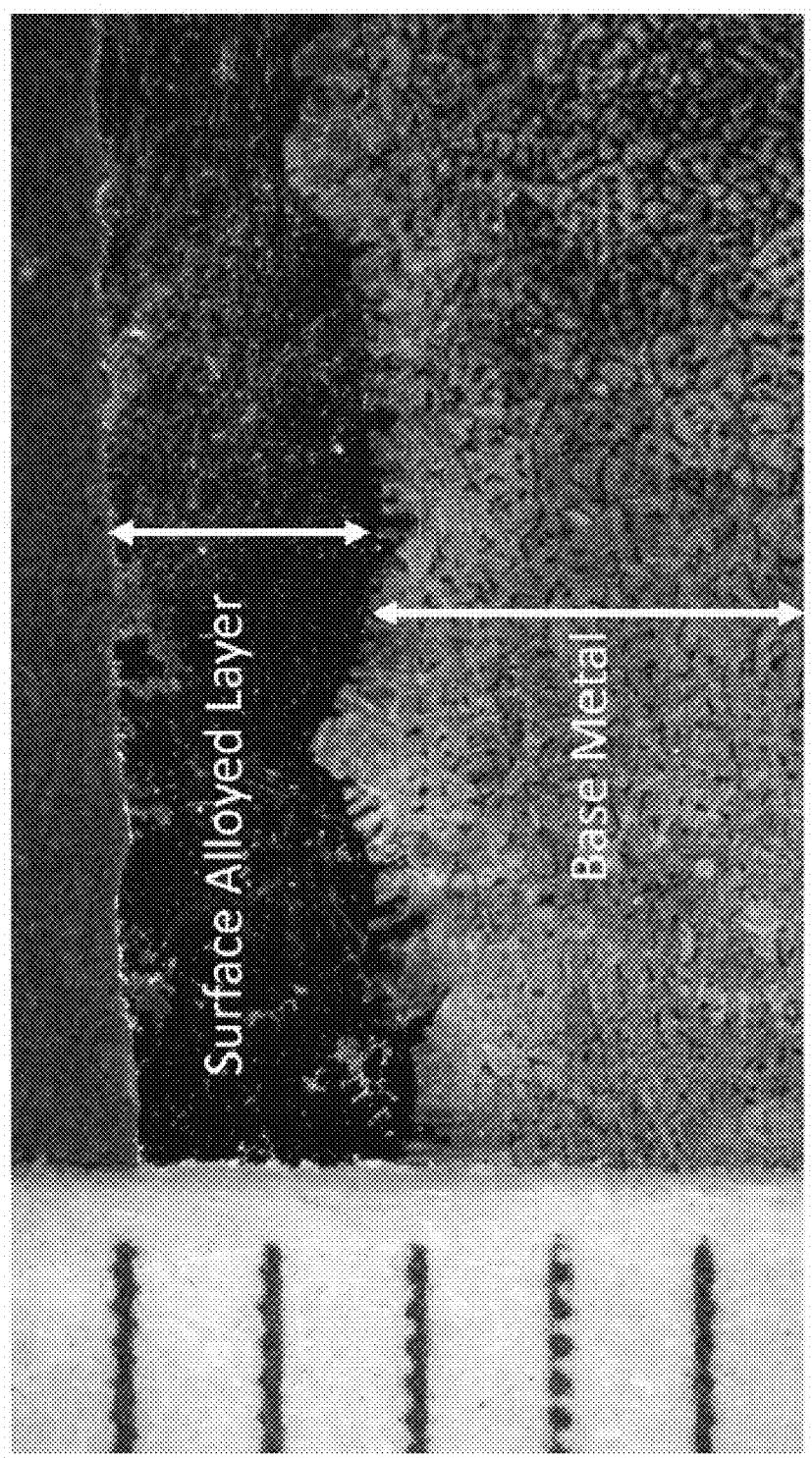
FIG. 29 shows a stereoscopic image of sample R2 (with only Ni and Cr as surface alloying elements) in as-cast condition with a surface alloyed layer having an average depth of 2000 μm. Each scale division on the left in the figure is 1 mm.

The variation in depth of the surface alloyed layer was achieved by varying the amount of powders added to the slurry for surface alloying. Image analysis and stereoscopic microscopy were used to measure the depth of the surface alloyed layer. In some instances, the thickness of the surface alloyed layer had some variability, and therefore an average value was calculated (FIG. 28). The thickness of the surface alloyed layer generally increased with the increase in the amount of alloying powders. FIG. 29 shows a clear distinction between the surface-alloyed layer and the base metal in sample R2.

Example 20: Compositional and Phase Analysis

Figure 30:
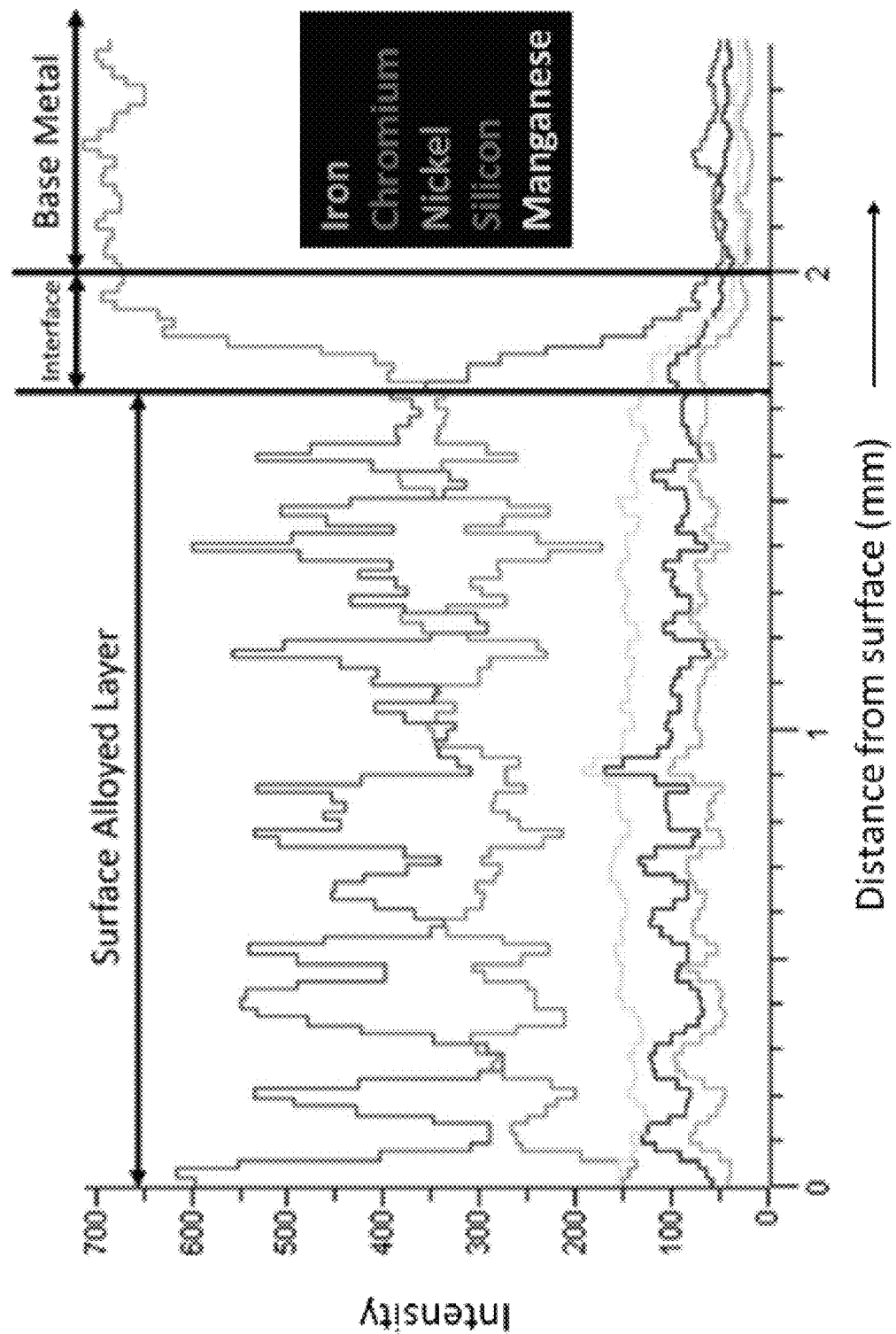
FIG. 30 shows line scans of the as-cast surface alloyed layer of sample R8 showing a decrease in the concentrations of Ni (cyan), Cr (red), Mn (yellow), and Si (purple) as one moves from the surface alloyed layer into the base metal across the interface.
Figures 31A, 31B:
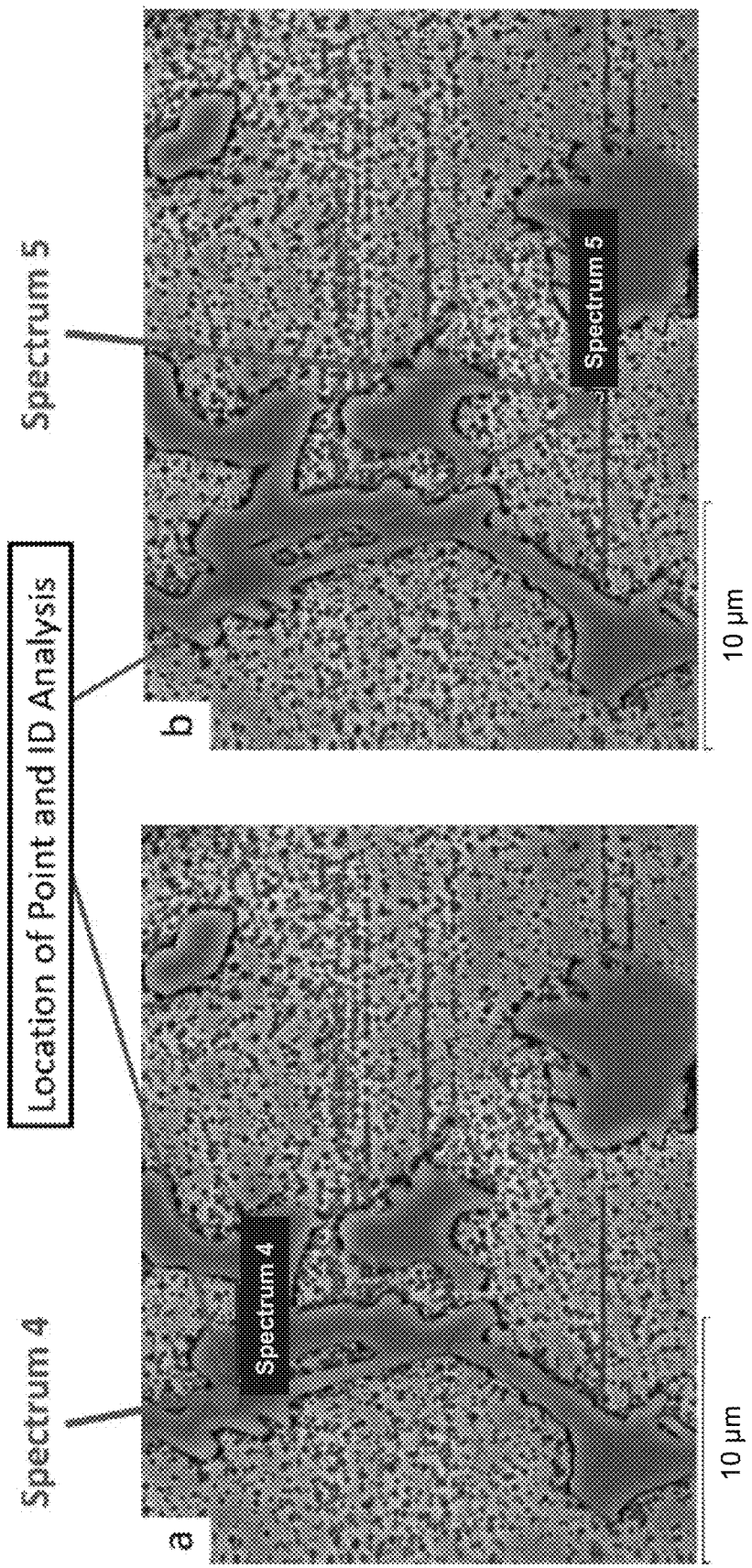
FIG. 31A shows point and ID mapping of the surface alloyed layer of sample R8 in the as-cast condition. Spectrum 4 is high Cr phase (dark phase).
FIG. 31B shows point and ID mapping of the surface alloyed layer of sample R8 in the as-cast condition. Spectrum 5 is low Cr phase (light phase).

EDS and XRD analysis were used to confirm the composition and phases formed in the surface alloyed layer. Three scanning techniques were used for the elemental analysis of the surface alloyed layer. Line scan, shown in FIG. 30, was used to evaluate the concentration gradient of alloying elements with respect to the depth from the surface. The EDS point analysis of the surface alloyed layer of sample R8 showing the distribution of Fe, Ni, Cr, Mn, and Si in the phases of the surface alloyed layer is shown in FIGS. 31A-31B. The elemental composition at these points of the surface alloyed layer of samples R8 is shown in Table 13.

TABLE 13

Elemental composition of the dark phase (FIG. 31A) and light phase (FIG. 31B) in the surface alloyed layer of sample R8.

| | Weight % | |
|---|---|---|
| Element | Spectrum 4 | Spectrum 5 |
| Si | — | 2.77 |
| Cr | 62.85 | 23.22 |
| Mn | 6.17 | 8.35 |
| Ni | 2.19 | 15.63 |
| Fe, C | Balance | Balance |

Spectrum 4 was analyzed at the intermetallic phase formed in-between the grains, which is high in Cr weight %, while Spectrum 5 was analyzed at the grains in the surface alloyed layer. An area scan was performed for mapping the elemental distribution. The weight percentage of alloying elements was high in the surface alloyed layer and decreased to minimal weight percentages in the base metal, which confirmed alloying mainly of the surface layer without alloying of the base metal. The area scan results showed the elemental composition of the surface alloyed layer of samples R3, R4, R5, R6, R8, and R12 is shown in Table 14.

TABLE 14

Elemental composition of sample R6 in as-cast condition estimated by x-ray mapping of the surface alloyed layer.

| | Weight % | | | | | |
|---|---|---|---|---|---|---|
| Element | R3 | R4 | R5 | R6 | R8 | R12 |
| Si | — | — | — | 0.66 | 1.85 | 0.54 |
| Ni | 8.55 | 2.12 | 3.68 | 7.3 | 9.72 | 8.95 |
| Cr | 3.36 | 5.38 | 5.55 | 21.19 | 24.87 | 20.87 |
| Mn | — | — | — | 2.47 | 6.94 | 2.88 |
| Fe | Balance | Balance | Balance | Balance | Balance | Balance |

In R3 and R4, where only Ni and Cr powders were present in the slurry, it is seen that enrichment only in Ni and Cr occurs in the surface alloyed layer. In R6-R12, where Ni, Cr, Fe—Mn, and Fe—Si powders were added to the slurry, there is enrichment in Ni, Cr, Si, and Mn.

Figure 32:
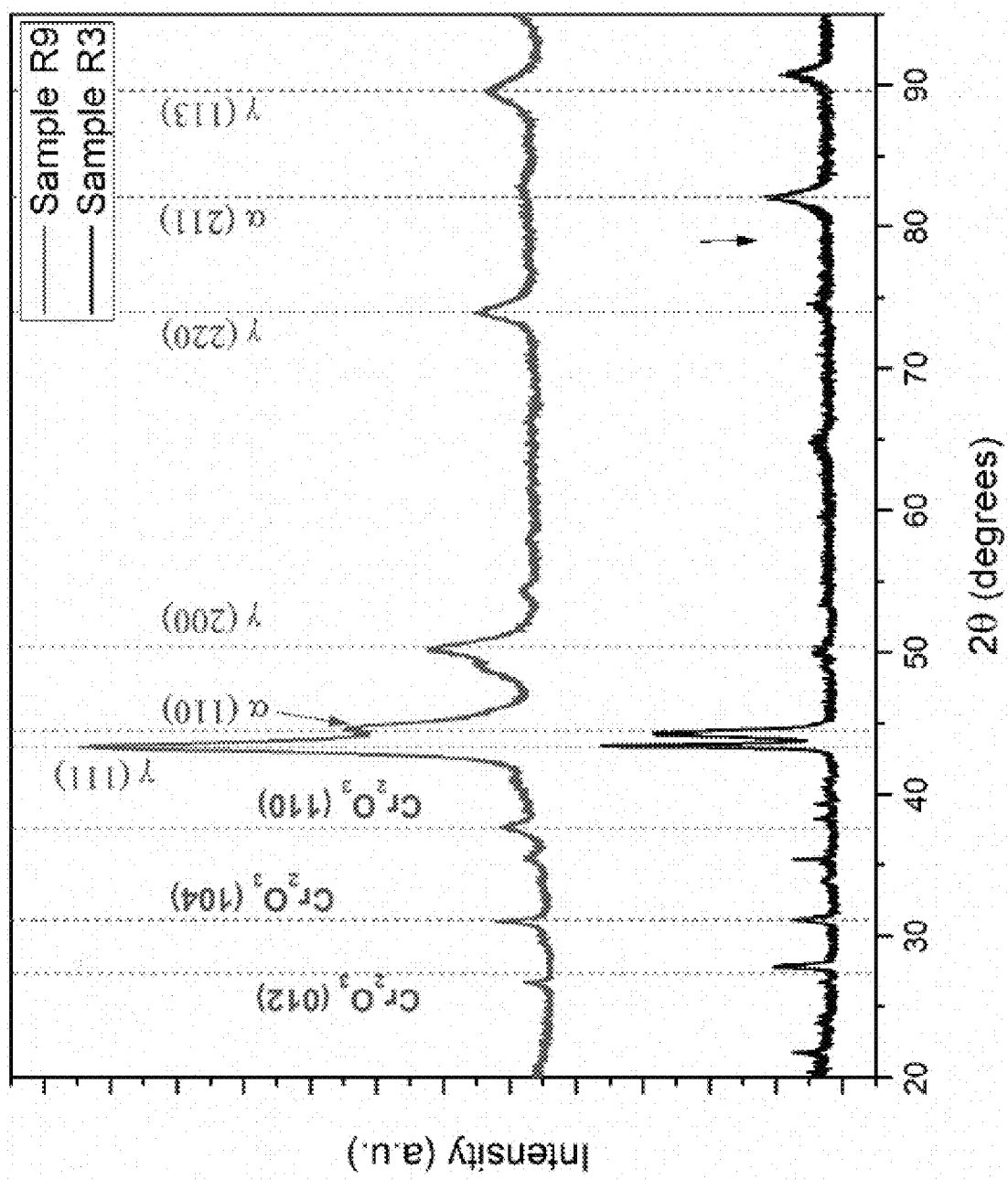
FIG. 32 shows the XRD pattern of as-cast sample R3 and heat-treated sample R9.

The XRD analysis (FIG. 32) confirmed the presence of austenite and ferrite as the primary phases along with chromium oxides in the surface alloyed layer in samples from both experiments (R3 from quartz tube and R9 from open pour experiment. The relative amount of austenite is greater in Sample R9 as compared to sample R3. This observation may be attributed to the higher weight % of Ni in samples from the open pour experiments. The $Cr_2O_3$ peaks are present in both samples, indicating that an even a small amount of Cr in the surface alloyed layer allows the formation of the passivation layer, which aids in corrosion resistance.

Example 21: Hardness Measurements

Figure 33:
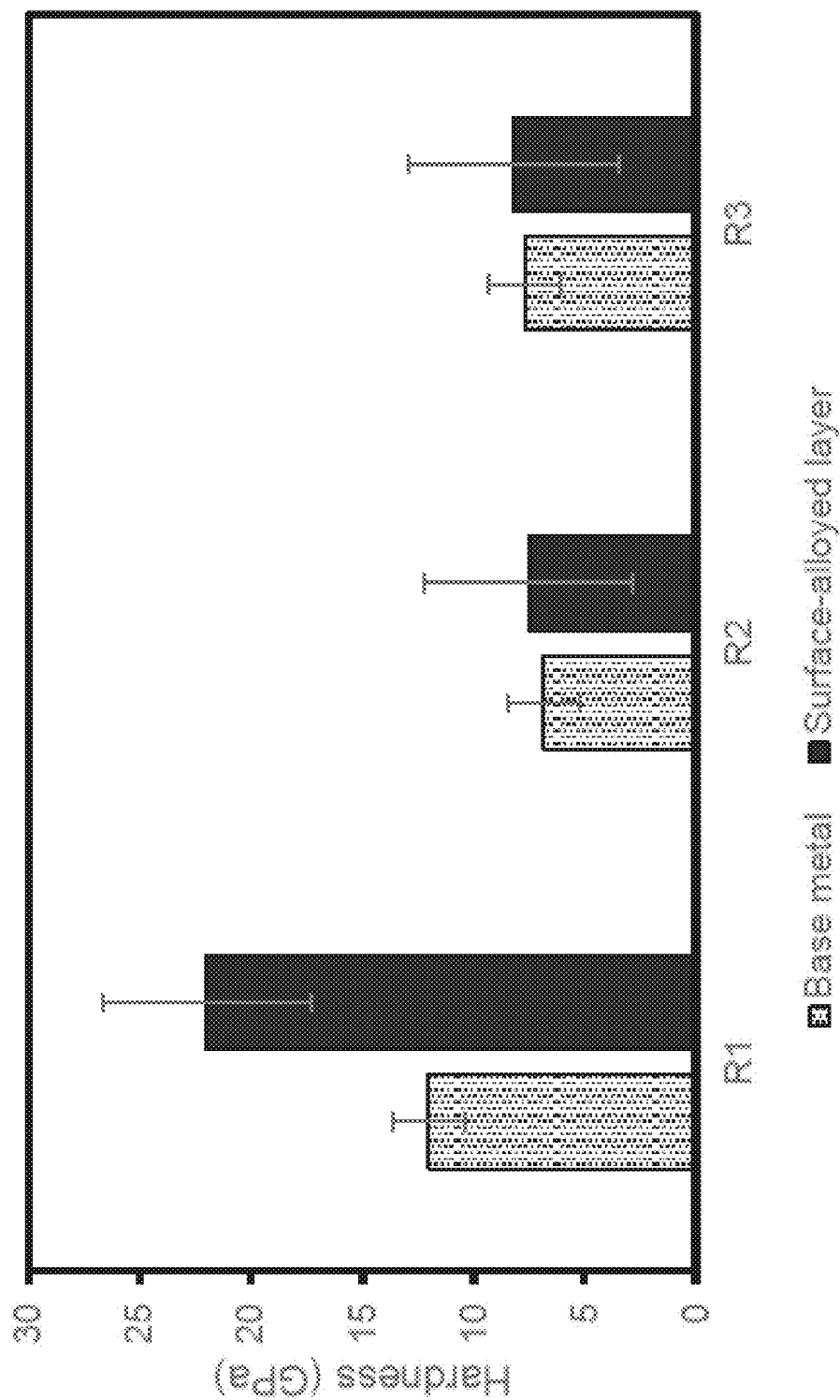
FIG. 33 shows the hardness of nanoindentation tests for as-cast base metal and surface alloyed layer.
Figure 34:
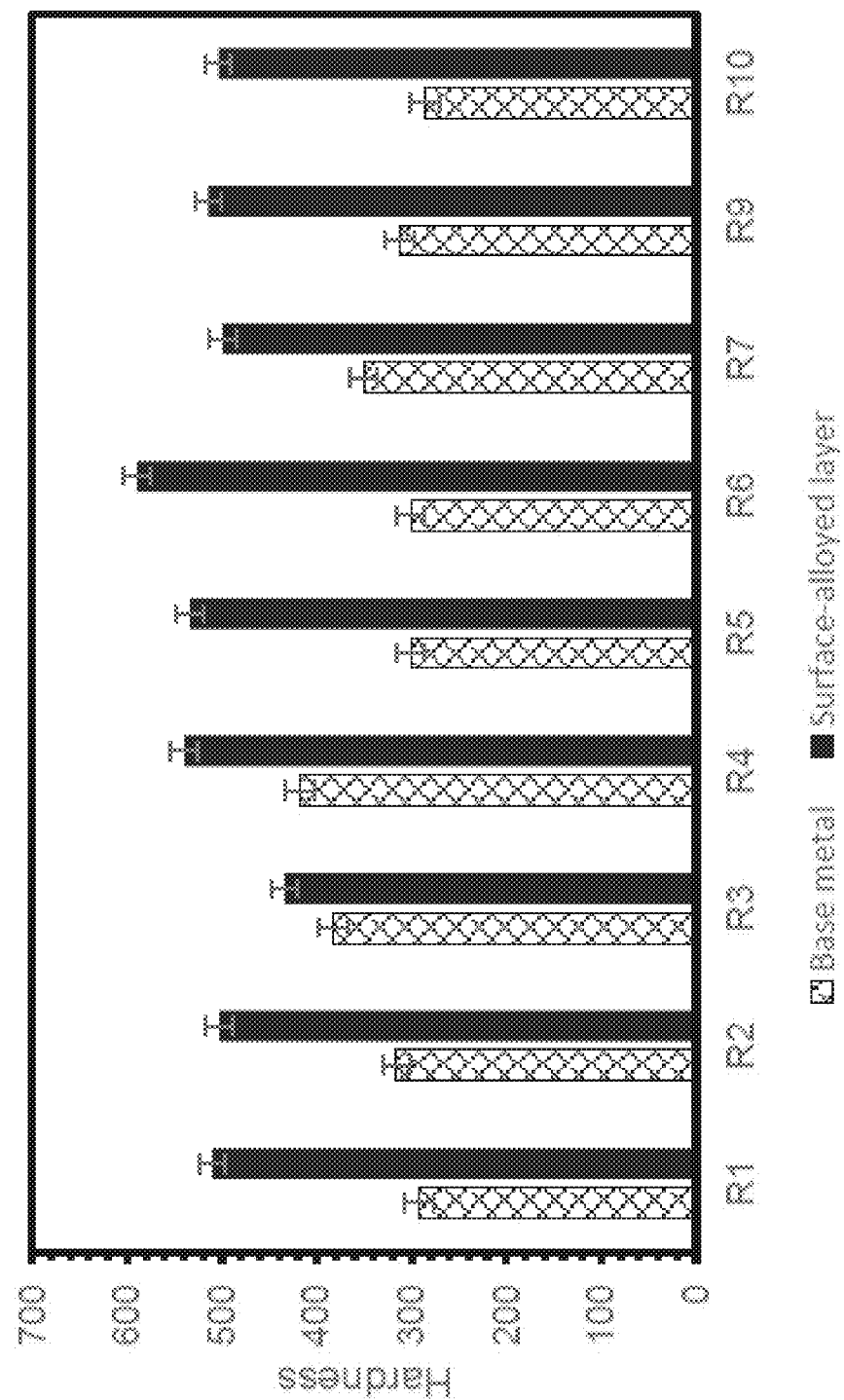
FIG. 34 shows Vicker's microhardness for as-cast base metal and surface alloyed layer.

The hardness of the surface alloyed layer was expected to be higher than that of the base metal due to the higher content of alloying elements in the surface alloyed layer. The presence of Ni and Cr leads to solid solution strengthening of the surface alloyed layer along with the micro-alloying addition of Mn and Si. The formation of austenite and ferrite in the surface alloyed layer impacts strength to the surface alloyed layer. Nanoindentation and Vicker's microhardness were used to quantify the hardness of both surface alloyed layer and base metal as the depth of the surface alloyed layer is not enough for macro hardness tests such as Rockwell or Brinell. The results of Nanoindentation and Vicker's microhardness for surface-alloyed layers and substrate are compared in FIG. 33 and FIG. 34, respectively. Both measurements for the nanoindentation test and Vicker's microhardness test were done with five indents through the length of the surface alloyed layer of the sample and the base metal for an average value. The highest increase in the hardness of the surface alloyed layer compared to base metal was 48.89%, while the lowest increase in the hardness was 6.44%. The hardness of the surface alloyed layer in as-cast condition appears to be correlated the weight percentage of Cr in the surface alloyed layer, as sample R3 with 3.69 weight % Cr showed the lowest increase while sample R6 with 26.66 weight % Cr showed the highest increase in hardness.

Example 22: Corrosion Studies

Figure 35:
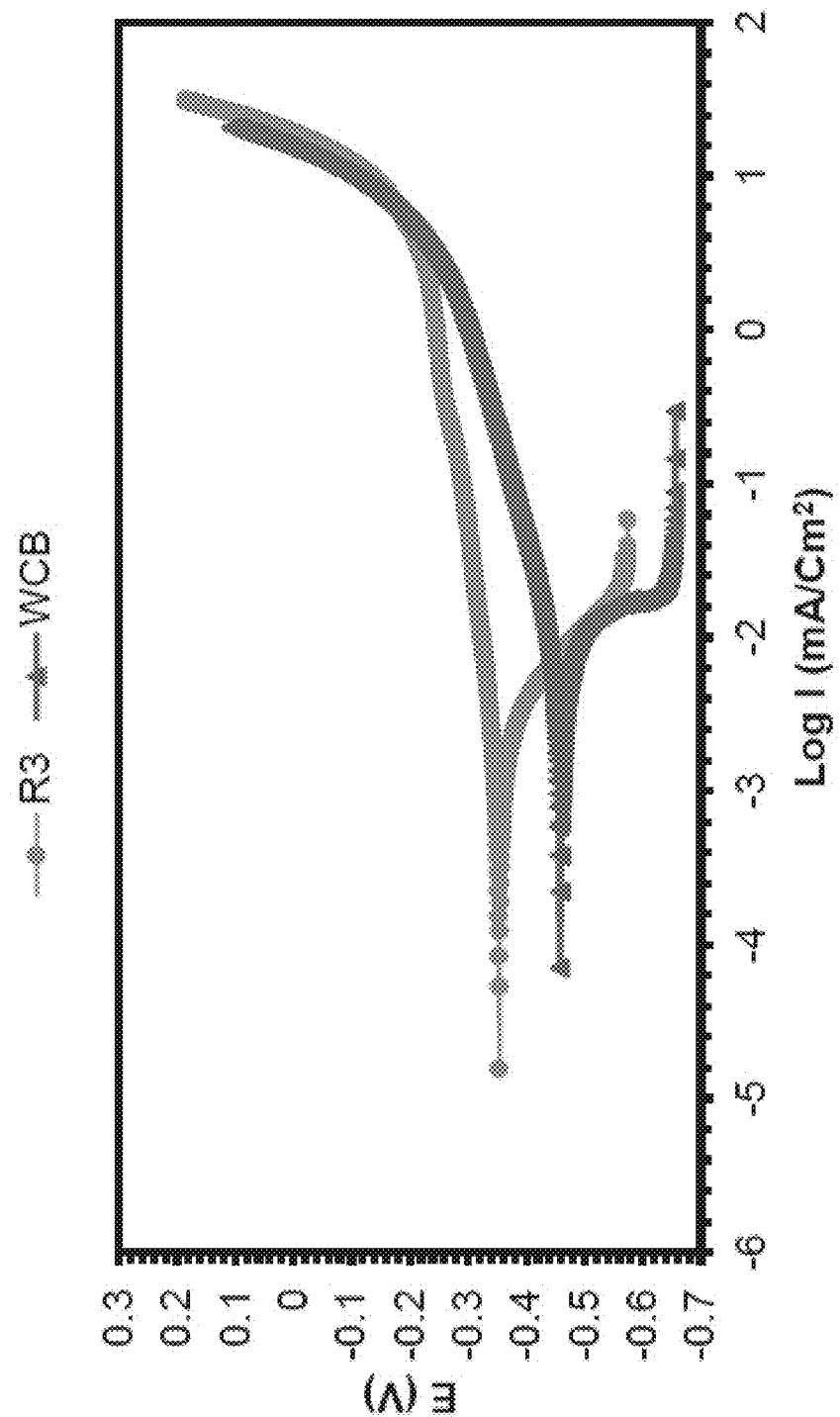
FIG. 35 shows the Tafel plots of the surface-alloyed sample and WCB in 3.5% NaCl solution.

A surface-alloyed sample (R3) which could fit in the corrosion cell due to its suitable dimension was tested using a potentiodynamic polarization test. FIG. 35 shows the Tafel plots from the corrosion test for the surface alloyed sample R3 and WCB, and Table 15 lists the corrosion current and potential for these samples.

TABLE 15

Corrosion Current and Corrosion Potential of R3 and WCB.

| Sample | $E_{Corr}$ (V) | $I_{Corr}$ (µA) |
|---|---|---|
| R3 | −0.36 | 3.4 |
| WCB | −0.44 | 10.47 |

Table 15 demonstrates that sample R3 in as-cast condition possesses more resistance against corrosion compared to WCB. The high corrosion resistance of the sample R3 is likely due to the formation of a thick surface alloyed layer (2950 µm) with a high percentage of Cr and Ni in its elemental composition. The presence of Ni and Cr facilitates the formation of austenite and ferrite phases respectively in the surface alloyed layer.

Example 23: Scaling-Up the Surface Alloying Method

The surface alloying technique, which was used in small lab-scale experiments was also applied for sand casting surface alloyed butterfly valves from industrial-size melts. A melt size of 500 lbs. was cast using WCB steel as the base metal at Badger Alloy Inc. Milwaukee, US. The surface alloying was achieved by adding Ni, Cr, Mo, Fe—Mn, and Fe—Si to the slurry containing a binder (sodium polyacrylate) coated on the mold surface. The composition, phases, and hardness of the surface alloyed layer observed on prototype butterfly valve casting are listed in Table 16 and compared with a similar surface alloyed layer cast at a lab-scale (R6).

TABLE 16

Values of alloying powder, composition, phases, and hardness of two samples cast a from small melts on lab scale and large industrial scale melts.

| Sample | Grams (g) of Alloying Powders Used for Surface Alloying | | | Weight % of Alloying Element | | | Phases | Hardness (HV500) |
|---|---|---|---|---|---|---|---|---|
| | Ni | Cr | Fe—Mn | Ni | Cr | Mn | | |
| Lab-scale | 0.82 | 2.27 | 0.51 | 6.23 | 26.66 | 3.58 | Austenite, ferrite | 500 |
| Industrial scale | 0.56 | 2.19 | 0.11 | 6.4 | 23.2 | 1.1 | Austenite, ferrite | 600 |

As shown in Table 16, the surface alloyed layers of the two samples cast at two different scales have similar composition, phase composition, and hardness values. This result suggests that the lab-scale surface alloying technique described in this paper is not only scalable to industrial scales and can be applied for casting industrial components, but also has the potential to predict the properties of the surface-alloyed samples cast at industrial scale using a comparable slurry composition and technique. This could allow one to perform small scale lab trials before industrial-scale casting to get an idea of surface alloying likely to be achieved during the manufacture of larger industrial castings.

C. General Materials for Examples 24-31

The samples used in this study were cast at Maynard Steel by the sand-casting method. Mild steel was used as the base metal, while Ni and Cr were used as the alloying elements. The elemental composition of the base metal is shown in Table 17.

TABLE 17

Elemental composition of the base metal.

| Element | Mg | Si | Fe |
|---|---|---|---|
| Weight (wt %) | 1.2 | 0.43 | Balance |

The mold surface was coated with a refractory wash (REFCOTEC Refcohol 1010) and measured quantities of alloying powders, as shown in Table 18, were sprinkled onto the coated mold surface.

TABLE 18

Quantities of alloying powders, Ni and Cr, applied on the core surface for surface alloying the base metal during the casting process.

| Sample | Ni (grams) | Cr (grams) |
|---|---|---|
| SA1 | 1.64 | 1.64 |
| SA2 | 1.9 | 2 |

The refractory wash performed as a binder, allowing the powders to adhere to the mold surface. Once the wash was dried, any excess alloying powder was removed and weighed to estimate the quantity of alloying powder left on the mold surface. Mild steel was then poured into the mold to surface alloy a pre-selected surface of the casting.

After casting, the samples underwent shot blasting to remove any surface oxides followed by normalizing in the air at 898° C. for 1 hour per inch thickness and tempering at 535° C. for 1 hour per inch of thickness. The samples were cut into smaller pieces using a bandsaw and metallographically prepared for microstructural, compositional, and phase analysis. Scanning electron microscopy was done using a JEOL JSM-6460LV scanning electron microscope (SEM) with an energy-dispersive spectrometer (EDS) to study morphology and elemental compositions of the surface-alloyed samples. A Bruker D8 Discover X-ray diffractometer (XRD) was used for phase identification. An Agilent Technologies G200 Nano-indentor and a Vicker's Microhardness Tester were used to investigate the effect of alloying elements on hardness. A Heat/Quench thermal cycling test was conducted to determine the adhesion behavior of the sample according to ASTM B571-97.

Example 24: Residual Stress Testing

The residual stress measurements were conducted using the Panalytical Emperyan, using the ω-angle tilt method for analysis. The samples were cut into 1"×1" sizes with a thickness of 1 cm. The surface of the sample was left in as cast state to prevent any buildup of residual stresses due to mechanical machining. During the experimentation, fluorescence was observed due to the use of a Cu anode and the metal-containing high quantities of iron (Fe). According to the National Physics Laboratory, the recommended 2θ angle to conduct the stress measurements on stainless steels is 147.5°. The reference was selected as 316L stainless steel as the XRD results on the sample surface revealed phases similar to 316L. Diffraction was performed to find the most visible peak at the maximum angle. The most visible peak was observed near the 90° region (hkl {113}), where the peak was visible with minimum background noise as compared to peaks at higher angles. All experiments were conducted with the parameters listed in Table 19.

TABLE 19

Parameters used for residual stress analysis.

| Anode Material | Copper (Cu) |
|---|---|
| K-Alpha1 wavelength | 1.540598 |
| K-Alpha2 wavelength | 1.544426 |
| Ratio K-Alpha2/K-Alpha1 | 0.5 |
| Divergence slit | Fixed (0.19 mm) |
| Monochromator used | NO |
| Generator voltage | 45 |
| Tube current | 40 |

The scan axis for both samples was 2θ-ω, and the ω offset range was 0° to −30° with steps of 5°. As the peak observed near 90° was selected for calculation of stresses, it was necessary to obtain the 2θ of the peak so as to obtain d-spacing. The plot of d-spacing vs. sin 2ψ is used to calculate the slope 'm,' and the residual stress is then calculated by the formula:

$$\sigma_R = (E/(1+v))m$$

where,
- $\sigma_R$=Residual stress in the material (Tensile (+) or Compressive (−))
- E=Young's modulus of the material
- v=Poisson's ratio of the material
- m=slope of d-spacing vs. sin 2ψ

The data points in the range of 89°-91° were fit using a Gaussian fit to obtain an accurate peak location. For every offset point, the 2θ angle corresponding to the Gaussian fit was used. Ψ was calculated using the formulation:

$$\omega = \theta + \psi$$

- ω=Angular rotation about a reference point—the angular motion of the goniometer of the diffraction instrument in the scattering plane
- θ=Angular position of the diffraction lines according to Bragg's Law
- ψ=Angle between the normal of the sample and the normal of the diffracting plane (bisecting the incident and diffracted beams)

Example 25: Corrosion Testing

Linear polarization tests were carried out using Bio-logic Science Instruments' SP-200 Potentiostat using an EC lab software to measure corrosion resistance. A conventional three-electrode glass cell consisting of a sample coupon with an exposed surface area of 0.980 cm² as the working electrode, graphite rod, and saturated calomel electrode (SCE) was used as auxiliary and referenced electrodes, respectively. All potentials were measured vs. SCE reference electrode. Prior to all electrochemical measurements, the working electrode was immersed in a G61 solution (34 g NaCl in 920 g of distilled water) for three days to attain a stable corrosion potential (OCP). Tests were performed in an aerated G61 solution at 25° C. Linear Polarization Resistance experiments were done from −25 to +25 mV vs. $E_{corr}$ at the scan rate of 0.166 mV/s. The slope of the I vs. $E_{we}$ at I approaching 0 was determined and used to obtain the corrosion current ($I_{corr}$).

Example 26: Microstructural Study

Figure 36:
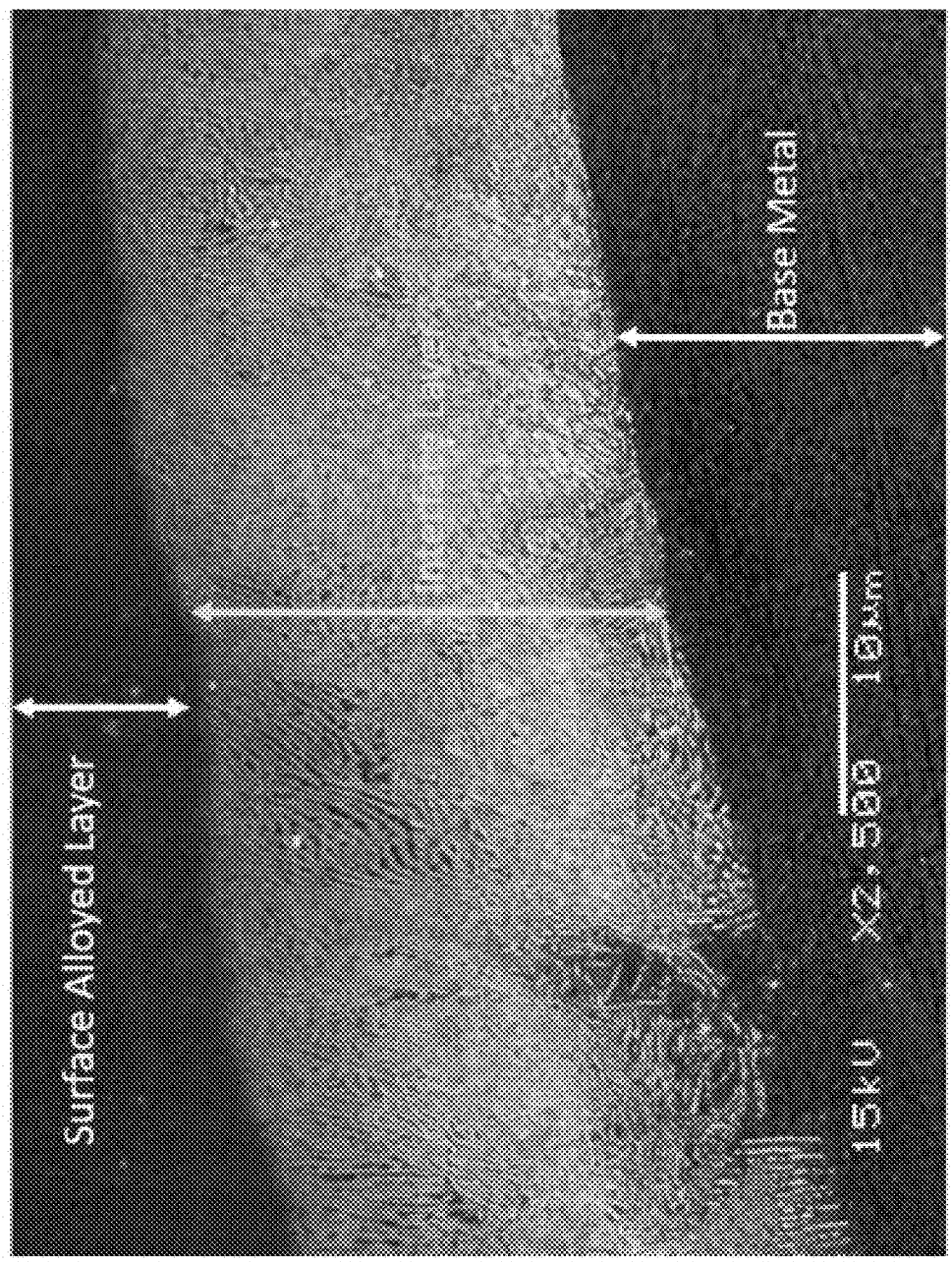
FIG. 36 shows a SEM image showing the surface alloyed layer, interface layer, and the base metal of sample SA2. The colonies of pearlite are visible in the interface layer.
Figure 37A:
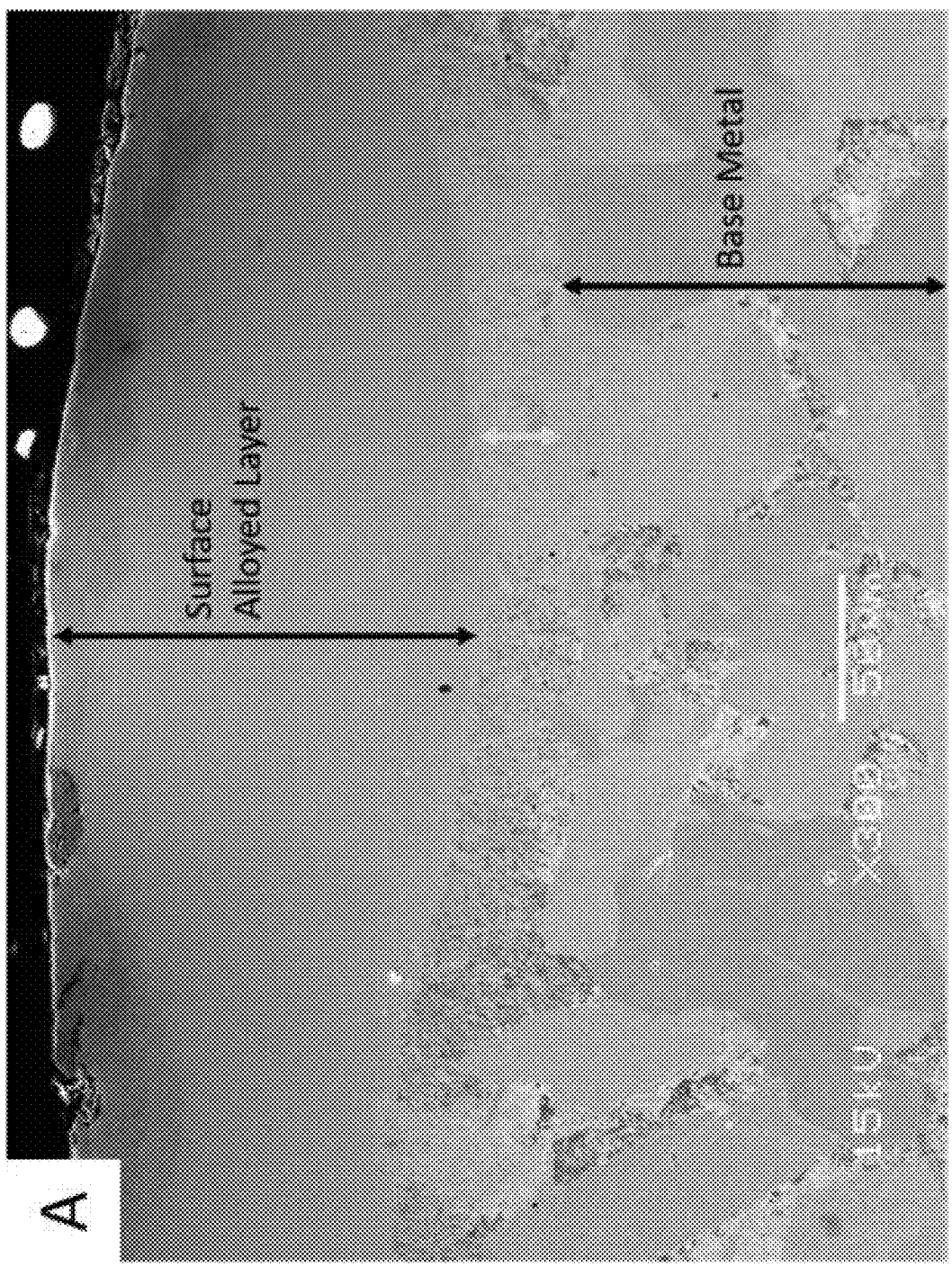
FIG. 37A shows a SEM image showing the Ni and Cr enriched surface alloyed layer and ferrite and pearlite microstructure in the base metal of sample SA1. The interface layer separating the surface alloyed layer and the base metal is marked in yellow.
Figure 37B:
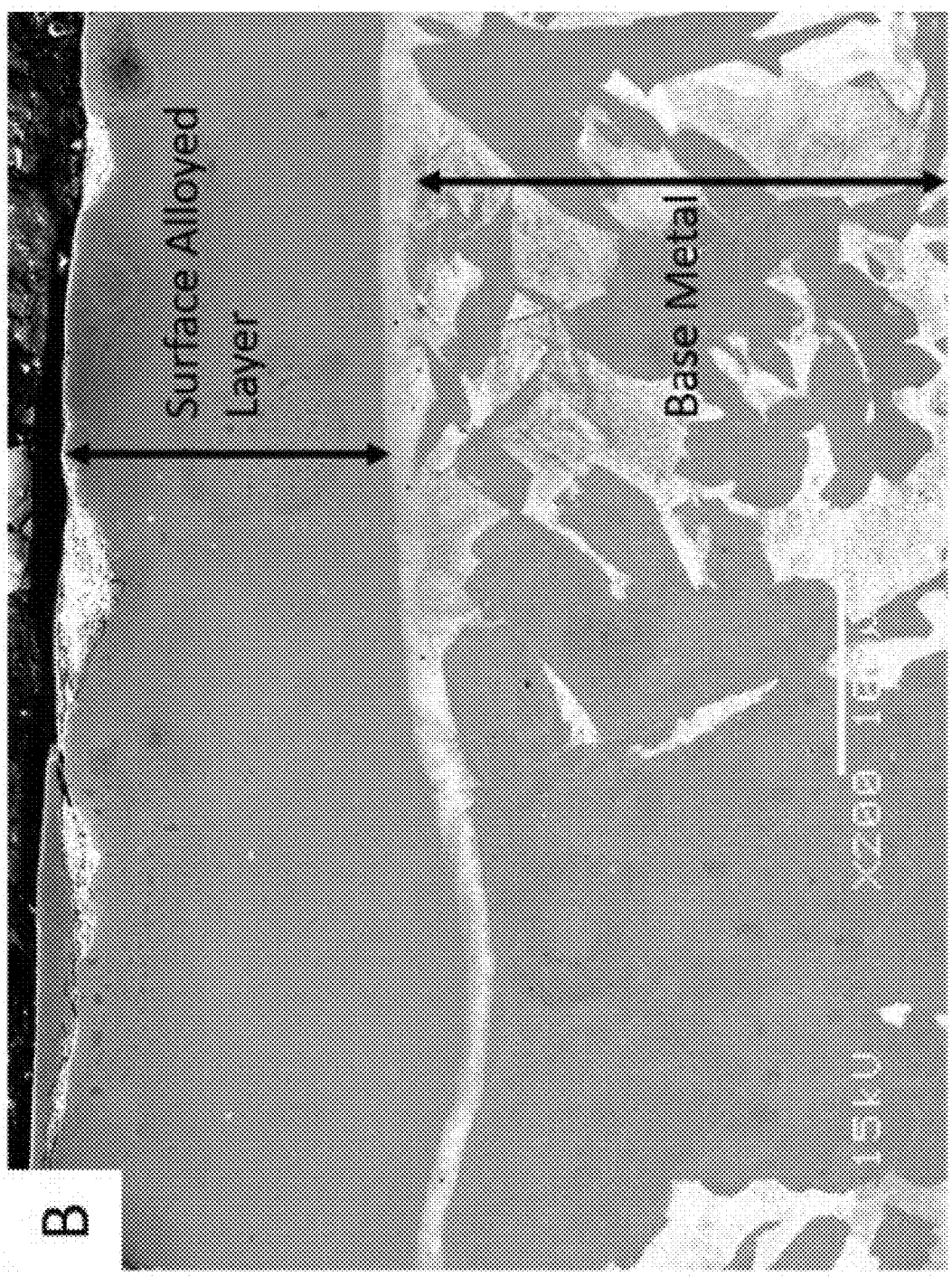
FIG. 37B shows a SEM image showing the Ni and Cr enriched surface alloyed layer and ferrite and pearlite microstructure in the base metal of sample SA2. The interface layer separating the surface alloyed layer and the base metal is marked in yellow.
Figure 38A:
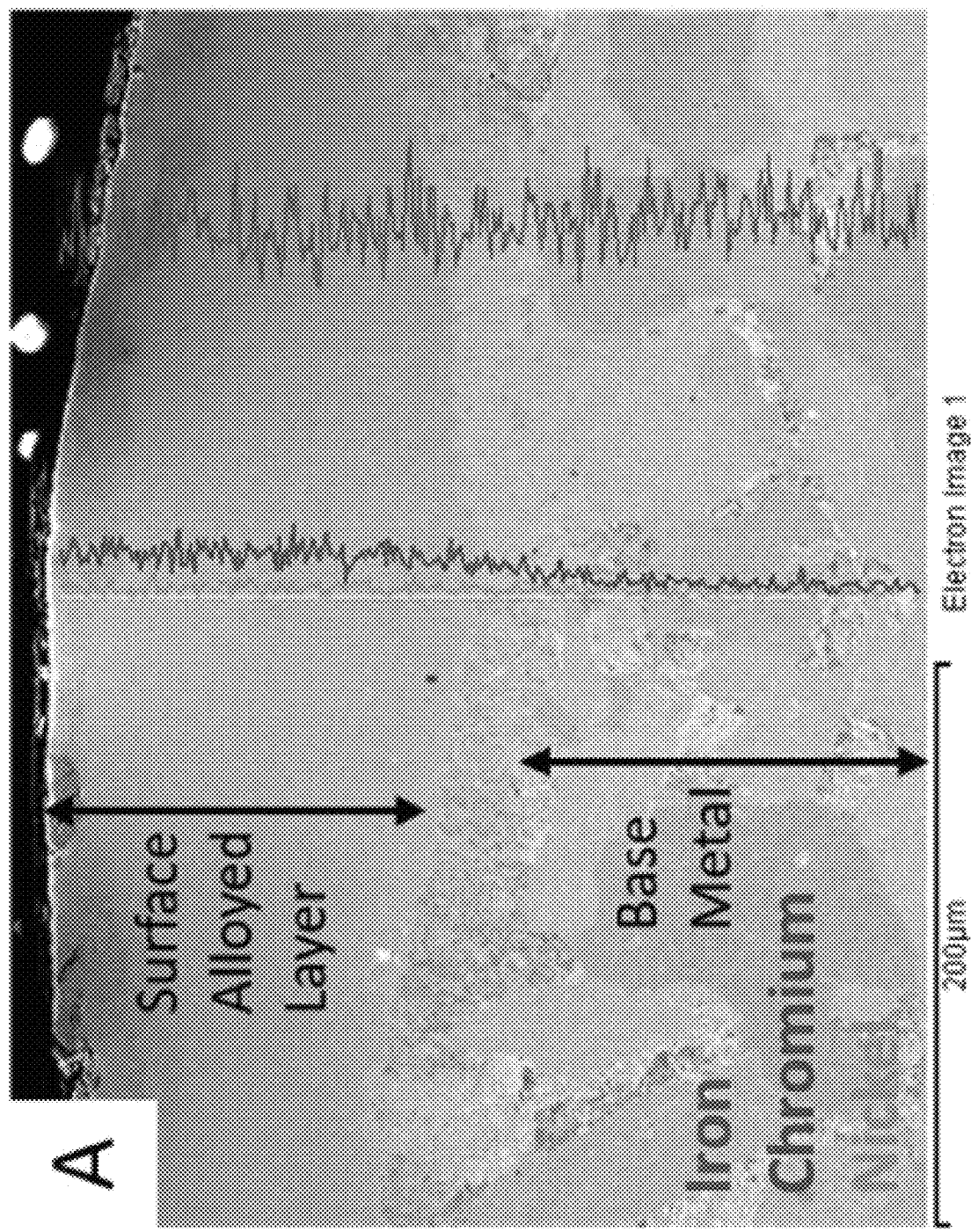
FIG. 38A shows line scans of sample SA1 showing the decrease in the concentration of alloying elements Cr (Blue) and Ni (Green) from the surface alloyed layer into the base metal.
Figure 38B:
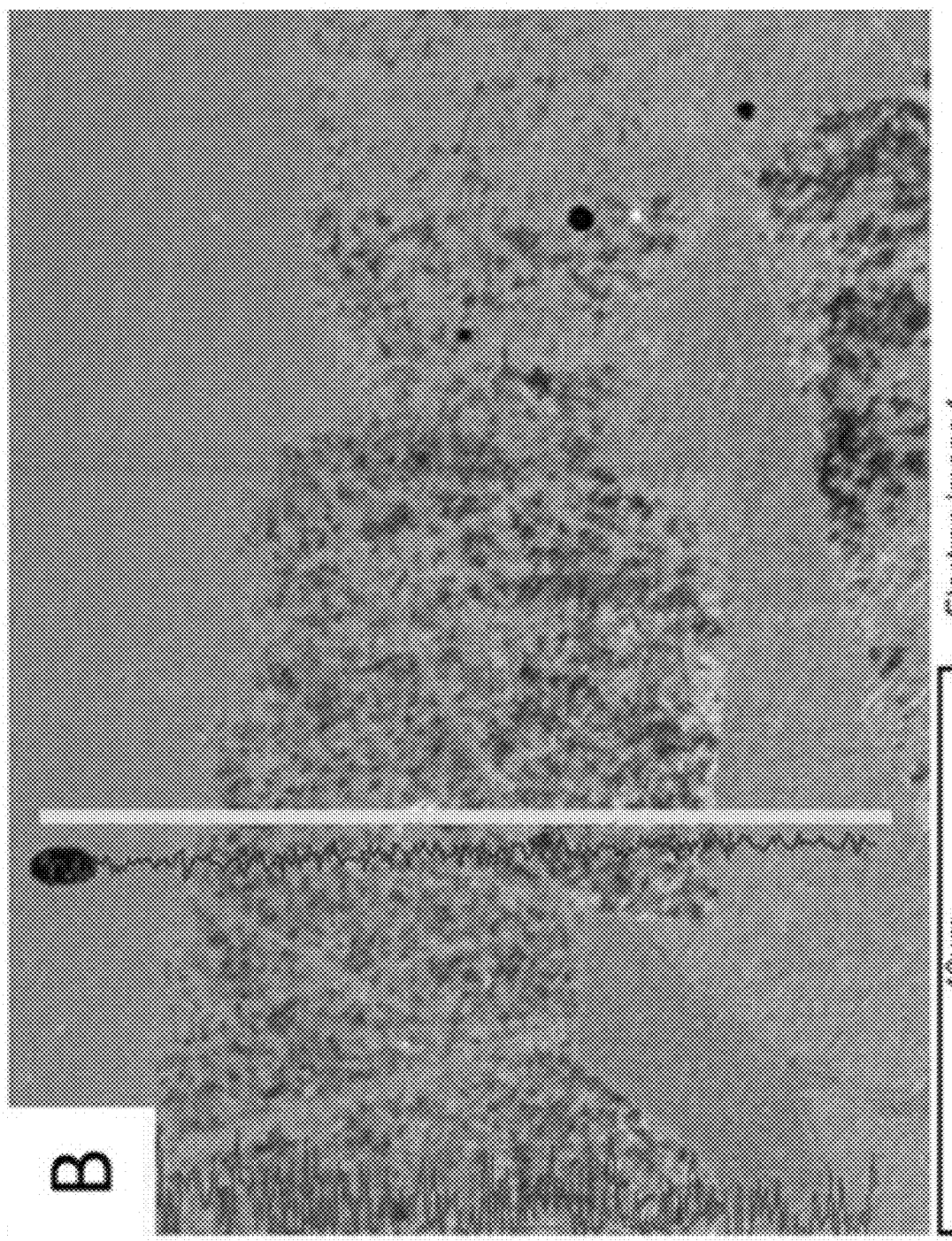
FIG. 38B shows a magnified line scan of the interface region for sample SA1.
Figure 39A:
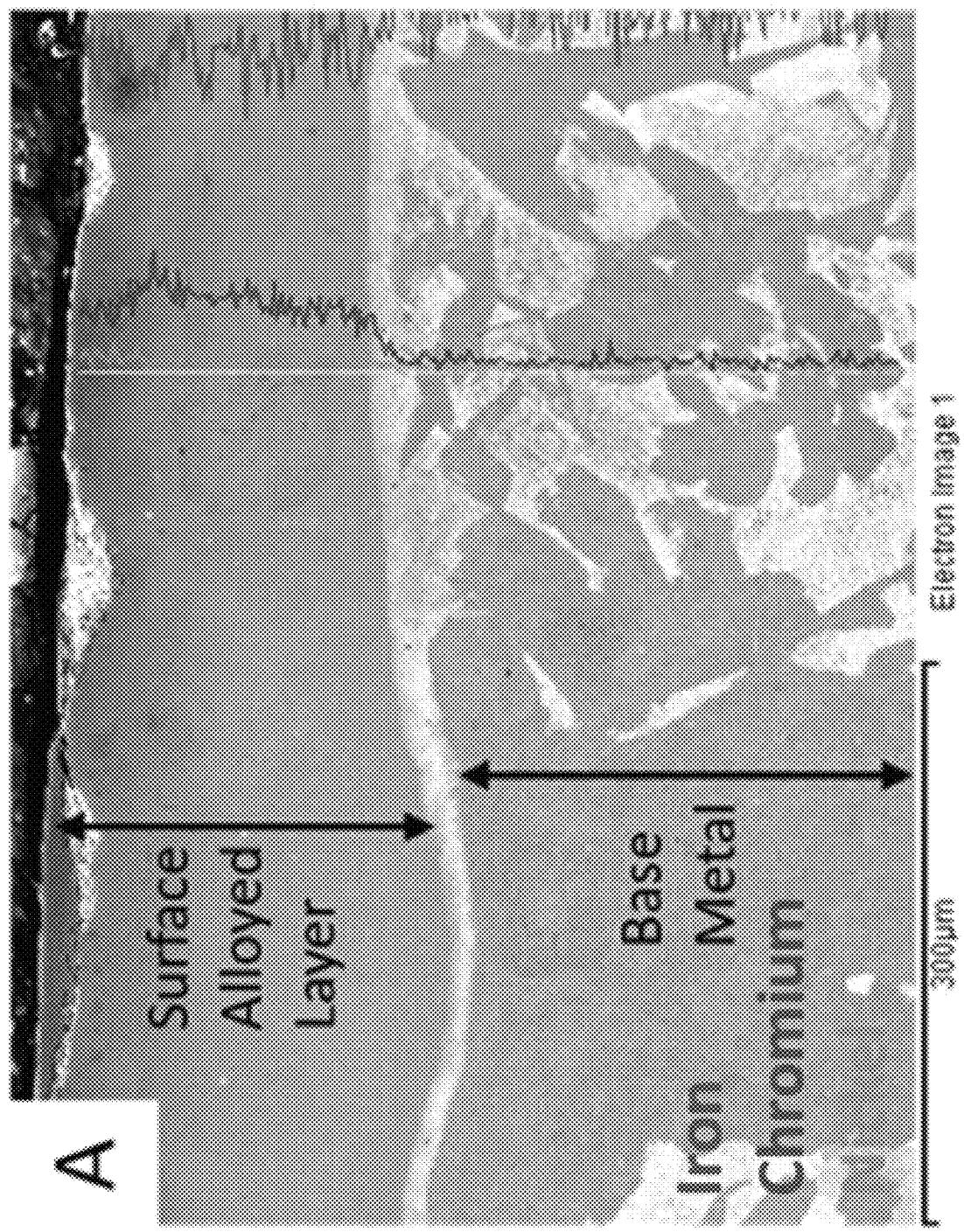
FIG. 39A shows line scans of sample SA2 showing the decrease in the concentration of alloying elements Cr (Blue) and Ni (Green) from the surface alloyed layer into the base metal.
Figure 39B:
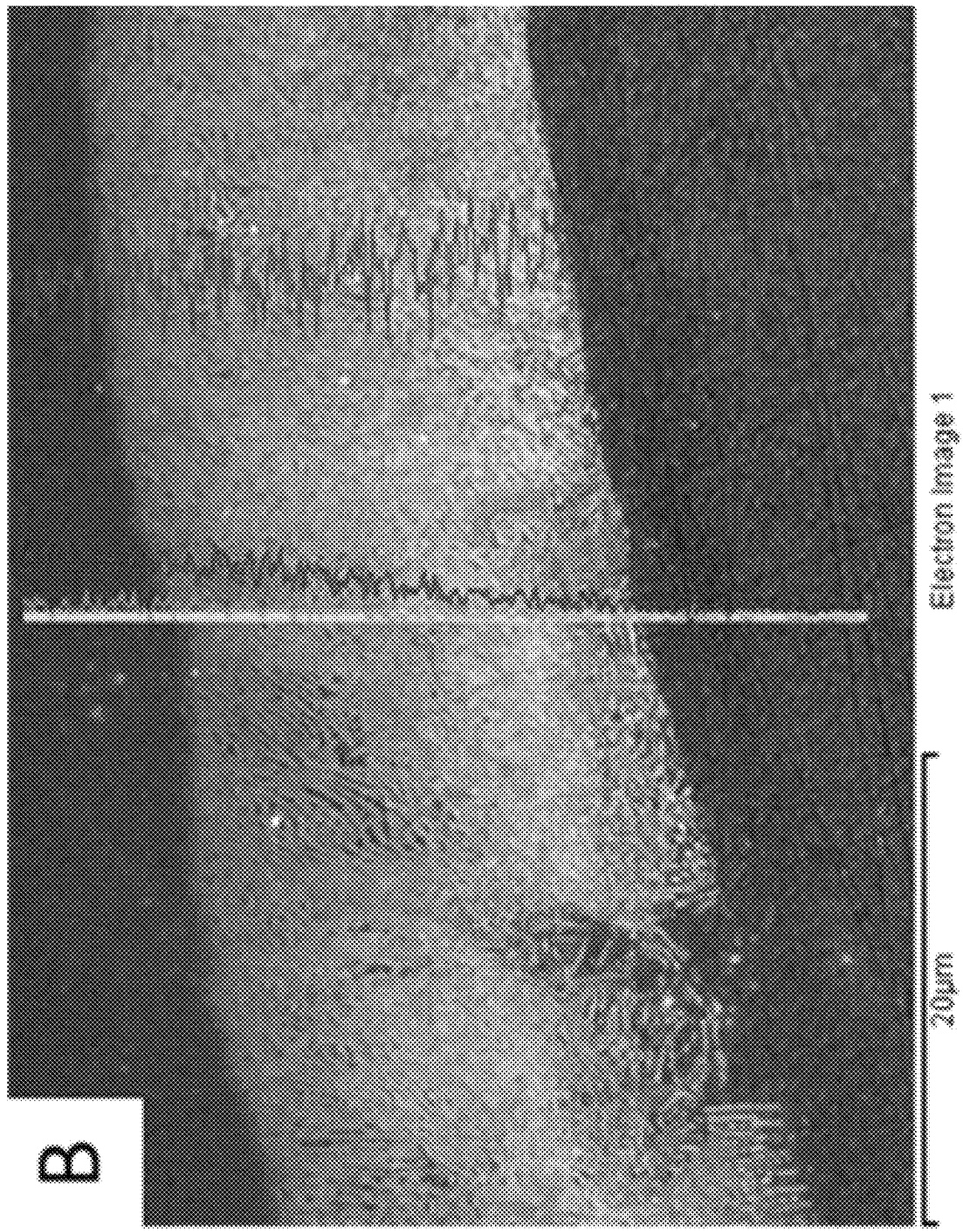
FIG. 39B shows a magnified line scan of the interface region for sample SA2.

The SEM images of typical cross-sectional areas of samples SA1 and SA2 are shown in FIG. 36 and FIG. 37A-B at different magnifications. The etching of the metallographically prepared cross-section of the casting using 5% Nital revealed a ferrite and pearlite microstructure in the base metal. The surface alloyed layer did not etch due to the enrichment by Ni and Cr. The formation of pearlite in high concentrations was on account of the saturation of carbon from the surface alloyed layer during solidification. As the mild steel melt contacts the Ni and Cr powders, melting and alloying are induced. The lamellar structure was observed through the length of the interface.

The absence of microporosities, pinholes, and gas bubbles in the surface alloyed layer indicated that the use of an alcohol-based binder did not lead to the gas formation during the casting process. This was essential as the internal defects would be detrimental for hardness as well as corrosion resistance. A crack initiating at the surface alloyed layer and propagating through into the base metal could lead to the initiation of corrosion in the base metal. Although the castings underwent heat treatment there were no indications of delamination or degradation of surface alloyed layer, thus indicating strong adhesion and high temperature stability of the surface alloyed layer. It should be noted that prolonged exposure to high temperatures in air during heat treatment would lead to oxide formations on the surface alloyed layer.

The EDS results confirmed the presence of Ni and Cr alloying in the surface alloyed layer. The maximum wt % observed for Cr was 9.52%, while that for Ni was 4.89%. The weight percentages of alloying elements in the surface alloyed layers of sample SA1 and SA2 are given in Table 20.

TABLE 20

Weight percentage of Alloying element in the surface alloyed layer of the two samples.

| Element | SA1 | SA2 |
|---|---|---|
| Cr | 4.82 | 9.52 |
| Ni | 2.04 | 4.89 |
| Si | — | — |
| Fe | Balance | Balance |

Line scans of the samples showed in FIGS. 38A-38B and FIGS. 39A-39B indicate a sharp decline in the weight percentage of Ni and Cr from the surface alloyed layer to the base metal. Such selective alloying on the surface layer is observed in the cross-sections of the samples. Transitioning from the surface alloyed layer into the base metal, the wt % Fe rose to mild steel levels. The composition of WCB steel is shown in Table 17.

Example 27: Phase Identification

Figure 40:
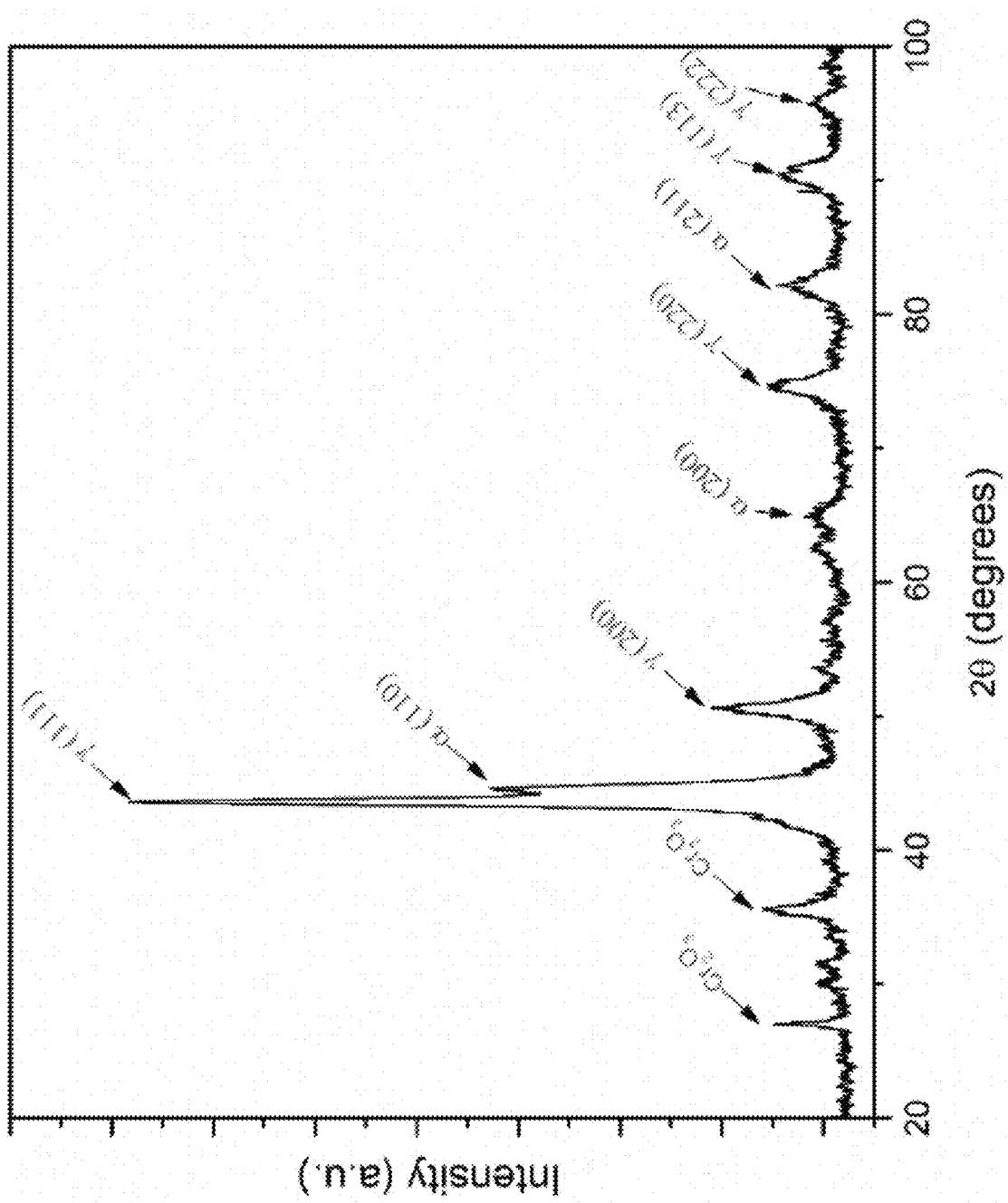
FIG. 40 shows the XRD plot of the surface alloyed layer of SA2 confirming γ-Fe, α-Fe, and $Cr_2O_3$.

The enrichment of the surface by Ni and Cr performed to improve the mechanical properties and corrosion resistance of the surface alloyed layer as compared to mild steel. The corrosion resistance in stainless steel is primarily attributed to $Cr_2O_3$ present on the surface of the stainless steel. This passivation layer resists the formation of iron oxides. The XRD analysis showed a peak of $Cr_2O_3$ in the surface alloyed layer of SA2 (FIG. 40), in addition to the presence of ferrite and austenite. The normalizing treatment done in the air and at 898° C. could have led to formation of chromium oxide leading to intense peaks of $Cr_2O_3$ on the surface.

Example 28: Residual Stress Analysis

The XRD scan parameters for the sample SA2 are listed in Table 21.

TABLE 21

Scan parameters for both samples.

| Sample | SA2 |
|---|---|
| Scan range | 72.0469° to 92.0837° |
| Scan type | CONTINUOUS |
| φ | 180 |

TABLE 21-continued

Scan parameters for both samples.

| Sample | SA2 |
|---|---|
| ψ | 0 |
| Z | 2.6 |
| Time per step(s) | 236.64 |

The parameters shown in Table 14 were also applicable in this case. The scan range was obtained after conducting a scan over the entire range to identify suitable peaks. After completing the fitting using Gaussian fit and plotting the d-spacing vs. sin 2ψ (Table 22 and FIG. 41), a linear fit was applied to the plot.

TABLE 22 d-spacing vs. sin2ψ plot points for sample SA2.

| Negative Offset | 2θ (°) | d-spacing (Å) | Ψ | sin²ψ |
|---|---|---|---|---|
| 0 | 90.2998 | 1.0865 | 45.15 | 0.5026 |
| 5 | 90.2772 | 1.0867 | 50.14 | 0.5892 |
| 10 | 90.2744 | 1.0867 | 55.14 | 0.6733 |
| 15 | 90.2613 | 1.0868 | 60.13 | 0.7520 |
| 20 | 90.2469 | 1.0870 | 65.12 | 0.8230 |
| 25 | 90.2153 | 1.0873 | 70.11 | 0.8842 |
| 30 | 90.1860 | 1.0875 | 75.09 | 0.9338 |

The φ angle was set to 180° for the measurements. As a result, the negative offset is now termed as positive and vice versa. Thus, a positive slope in FIG. 41 corresponds to compressive residual stress. From Table 21, it can be seen that as the offset angle changes, there is an increase in the d-spacing of the SA1. The change in d-spacing corresponds to the change in the diffraction angle. A crystal would undergo a change in d-spacing depending on the stresses present. The sample show an increase in d-spacing with increasing offset, which is correlated to the presence of compressive stress. The final residual stress measurements are given in Table 23.

TABLE 23

Final residual stress measurements.

| Sample | E (GPa) | ν | Slope | Residual Stress (MPa) | R-squared (adj) % |
|---|---|---|---|---|---|
| SA2 | 193 | 0.33 | 0.0022 | −319 | 87.196 |

Figure 41:
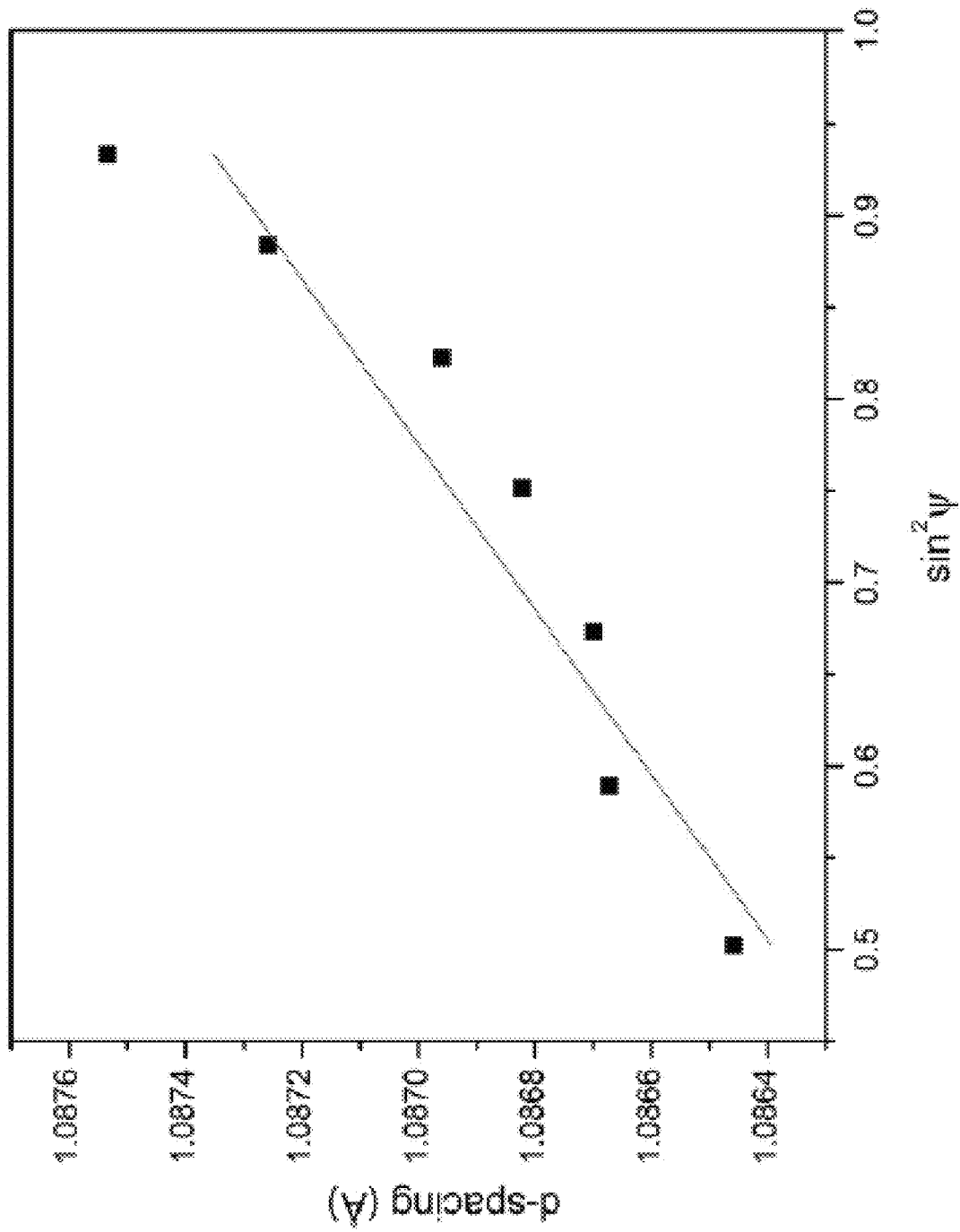
FIG. 41 shows the d-spacing vs. sin 2ψ plot for SA2.

FIG. 41 shows a linear trend with an R-squared value of 87%. One of the primary reasons for the noise in the data was the fluorescence produced due to the use of a Cu anode. Another factor for such a trend could be the effect of surface roughness of the sample.

As can be seen from FIG. 41, the nature of residual stress is compressive, and a magnitude is 319 MPa is similar to what is observed for other surface treatments such as carburizing and nitriding. This level of residual stress is not likely to cause problems during subsequent mechanical processing, including machining. Compressive residual stress can lead to the clamping of the sample on to the cutting blade leading to failure of the blade and improper sectioning of the sample. The data obtained from the measurements were fitted using a Gaussian Fit for identifying the peak. The peak obtained from the Gaussian fit was chosen as the highest intensity, and the corresponding 2θ was obtained. This was then used with ψ by the relation of ψ being subtracted from half of 2θ which is ω. The ψ offsets can be as high as 40°.

Example 29: Hardness Measurements

The hardness of the surface alloyed layer and base metal was measured using nano-indentation and Vicker's micro hardness test (Table 24).

TABLE 24

Comparison of the hardness of surface alloyed layer and base metal substrate by nano-indentation test and Vicker's microhardness test.

| | Nano-indentation | | Vicker's Microhardness | |
|---|---|---|---|---|
| Sample | Surface (GPa) | Substrate (GPa) | Surface ($HV_{500}$) | Substrate ($HV_{500}$) |
| SA1 | 6.92 | 4.5 | 366.48 | 203.6 |
| SA2 | 8.98 | 4.2 | 492.6 | 204.4 |

As the depth of the surface alloyed layer was in the range of 100-200 μm range, macro hardness tests such as Rockwell or Brinell were not conducted. The use of microhardness and nano-indentation allowed for the isolated measurements of the surface alloyed layer. An increase in the surface alloyed layer as compared to the base metal was observed from the Vicker's Microhardness test. This on account of the solid solution strengthening by the addition of Ni and Cr to the base metal. The results from nano-indentation tests were in agreement with microhardness results and showed an increase in the hardness of the surface alloyed layer as compared to the base metal.

Example 30: Adhesion Test

A Heat/Quench thermocycling test was conducted on the samples to determine the adhesion behavior of the surface alloyed layer. The temperature test guide from ASTM B571-97 recommends a temperature of 250° C. for Ni/Cr based metallic coatings on steel. Thus, the samples were heated to temperatures ranging from 200° C. to 800° C. and quenched in water at room temperature after the furnace reached the set temperature. No flaking, peeling, or delamination of the SA layer was observed after the heat/quench test at 200° C. (FIG. 42B). Some delamination is seen only after the tests at 800° C. (FIG. 42C). This implies that the bonding between the SA layer and the substrate is strong and delamination is not likely to occur during use until temperatures up to 600° C. The adhesion test being qualitative in nature and thus, the integrity of the surface alloyed layer for temperature of 800° C. suggested that lower temperatures would not lead to delamination or flaking.

Example 31: Linear Polarization Test

Figure 43:
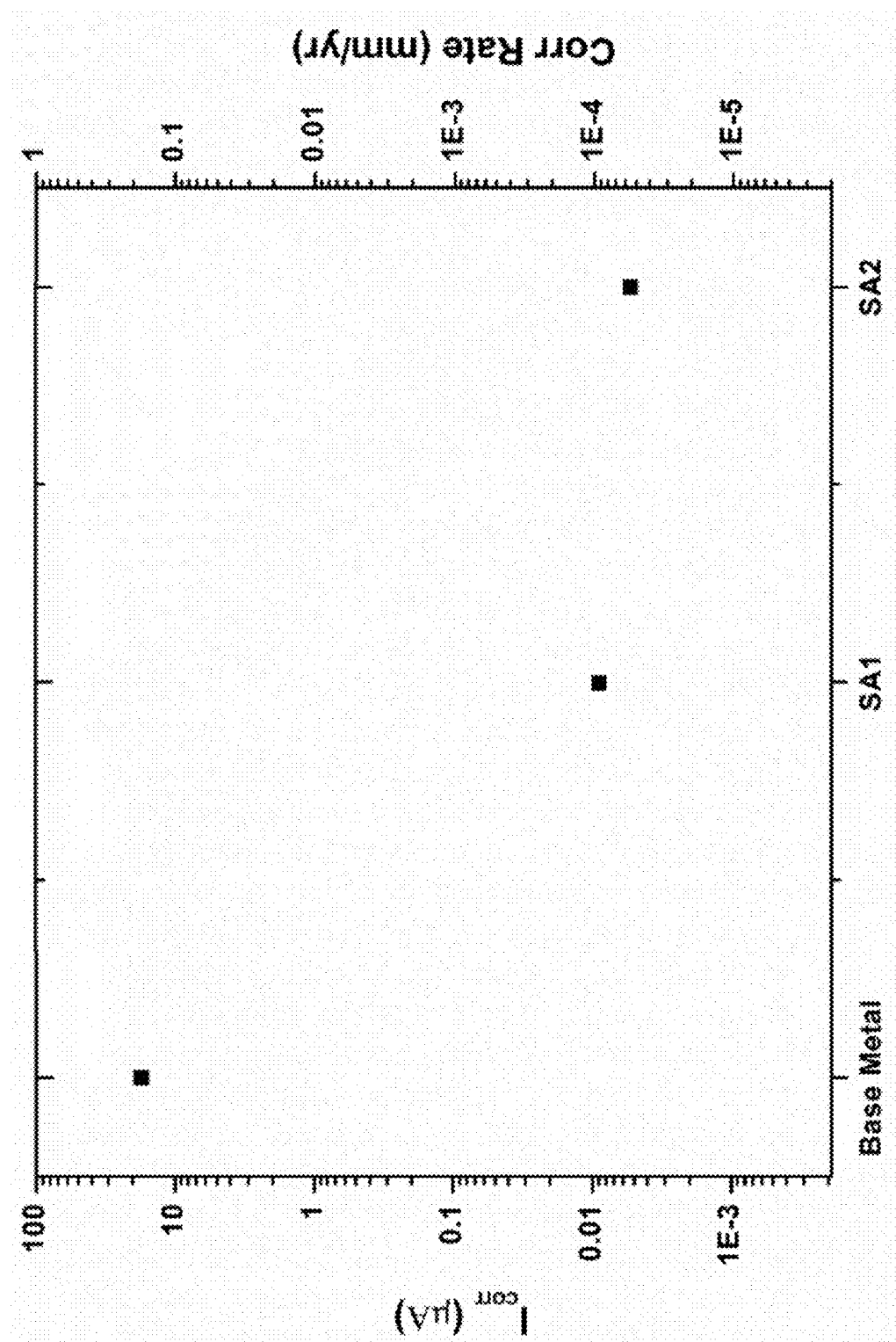
FIG. 43 shows corrosion resistance and change in corrosion rate for two samples as compared to the cast surface of a base metal.

Linear Polarization tests were conducted to determine the change in the corrosion current on the cast surface of the two samples as compared to the cast surface of the base metal (from a region without the surface alloying). The tests showed an increment in the corrosion resistance of the two samples after surface alloying. Table 25 and FIG. 43 shows this change as a reduction in the corrosion rate of the surface alloyed samples. An increase in the amounts of Ni and Cr at the surface improved the corrosion resistance of the sample by the formation of chromium oxide ($Cr_2O_3$). The presence of this oxide has been shown by the XRD analysis of the cast surface of the surface alloyed samples. Additionally, it was observed that SA2 has improved corrosion resistance as compared to SA1 which may be attributed to the higher amount of Cr and Ni in the surface alloyed layer in SA2, as seen from the EDS data (Table 20). It should be noted that the G61 solution used for the test is generally used as a substitute for seawater, and most simulations of corrosion of steels in seawater are done using this method.

TABLE 25

Corrosion current ($I_{corr}$) and corrosion rates of the samples.

| Sample | $I_{corr}$ (µA) | Corrosion Rate (mm/yr) |
|---|---|---|
| Base Metal | 17.4 | 0.184 |
| SA1 | 8.90E−03 | 9.40E−05 |
| SA2 | 5.20E−03 | 5.50E−05 |

The foregoing description of the specific aspects will so fully reveal the general nature of the technology that others can, by applying knowledge within the skill of the art, readily modify and/or adapt for various applications such specific aspects, without undue experimentation, without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary aspects but should be defined only in accordance with the following claims and their equivalents.

All publications, patents, patent applications, and/or other documents cited in this application are incorporated by reference in their entirety for all purposes to the same extent as if each individual publication, patent, patent application, and/or other document were individually indicated to be incorporated by reference for all purposes.

The invention claimed is:

1. An article, comprising:
a surface alloyed layer formed through controlled melting and solidification of metal and ferro-alloy powders, the surface alloyed layer comprising:
5 to 15 weight percent (wt %) nickel (Ni),
5 to 30 wt % chromium (Cr),
0.1 to 5 wt % molybdenum (Mo),
optionally manganese (Mn) and/or silicon (Si),
and balance iron (Fe),
wherein the surface alloyed layer has a thickness ranging from 10 µm to 5,000 µm and exhibits a dendritic microstructure enriched with nickel (Ni), chromium (Cr), and at least one of: molybdenum (Mo), manganese (Mn), and silicon (Si), which are distributed in the surface alloyed layer;
a steel base metal; and
a transitional layer integrally formed between the surface alloyed layer and the steel base metal, the transitional layer comprising a gradual composition gradient of chromium (Cr), nickel (Ni), iron (Fe), molybdenum (Mo), manganese (Mn), silicon (Si), or iron (Fe),
wherein formation of the transitional layer provides the gradual composition gradient which would lead to bonding of the surface alloyed layer to the steel base metal and prevent flaking during thermal cycling; and
wherein the article is produced using a method that includes:
preparing a slurry comprising metal and ferro-alloy powders with defined particle size ranging from 200-2000 µm;
pouring molten steel base metal at a temperature sufficient to melt the metal and ferro-alloy powders in a range of 1650-1800° C. and form a mixture with the steel base metal;
solidifying to form the surface alloyed layer with the dendritic microstructure; and
performing one or more post-casting heat treatments selected from normalizing, tempering, and solution.

2. The article according to claim 1, wherein the article defines an interior surface and an exterior surface, and
wherein the interior surface and the exterior surface each comprise the surface alloyed layer and the transitional layer.

3. The article according to claim 2, wherein the interior surface defines a cavity or a passageway through the article.

4. The article according to claim 1, wherein the surface alloyed layer comprises:
15.0 wt % to 30 wt % Cr;
5.0 wt % to 15 wt % Ni
1.0 wt % to 5.0 wt % Mn;
0.1 wt % to 5.0 wt % Si;
0.5 wt % to 3.0 wt % Mo;
the balance iron and incidental elements and impurities.

5. The article according to claim 4, wherein the steel base metal comprises ASTM A216 grade B steel.

6. The article according to claim 1, wherein the article is a butterfly valve, a check valve, a fitting, a suction diffuser, a basket strainer, or a tube.

7. A method of making the article according to claim 1, comprising:
Coating a portion of a sand mold with a metal slurry, the metal slurry comprising:

Chromium (Cr), nickel (Ni), molybdenum (Mo), and iron (Fe), optionally with ferromanganese (Fe—Mn) and/or ferrosilicon (Fe—Si); and
a binder that is alcohol-based or water-based;
pouring a molten steel alloy into the sand mold and removing the article from the sand mold.

8. The method according to claim 7, wherein the metal slurry further comprises 0.01 weight percent (wt %) to 30 wt % copper (Cu).

9. The method according to claim 7, wherein the molten steel alloy comprises a mild steel.

10. The method according to claim 9, wherein the mild steel comprises ASTM A216 grade B steel.

11. The method according to claim 7, wherein the binder is water-based.

12. The method according to claim 11, wherein the water-based binder is REFCOBAR 1010 Gel.

13. The method according to claim 7, further comprising applying the metal slurry on a portion of a sand core.

14. The method according to claim 7, further comprising, after removing the article from the mold, heat treating the article by normalizing and tempering or solution annealing.

15. The method according to claim 7, wherein the metal slurry comprises between 5 wt % and 30 wt % binder.

16. The method according to claim 7, wherein the article comprises:
a surface alloyed layer comprising chromium (Cr), nickel (Ni), iron (Fe), molybdenum (Mo), manganese (Mn), and silicon (Si);
a base metal comprising:
less than 1 wt % chromium (Cr),
less than 1 wt % nickel (Ni),
less than 1 wt % manganese (Mn),
less than 1 wt % silicon (Si),
the balance iron (Fe); and
a transitional layer between the surface alloyed layer and the base metal, the transitional layer comprising chromium (Cr), nickel (Ni), iron (Fe), manganese (Mn), molybdenum (Mo), silicon (Si), and balance iron (Fe).

17. The method according to claim 16, the article further comprising an interior surface defining a fluid pathway, the interior surface comprising the surface alloyed layer, the base metal, and the transitional layer.

18. The method according to claim 7, further comprising: preparing the metal slurry by combining Ni, Cr, Mo, ferromanganese (Fe—Mn), ferrosilicon (Fe—Si), and the binder.

* * * * *